US011511529B2

(12) United States Patent
Katsuno et al.

(10) Patent No.: US 11,511,529 B2
(45) Date of Patent: Nov. 29, 2022

(54) DECORATIVE FILM AND METHOD FOR PRODUCING DECORATIVE MOLDED BODY USING SAME

(71) Applicant: Japan Polypropylene Corporation, Chiyoda-ku (JP)

(72) Inventors: Satoshi Katsuno, Mie (JP); Kazuo Asuka, Mie (JP); Hayato Kitaura, Mie (JP); Morikazu Niibe, Mie (JP); Kuninori Takahashi, Mie (JP)

(73) Assignee: Japan Polypropylene Corporation, Chiyoda-ku (JP)

( * ) Notice: Subject to any disclaimer, the term of this patent is extended or adjusted under 35 U.S.C. 154(b) by 912 days.

(21) Appl. No.: 16/322,515

(22) PCT Filed: Aug. 2, 2017

(86) PCT No.: PCT/JP2017/028143
§ 371 (c)(1),
(2) Date: Feb. 1, 2019

(87) PCT Pub. No.: WO2018/025940
PCT Pub. Date: Feb. 8, 2018

(65) Prior Publication Data
US 2019/0232627 A1    Aug. 1, 2019

(30) Foreign Application Priority Data

Aug. 2, 2016  (JP) .............................. JP2016-151988
Aug. 2, 2016  (JP) .............................. JP2016-151989
Dec. 8, 2016  (JP) .............................. JP2016-238120
Dec. 8, 2016  (JP) .............................. JP2016-238121
Dec. 13, 2016 (JP) .............................. JP2016-240895
Mar. 15, 2017 (JP) .............................. JP2017-049277

(51) Int. Cl.
| | |
|---|---|
| B32B 27/00 | (2006.01) |
| B32B 27/32 | (2006.01) |
| C08J 5/18 | (2006.01) |
| B29C 51/16 | (2006.01) |
| B29C 48/00 | (2019.01) |
| B29C 45/00 | (2006.01) |
| B29K 23/00 | (2006.01) |
| C08L 23/08 | (2006.01) |
| C08L 23/12 | (2006.01) |

(52) U.S. Cl.
CPC .......... B32B 27/32 (2013.01); B29C 45/0001 (2013.01); B29C 48/022 (2019.02); B29C 51/16 (2013.01); B29K 2023/08 (2013.01); B29K 2023/12 (2013.01); B32B 2307/30 (2013.01); B32B 2307/72 (2013.01); B32B 2451/00 (2013.01); C08L 23/0815 (2013.01); C08L 23/12 (2013.01)

(58) Field of Classification Search
None
See application file for complete search history.

(56) References Cited

U.S. PATENT DOCUMENTS

| | | |
|---|---|---|
| 5,068,155 A | 11/1991 | Yamada et al. |
| 5,811,185 A | 9/1998 | Schreck et al. |
| 6,284,355 B1 | 9/2001 | Nagata et al. |
| 8,431,234 B2 | 4/2013 | Koehn et al. |
| 2002/0150763 A1 | 10/2002 | Silagy et al. |
| 2004/0121176 A1 | 6/2004 | Yamanaka et al. |
| 2005/0260427 A1 | 11/2005 | Kochem et al. |
| 2008/0044617 A1 | 2/2008 | Schmitz et al. |
| 2009/0011183 A1 | 1/2009 | Kochem et al. |
| 2010/0255287 A1 | 10/2010 | Schmitz et al. |
| 2010/0326590 A1 | 12/2010 | Roth et al. |
| 2011/0052929 A1 | 3/2011 | Nairn et al. |
| 2011/0268934 A1 | 11/2011 | Tews et al. |
| 2013/0108827 A1 | 5/2013 | Okada et al. |
| 2013/0134625 A1 | 5/2013 | Schmitz et al. |
| 2013/0264091 A1 | 10/2013 | Watanabe et al. |
| 2014/0162032 A1 | 6/2014 | Egashira et al. |
| 2015/0321452 A1 | 11/2015 | Egashira |
| 2015/0322250 A1 | 11/2015 | Katsuno et al. |
| 2016/0185945 A1 | 6/2016 | Katsuno et al. |

(Continued)

FOREIGN PATENT DOCUMENTS

| | | |
|---|---|---|
| CN | 103702820 A | 4/2014 |
| EP | 0 695 630 A1 | 2/1996 |
| EP | 2 520 428 A1 | 11/2012 |

(Continued)

OTHER PUBLICATIONS

International Search Report dated Oct. 31, 2017, in PCT/JP2017/028143 filed on Aug. 2, 2017.
Combined Chinese Office Action and Search Report dated Mar. 19, 2020, in Patent Application No. 201780048670.2 (with English translation), 16 pages.
European Office Action dated Dec. 16, 2021 in European Patent Application No. 17837042.5, 41 pages.
D. Rosato Plastics Encyclopedia and Dictionary 1993, pp. 755 to 776.

(Continued)

*Primary Examiner* — Sheeba Ahmed
(74) *Attorney, Agent, or Firm* — Oblon, McClelland, Maier & Neustadt, L.L.P.

(57) ABSTRACT

This decorative film is to be bonded to a resin molded body by means of thermoforming, and comprises a sealing layer (I) that contains a polypropylene resin (A) and a layer (II) that contains a polypropylene resin (B). The polypropylene resin (A) satisfies the requirement (a1), while the polypropylene resin (B) satisfies the requirement (b1). (a1) The melt flow rate (MFR (A)) (at 230° C. under a load of 2.16 kg) is more than 0.5 g/10 minutes. (b1) The melt flow rate (MFR (B)) (at 230° C. under a load of 2.16 kg) and the MFR (A) satisfy relational expression (b-1). MFR (B)<MFR (A) (b-1).

25 Claims, 3 Drawing Sheets

(56) References Cited

U.S. PATENT DOCUMENTS

2018/0126697 A1* 5/2018 Poloso .................. B32B 7/02

FOREIGN PATENT DOCUMENTS

| | | | |
|---|---|---|---|
| JP | 51-114482 | A | 10/1976 |
| JP | 62-263039 | A | 11/1987 |
| JP | 3-83639 | A | 4/1991 |
| JP | 10-67080 | A | 3/1998 |
| JP | 11-221888 | A | 8/1999 |
| JP | 11-221889 | A | 8/1999 |
| JP | 2000-38459 | A | 2/2000 |
| JP | 2001-162743 | A | 6/2001 |
| JP | 2002-67137 | A | 3/2002 |
| JP | 2002-234121 | A | 8/2002 |
| JP | 2002-283506 | A | 10/2002 |
| JP | 2002-361812 | A | 12/2002 |
| JP | 2003-103729 | A | 4/2003 |
| JP | 2006-116895 | A | 5/2006 |
| JP | 2006-321124 | A | 11/2006 |
| JP | 2008-101091 | A | 5/2008 |
| JP | 2008-195959 | A | 8/2008 |
| JP | 2010-105197 | A | 5/2010 |
| JP | 2010-280142 | A | 12/2010 |
| JP | 2011-16258 | A | 1/2011 |
| JP | 4916574 | B1 | 4/2012 |
| JP | 2012-233066 | A | 11/2012 |
| JP | 2013-14027 | A | 1/2013 |
| JP | 2013-503756 | A | 2/2013 |
| JP | 2013-199098 | A | 10/2013 |
| JP | 2013-208749 | A | 10/2013 |
| JP | 2013-240992 | A | 12/2013 |
| JP | 2014-124940 | A | 7/2014 |
| JP | 2014-132068 | A | 7/2014 |
| JP | 2014-177086 | A | 9/2014 |
| JP | 2014-198415 | A | 10/2014 |
| JP | 2016-23268 | A | 2/2016 |
| JP | 2017-66373 | A | 4/2017 |
| JP | 6943044 | B2 | 9/2021 |
| KR | 10-2013-0058667 | A | 6/2013 |
| WO | WO 97/30903 | A1 | 8/1997 |
| WO | WO 98/32598 | A1 | 7/1998 |
| WO | WO 2004/014650 | A1 | 2/2004 |
| WO | WO 2005/100019 | A2 | 10/2005 |
| WO | WO 2006/040057 | A1 | 4/2006 |
| WO | WO 2006/057361 | A1 | 6/2006 |
| WO | WO 2009/010178 | A1 | 1/2009 |
| WO | WO 2010/081682 | A1 | 7/2010 |
| WO | WO 2011/129080 | A1 | 10/2011 |

OTHER PUBLICATIONS

Tafmer XM 7070 showing data available as of the end of Dec. 2011, 1 page.
Lyondellbasell Moplen HP522H, 2014, 2 pages.
Saechtling Kunststoff Taschenbuch 1995, chapter 4.1.5 polypropylene, pp. 366 to375 with cover pages.
Treofan Crystal GEA Sep. 2012, 1 page.
Ineos Olefins & Polymers Europe ELTEXP KS 357, Nov. 2013, 2 pages.
Sabic PP 525P-PP homopolymer for Thermoforming Sep. 1, 2014, 2 pages.
Test Report: DSC measurements, 5 pages.
E-mail from Annick Libotte dated Dec. 3, 2021, 1 page.
Preparation of batch No. 1009024386, 1 page.
Preparation of batch No. 1009024511, 1 page.
Preparation of batch No. 1009024769, 1 page.
Traceability tool: selection of MR characteristics, 1 page.
Machine journal, 2 pages.
Sales information(D25), 2015, 1 page.
Sales information(D25a), 2015, 3 pages.
Invoice 90260459, 2015, 1 page.
Receipt of payment for Invoice 90260459, 1 page.
Invoice 90261476, 1 page.
Receipt of payment for Invoice 90261476, 1 page.
Invoice 90260650, 2015, 1 page.
Receipt of payment for Invoice 90260650, 2015, 1 page.
Invoice 90310490, 2016, 2 pages.
Receipt of payment for Invoice 90310490, 2016, 1 page.
Invoice 90304628, 1 page.
Receipt of payment for Invoice 90304628, 2016, 1 page.
Form for documentation Sep. 2016, 1 page.
TDS Ineos Eltex P KS414 Nov. 2013, 2 pages.
"Traceability tool: selection of MR characteristics" 2, 2016, 1 page.
Preparation of batch No. 1010429670, 1 page.
Test Report: DSC measurements 2, 2016, 2 pages.
Form for documentation May 16, 2014, 1 page.
Treofan Injection Moulding Films White Voided EUH Feb. 2016, 1 page.
Sales information 2, 5 pages.
Japanese Office Action dated Mar. 2, 2021 in Japanese Patent Application No. 2017-160879 (with unedited computer generated English translation), 6 pages.
Japanese Office Action dated Mar. 9, 2021 in Japanese Patent Application No. 2017-160882 (with unedited computer generated English translation), 6 pages.
Japanese Office Action dated Mar. 8, 2021 in Japanese Patent Application No. 2017-132598 (with unedited computer generated English translation), 6 pages.
Japanese Office Action dated Mar. 8, 2021 in Japanese Patent Application No. 2017-132599 (with unedited computer generated English translation), 8 pages.
Japanese Office Action dated Mar. 8, 2021 in Japanese Patent Application No. 2017-161383 (with unedited computer generated English translation), 6 pages.
Chinese Office Action dated Nov. 4, 2020 in Patent Application No. 201780048670.2 (with English translation), 10 pages.
Extended European Search Report dated Feb. 7, 2020 in Patent Application No. 17837042.5, 8 pages.
Japanese Office Action dated Sep. 15, 2021 in Japanese Patent Application No. 2017-132598 (with English translation), 8 pages.
Chinese Office Action dated Jun. 19, 2020 in Patent Application No. 201780048670.2 (with English translation), 9 pages.
Japanese Office Action dated Jun. 14, 2022 in Japanese Patent Application No. 2021-133099 (with unedited computer generated English translation), 8 pages.
Japanese Office Action dated Oct. 4, 2022, in Japanese Patent Application 2021-133099 (with English-language translation).

* cited by examiner

DECORATIVE FILM AND METHOD FOR PRODUCING DECORATIVE MOLDED BODY USING SAME

TECHNICAL FIELD

The present invention relates to a decorative film for sticking on a resin molded body by thermoforming and a method for producing a decorative molded body using the decorative film. More specifically, it relates to a decorative film for sticking on a resin molded body by thermoforming, which can suppress shrinkage and breakage of the film after thermoforming, can exhibit sufficient adhesive strength to the resin molded body, and has less damage to the film, such as fading of crimps at the thermoforming, and migration of additive(s) contained in the film to the outside of the film at the thermoforming, and a method for producing a decorative molded body using the decorative film.

BACKGROUND ART

In recent years, owing to a request for reducing VOC (volatile organic compound) and the like, there has increased the demand for a decorative technique instead of coating, so that various decorative techniques have been proposed.

Especially, there has been proposed a technique of forming a decorative molded article in which a decorative film and a molded body are integrated by applying the decorative film instead of a coated film to the molded body by vacuum pressure forming or vacuum forming (e.g., see Patent Document 1), and recently, it has particularly come to draw attention.

Since the decorative forming by vacuum pressure forming and vacuum forming, freedom of shape is large as compared with the other decorative forming represented by insert forming, appearance is excellent owing to no generation of a seam since the edge of the decorative film is wound to the back side of an decoration object, and thermoforming can be performed at relatively low temperature and low pressure, the decorative forming has an advantage of excellent in reproducibility of crimps or the like on the surface of the decorative molded body by applying the crimps or the like on the surface of a decorative film.

In such decorative forming by vacuum pressure forming and vacuum forming, at the time of sticking the decorative film and the molded body, there are problems that film breakage and/or wrinkle are generated on the decorative film and adhesive strength between the decorative film and the molded body is not sufficiently obtained. Moreover, as a layer for improving the adhesive strength, the use of an adhesive, a tackifier, or the like has been proposed but the use has problems that they are expensive, the layer configuration becomes extremely complex, solvent resistance and heat resistance are insufficient, and the like.

For such problems, there is proposed that, by applying a decorative film having an adhesive layer containing a polypropylene-based resin to a substrate (molded body) composed of a propylene-based resin, the decorative film and the molded body are thermally fused (e.g., see Patent Documents 2 and 3). The inventions disclosed in Patent Documents 2 and 3 use the polypropylene-based resin as an adhesive layer of the decorative film but actually, it is necessary to provide further layers of an acrylic resin, a polyurethane resin, a polycarbonate, and the like as a surface layer, a bonding layer, and/or a bulk layer on the adhesive layer. The thermoformability such as a draw-down property is expressed by combining heterogeneous raw materials as such, the thermoformability cannot be secured in a decorative film composed of a polypropylene-based resin that does not contain the heterogeneous raw materials, holes, wrinkles, and entrainment of air are prone to be generated on the surface of a molded article on which the film is stuck, and further, breakage of the film is generated, so that a decorative molded body excellent in appearance cannot be obtained. Particularly, in the case where a polyurethane resin is contained as a heterogeneous raw material, the polyurethane resin that is a thermosetting resin does not melt at the time of heating, so that the form of the film is easily kept and thermoformability is remarkably enhanced but there is a problem that recyclability is extremely low.

That is, in the decorative films described in Patent Documents 2 and 3, there are problems that they contain heterogeneous raw materials for securing thermoformability such as adhesiveness and appearance, layer configuration is complex and many steps are required for the production thereof, and it is difficult to recycle the decorative film where the heterogeneous raw materials are combined.

Furthermore, there is a problem that a phenomenon of fading of crimps, i.e., disappearance of crimps and the like on the film surface is generated through heating and melting of the film at the time of thermoforming.

Moreover, the decorative thermoforming by vacuum pressure forming and vacuum forming has an advantage that a molded article having high integrity between the substrate formed by a step of injection molding or the like and the decorative film but, on the other hand, there is a problem that the decorative film picks up the scratches formed on the surface of the substrate and appearance defects owing to the influence of the scratches formed on the substrate surface is prone to occur on the surface of the decorative molded body.

CITATION LIST

Patent Literature

Patent Document 1: JP-A-2002-67137
Patent Document 2: JP-A-2013-14027
Patent Document 3: JP-A-2014-124940

SUMMARY OF INVENTION

Technical Problem

In conventional techniques, there has not yet attained a decorative film composed of a propylene-based resin, which can achieve both of excellent adhesiveness and appearance. In consideration of the above problems, an object of the present invention is to provide a decorative film to be used for three-dimensional decorative thermoforming, which can achieve both of sufficient adhesive strength and product appearance, exhibits less fading of crimps, is capable of reducing product defects by making scratches of a substrate inconspicuous, and facilitates recycling, and a method for producing a decorative molded body using the decorative film.

Solution to Problem

In the three-dimensional decorative thermoforming, for sticking a solid-state decorative film to a solid-state resin molded body, it is necessary to soften or melt the surface of the molded body and the film sufficiently. Therefore, it becomes important to add heat quantity necessary for softening or melting the surface of the molded body and the film or to use a molded body and film which are easy to be softened or melted. On the other hand, when the film is heated too much, viscosity of the film decreases and the film is broken or violently moved by protrusion of the molded body in the three-dimensional decorative thermoforming step and in-flow of air at the time of returning the vacuum chamber to atmospheric pressure, thus leading to appearance defects. Also, when the film is heated too much, the additives contained in the film migrate to the outside of the film, so that there occurs a problem of a decrease in imparted functions derived from the additives, such as heat resistance, weather resistance, and nucleating performance. Furthermore, there occurs a problem that the fading of crimps is prone to be generated. Accordingly, the present inventors have studied the configuration of the decorative film for not only solving these problems but also, in addition, making the scratches formed on the substrate surface inconspicuous.

As a result, by configuring a decorative film through combining a sealing layer (I) composed of a resin composition containing a polypropylene-based resin (A) that satisfies a specific requirement and a layer (II) composed of a resin composition containing a polypropylene-based resin (B) that satisfies a specific requirement, satisfactory adhesive strength is exhibited due to the sealing layer (I) and an decrease in the viscosity of the whole film is suppressed and maintenance of thermoformability and suppression of fading of crimps are attained due to the layer (II), so that it has been found that the above problems can be solved.

Specifically, it has been found that the problems can be solved by (1) a combination of a sealing layer (I) composed of a resin composition containing the polypropylene-based resin (A) that can exhibit satisfactory adhesive strength through sufficient melting and relaxation and a layer (II) composed of a resin composition containing the polypropylene-based resin (B) that suppresses an decrease in the viscosity of the whole film and attains the maintenance of thermoformability and the suppression of fading of crimps, (2) a combination of a sealing layer (I) composed of a resin composition that can exhibit satisfactory adhesive strength, which contains the polypropylene-based resin (A) and an ethylene-α-olefin random copolymer (C) as main components, and a layer (II) composed of a resin composition containing the polypropylene-based resin (B) that suppresses an decrease in the viscosity of the whole film and attains the maintenance of thermoformability and the suppression of fading of crimps, (3) a combination of a sealing layer (I) composed of a resin composition that can exhibit satisfactory adhesive strength, which contains the polypropylene-based resin (A) and a thermoplastic elastomer (D) as main components, and a layer (II) composed of a resin composition containing the polypropylene-based resin (B) that suppresses an decrease in the viscosity of the whole film and attains the maintenance of thermoformability and the suppression of fading of crimps, (4) a combination of a sealing layer (I) composed of a resin composition that can exhibit satisfactory adhesive strength, which contains the polypropylene-based resin (A) and a specific thermoplastic resin (E) as main components, and a layer (II) composed of a resin composition containing the polypropylene-based resin (B) that suppresses an decrease in the viscosity of the whole film and attains the maintenance of thermoformability and the suppression of fading of crimps, and (5) a combination of a sealing layer (I) composed of a resin composition containing a propylene-ethylene block copolymer (F) that can exhibit satisfactory adhesive strength and a layer (II) composed of a resin composition containing the polypropylene-based resin (B) that suppresses an decrease in the viscosity of the whole film and attains the maintenance of thermoformability and the suppression of fading of crimps.

Furthermore, surprisingly, such a decorative film has a high effect of making scratches inconspicuous and thus, they have accomplished the present invention.

That is, the present invention includes the following.

[1]

A decorative film for sticking on a resin molded body by thermoforming, comprising:

a sealing layer (I) containing a polypropylene-based resin (A); and a layer (II) containing a polypropylene-based resin (B), wherein the polypropylene-based resin (A) satisfies the following requirement (a1) and the polypropylene-based resin (B) satisfies the following requirement (b1):

(a1) the melt flow rate (at 230° C., a load of 2.16 kg) (MFR(A)) is more than 0.5 g/10 minutes, (b1) the melt flow rate (at 230° C., a load of 2.16 kg) (MFR(B)) and MFR(A) satisfy a relational expression (b-1);

$$MFR(B)<MFR(A) \qquad \text{Expression (b-1).}$$

[2]

The decorative film according to claim 1, wherein the polypropylene-based resin (A) further satisfies the following requirements (a2) to (a4), and the polypropylene-based resin (B) further satisfies the following requirement (b2):

(a2) the polypropylene-based resin (A) is a metallocene catalyst-based propylene-based polymer, (a3) the melting peak temperature (Tm(A)) is lower than 150° C., (a4) the molecular weight distribution (Mw/Mn(A)) obtained by GPC measurement is 1.5 to 3.5, (b2) the melting peak temperature (Tm(B)) and Tm(A) satisfy a relational expression (b-2);

$$Tm(B)>Tm(A) \qquad \text{Expression (b-2).}$$

[3]

The decorative film according to claim 1, wherein the polypropylene-based resin (A) further satisfies the following requirement (a5), and the polypropylene-based resin (B) further satisfies the following requirement (b3):

(a5) the crystallization temperature (Tc(A)) is lower than 100° C., (b3) the crystallization temperature (Tc(A)) and (Tc(B)) satisfy a relational expression (b-3);

$$Tc(B)>Tc(A) \qquad \text{Expression (b-3).}$$

[4]

The decorative film according to claim 1, wherein the sealing layer (I) is composed of a resin composition (X3) in which the weight ratio of the propylene-based resin (A) to an ethylene-α-olefin random copolymer (C) is 97:3 to 5:95, and the ethylene-α-olefin random copolymer (C) satisfies the following requirements (c1) to (c3):

(c1) the ethylene content [E(C)] is 65% by weight or more, (c2) the density is 0.850 to 0.950 g/cm$^3$, (c3) the melt flow rate (230° C., a load of 2.16 kg) (MFR(C)) is 0.1 to 100 g/10 minutes.

[5]

The decorative film according to claim 1, wherein the sealing layer (I) is composed of a resin composition (X4) in which the weight ratio of the propylene-based resin (A) to a thermoplastic elastomer (D) is 97:3 to 5:95, and the thermoplastic elastomer (D) satisfies the following requirements (d1) to (d3):

(d1) the thermoplastic elastomer (D) is a thermoplastic elastomer in which at least one of propylene and butene is a main component, (d2) the density is 0.850 to 0.950 g/cm$^3$, (d3) the melt flow rate (230° C., a load of 2.16 kg) (MFR(D)) is 0.1 to 100 g/10 minutes.

[6]

The decorative film according to claim 1, wherein the sealing layer (I) is composed of a resin composition (X5) in which the weight ratio of the propylene-based resin (A) and a thermoplastic resin (E) is 97:3 to 5:95 and the thermoplastic resin (E) satisfies the following requirement (e1), and the resin composition (X5) satisfies the following requirement (x1):

(e1) the thermoplastic resin (E) contains at least one of an alicyclic hydrocarbon group and an aromatic hydrocarbon group, (x1) the isothermal crystallization time (t(X)) (second) of the resin composition (X5) determined by a differential scanning calorimeter (DSC) satisfies the following expression (x-1);

$$t(X) \geq 1.5 \times t(A) \qquad \text{Expression (x-1)}$$

wherein t(A) represents isothermal crystallization time (second) of the polypropylene-based resin (A) measured at a temperature 10° C. higher than the crystallization initiation temperature of the propylene-based resin (A) and t(X) is isothermal crystallization time (second) of the resin composition (X5) measured at a temperature that is 10° C. higher than the crystallization initiation temperature of the propylene-based resin (A).

[7]

The decorative film according to claim 1, wherein the sealing layer (I) contains a propylene-ethylene block copolymer (F) that satisfies the following requirements (f1) and (f2):

(f1) the melting peak temperature (Tm(F)) is 110 to 170° C., (f2) the propylene-ethylene block copolymer (F) contains 5 to 97% by weight of a component (F1) composed of propylene homopolymer or a propylene-ethylene random copolymer and 3 to 95% by weight of a component (F2) composed of a propylene-ethylene random copolymer having an ethylene content larger than that of the component (F1).

[8]

The decorative film according to the above [2] or [3], wherein the polypropylene-based resin (A) is a propylene-α-olefin copolymer.

[9]

The decorative film according to the above [2], wherein the above Tm(A) is 140° C. or lower.

[10]

The decorative film according to claim 4, wherein the ethylene-α-olefin random copolymer (C) further satisfies at least one of the following requirements (c4) and (c5):

(c4) the melting peak temperature (Tm(C)) is 30 to 130° C. and (c5) the ethylene-α-olefin random copolymer (C) is a random copolymer of ethylene and an α-olefin having 3 to 20 carbon atoms.

[11]

The decorative film according to the above [5], wherein the thermoplastic elastomer (D) is at least one copolymer selected from the group consisting of a propylene-ethylene copolymer having an ethylene content of less than 50 wt %, a butene-ethylene copolymer having an ethylene content of less than 50%, a propylene-ethylene-butene copolymer having an ethylene content of less than 50 wt %, a propylene-butene copolymer, and butene homopolymer.

[12]

The decorative film according to claim 5 or 11, wherein the thermoplastic elastomer (D) further satisfies the following requirement (d4):

(d4) the melting peak temperature (Tm(D)) is 30 to 170° C.

[13]

The decorative film according to the above [6], wherein the thermoplastic resin (E) is a styrene-based elastomer.

[14]

The decorative film according to the above [6], wherein the thermoplastic resin (E) is an alicyclic hydrocarbon resin.

[15]

The decorative film according to claim 7, wherein the propylene-ethylene block copolymer (F) further satisfies at least one of the following requirements (f3) to (f5):

(f3) the ethylene content in the propylene-ethylene block copolymer (F) is 0.15 to 85% by weight, (f4) the ethylene content of the component (F1) is in the range of 0 to 6% by weight, (f5) the ethylene content of the component (F2) is in the range of 5 to 90% by weight.

[16]

A method for producing a decorative molded body comprising:

preparing the decorative film according to any one of claims 1 to 15, preparing a resin molded body, setting the resin molded body and the decorative film in a pressure-reducible chamber box, reducing the pressure in the chamber box, heating and softening the decorative film, pushing the decorative film onto the resin molded body, and returning the inside of the pressure-reduced chamber box to atmospheric pressure or pressurizing the inside.

[17]

The method for producing a decorative molded body according to the above [16], wherein the resin molded body is composed of a polypropylene-based resin composition.

Advantageous Effects of Invention

According to the decorative film of the present invention, it is possible to obtain a decorative film which has satisfactory three-dimensional decorative thermoformability, suppresses fading of crimps since adhesive force to a molded body is high and sticking to the molded body is possible for a short period of time, can make appearance of a three-dimensional decorative molded body satisfactory since scratches on the surface of the molded body can be made inconspicuous, and has good recyclability.

According to the method for producing a decorative film of the present invention, it is possible to obtain a beautiful decorative molded body where holes and wrinkles are not present on the surface, air is not entrained between the decorative film and the resin molded body, reproducibility of texture such as crimps is satisfactory, and scratches are not inconspicuous. Moreover, the decorative film can be beautifully stuck onto a resin molded body to which adhesion is hitherto difficult. Furthermore, since the constituting materials of the decorative film are polypropylene-based resins and do not contain or may not contain a thermosetting resin layer, even when the thus-obtained decorative molded body is recycled, an decrease in appearance and performance is small and thus it has high recycling suitability

DESCRIPTION OF EMBODIMENTS

Figure 1A:
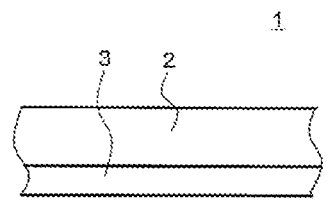
FIG. 1A to FIG. 1C are drawings showing examples of layer configuration of the decorative film of the present invention.

In the present Description, the decorative film means a film for decorating a molded body. The decorative forming means forming of sticking the decorative film to the molded body. The three-dimensional decorative thermoforming means forming of sticking the decorative film to the molded body, which has a step of thermoforming the decorative film along the sticking face of the molded body and simultaneously sticking the film, the step being a step of performing the thermoforming under reduced pressure (vacuum) for suppressing the entrainment of air between the decorative film and the molded body, sticking the heated decorative film to the molded body, and closely adhering them through pressure release (pressurization).

Further, herein, MFR of each of the polypropylene-based resin and the polypropylene-based resin composition is measured under conditions of 230° C. and a load of 2.16 kg in accordance with ISO 1133:1977 Conditions M. The unit is g/10 minutes.

Moreover, Mn and Mw of the polypropylene-based resin are described in "Kobunshi no Kiso" (edit by The Society of Polymer Science, Japan, Tokyo Kagaku Dojin, 1978) and the like and is a value to be calculated from a molecular weight distribution curve measured on GPC.

Furthermore, herein, the unit "wt %" means % by weight.

The following will explain embodiments for carrying out the present invention in detail.

The decorative film of the present invention is a decorative film for sticking on a resin molded body by thermoforming. In a basic embodiment, the decorative film includes a sealing layer (I) containing a polypropylene-based resin (A) and a layer (II) containing a polypropylene-based resin (B) and is characterized in that the polypropylene-based resin (A) satisfies the following requirement (a1) and the polypropylene-based resin (B) satisfies the following requirement (b1):

(a1) melt flow rate (at 230° C., a load of 2.16 kg) (MFR(A)) is more than 0.5 g/10 minutes;

(b1) melt flow rate (at 230° C., a load of 2.16 kg) (MFR(B)) and MFR(A) satisfy a relational expression (b-1):

$$MFR(B) < MFR(A)$$ Expression (b-1).

In the first embodiment, it is preferable that the polypropylene-based resin (A) further satisfies the requirements (a2) to (a4) and the polypropylene-based resin (B) further satisfies the requirement (b2):

(a2) it is a metallocene catalyst-based propylene-based polymer, (a3) melting peak temperature (Tm(A)) is lower than 150° C., (a4) molecular weight distribution (Mw/Mn(A)) obtained by GPC measurement is 1.5 to 3.5, and (b2) melting peak temperature (Tm(B)) and Tm(A) satisfy a relational expression (b-2):

$$Tm(B) > Tm(A)$$ Expression (b-2).

In the second embodiment, it is preferable that the polypropylene-based resin (A) further satisfies the following requirement (a5) and the polypropylene-based resin (B) further satisfies the following requirement (b3):

(a5) crystallization temperature (Tc(A)) is lower than 100° C.;

(b3) crystallization temperature (Tc(B)) and (Tc(A)) satisfy a relational expression (b-3):

$$Tc(B) > Tc(A)$$ Expression (b-3).

In the third embodiment, it is preferable that the sealing layer (I) is composed of a resin composition (X3) in which the weight ratio of the polypropylene-based resin (A) to an ethylene-α-olefin random copolymer (C) is 97:3 to 5:95 and the ethylene-α-olefin random copolymer (C) satisfies the following requirements (c1) to (c3):

(c1) ethylene content [E(C)] is 65% by weight, (c2) density is 0.850 to 0.950 g/cm$^3$, and (c3) melt flow rate (230° C., a load of 2.16 kg) (MFR(C)) is 0.1 to 100 g/10 minutes.

In the fourth embodiment, it is preferable that the sealing layer (I) is composed of a resin composition (X4) in which the weight ratio of the polypropylene-based resin (A) to a thermoplastic elastomer (D) is 97:3 to 5:95 and the thermoplastic elastomer (D) satisfies the following requirements (d1) to (d3):

(d1) it is a thermoplastic elastomer in which at least one of propylene and butene is a main component, (d2) density is 0.850 to 0.950 g/cm$^3$, and (d3) melt flow rate (230° C., a load of 2.16 kg) (MFR(D)) is 0.1 to 100 g/10 minutes.

In the fifth embodiment, it is preferable that the sealing layer (I) is composed of a resin composition (X5) in which the weight ratio of the polypropylene-based resin (A) to a thermoplastic resin (E) is 97:3 to 5:95 and the thermoplastic resin (E) satisfies the following requirement (e1) and the resin composition (X5) satisfies the following requirement (x1):

(e1) it contains at least one of an alicyclic hydrocarbon group and an aromatic hydrocarbon group;

(x1) isothermal crystallization time (t(X)) (second) of the resin composition (X5) determined by a differential scanning calorimeter (DSC) satisfies the following expression (x-1):

$$t(X) \geq 1.5 \times t(A)$$ Expression (x-1)

wherein t(A) represents isothermal crystallization time (second) of the polypropylene-based resin (A) measured at a temperature 10° C. higher than the crystallization initiation temperature of the polypropylene-based resin (A) and t(X) is isothermal crystallization time (second) of the resin composition (X5) measured at a temperature that is 10° C. higher than the crystallization initiation temperature of the polypropylene-based resin (A).

In the sixth embodiment, it is preferable that the sealing layer (I) contains a propylene-ethylene block copolymer (F) that satisfies the following requirements (f1) and (f2).

(f1) melting peak temperature (Tm(F)) is 110 to 170° C. and (f2) it contains 5 to 97% by weight of a component (F1) composed of propylene homopolymer or a propylene-ethylene random copolymer and 3 to 95% by weight of a propylene-ethylene random copolymer having an ethylene content larger than that of the component (F1).

[Sealing Layer (I)]

The decorative film of the present invention includes the sealing layer (I) composed of a resin composition (X) containing a polypropylene-based resin (A). The sealing layer (I) is a layer which comes into contact with the resin molded body (substrate) at the time of three-dimensional decorative thermoforming. By providing the sealing layer, scratches formed on the substrate surface are made inconspicuous.

The following will specifically explain the configuration of the sealing layer (I) using the above-described basic embodiment and the first to sixth embodiments as examples.

Basic Embodiment

In a basic embodiment, the sealing layer (I) contains a polypropylene-based resin (A). In the basic embodiment, the polypropylene-based resin (A) is preferably a resin that easily relaxes. By providing the sealing layer (I) containing such a polypropylene-based resin (A), generation of holes, wrinkles, entrainment of air, and the like can be suppressed on the surface of the decorative molded body and scratches formed on the substrate surface can be made inconspicuous.

<<Polypropylene-Based Resin (A)>>

1. Melt Flow Rate (MFR(A)): (a1)

In the basic embodiment, the melt flow rate (230° C., a load of 2.16 kg) of the polypropylene-based resin (A) MFR(A) necessarily exceeds 0.5/10 minutes, and is preferably 1 g/10 minutes or more, more preferably 2 g/10 minutes or more. In the above range, the relaxation at the time of three-dimensional decorative thermoforming sufficiently proceeds and sufficient adhesive strength can be exhibited. An upper limit of MFR(A) is not limited but is preferably 100 g/10 minutes or less. In the above range, deterioration of the adhesive strength by a decrease in physical properties does not occur.

2. Resin Composition

The polypropylene-based resin (A) in the basic embodiment may be a resin polymerized by means of a Ziegler catalyst, a metallocene catalyst, or the like. That is, the polypropylene-based resin (A) may be a Ziegler catalyst-based propylene polymer or a metallocene catalyst-based propylene polymer.

As the polypropylene-based resin (A) in the basic embodiment, there may be selected one of various types of propylene-based polymers such as propylene homopolymer (homopolypropylene), a propylene-α-olefin copolymer (random polypropylene), or a propylene block copolymer (block polypropylene) or a combination thereof. The polypropylene-based polymer preferably contains 50 mol % or more of a polymerization unit derived from a propylene monomer. The propylene-based polymer preferably do not contain a polymerization unit derived from a polar group-containing monomer.

First Embodiment

In the first embodiment, the sealing layer (I) is composed of a resin composition (X1) containing a polypropylene-based resin (A). In the first embodiment, the polypropylene-based resin (A) is preferably a resin that easily melts and relaxes. By providing the sealing layer (I) composed of the resin composition (X1) containing such a polypropylene-based resin (A), generation of holes, wrinkles, entrainment of air, and the like can be suppressed on the surface of the decorative molded body and scratches formed on the substrate surface can be made inconspicuous.

<<Polypropylene-Based Resin (A)>>

1. Melt Flow Rate (MFR(A)): (a1)

In the first embodiment, the melt flow rate (230° C., a load of 2.16 kg) MFR(A) of the polypropylene-based resin (A) necessarily exceeds 0.5 g/10 minutes, and is preferably 1 g/10 minutes or more, more preferably 2 g/10 minutes or more. In the above range, relaxation at the time of three-dimensional decorative thermoforming sufficiently proceeds and sufficient adhesive strength can be exhibited. An upper limit of MFR(A) is not limited but is preferably 100 g/10 minutes or less. In the above range, deterioration of the adhesive strength by a decrease in physical properties does not occur.

2. Molecular Weight Distribution (Mw/Mn(A)): (a4)

Mw/Mn of the polypropylene-based resin (A) is preferably 1.5 to 3.5, more preferably 2 to 3. In the above range, the amount of components having relatively long relaxation time is small and sufficient relaxation is prone to occur, so that the range is preferred.

3. Melting Peak Temperature (Tm(A)): (a3)

The melting peak temperature of the polypropylene-based resin (A) (DSC melting peak temperature, herein, there is a case where it is referred to as "melting point") (Tm(A)) is preferably lower than 150° C., more preferably 145° C. or lower, further preferably 140° C. or lower, particularly preferably 130° C. or lower. In the above range, sufficient adhesive strength can be exhibited. When Tm(A) lowers too much, heat resistance decreases and there is a case where a problem may occur in the use of the molded body, so that Tm(A) is preferably 100° C. or higher, more preferably 110° C. or higher.

4. Resin Composition: (a2)

The polypropylene-based resin (A) in the first embodiment is preferably a so-called metallocene catalyst-based propylene-based polymer that is polymerized by means of a metallocene catalyst. Since the metallocene catalyst has a single active site, a propylene-based polymer polymerized by means of the metallocene catalyst has narrow molecular weight distribution and crystallinity distribution and is prone to be melted and relaxed, so that it becomes possible to fuse it to a substrate without applying a large quantity of heat.

As the polypropylene-based resin (A) in the first embodiment, there may be selected one of various types of propylene-based polymers, such as propylene homopolymer (homopolypropylene), a propylene-α-olefin copolymer (random polypropylene), or a propylene block copolymer (block polypropylene), or a combination thereof. The polypropylene-based polymer preferably contains 50 mol % or more of a polymerization unit derived from a propylene monomer. The propylene-based polymer preferably do not contain a polymerization unit derived from a polar group-containing monomer.

The polypropylene-based resin (A) is preferably a propylene-α-olefin copolymer from the viewpoint of sealability. Since the propylene-α-olefin copolymer usually has lowered crystallization temperature with the lowering of the melting point as compared with propylene homopolymer, the copolymer is more prone to deform at the time of thermoforming and thus has a high effect of making scratches inconspicuous.

As the α-olefin, there can be used one selected from ethylene and α-olefins having 3 to 8 carbon atoms or a combination of two or more thereof.

Second Embodiment

In the second embodiment, the sealing layer (I) is composed of a resin composition (X2) containing a polypropylene-based resin (A). In the second embodiment, the polypropylene-based resin (A) is preferably a resin that is late in initiation of crystallization. By providing the sealing layer (I) composed of the resin composition (X2) containing such a polypropylene-based resin (A), generation of holes, wrinkles, entrainment of air, and the like can be suppressed on the surface of the decorative molded body and scratches formed on the substrate surface can be made inconspicuous.
<<Polypropylene-Based Resin (A)>>
1. Melt Flow Rate (MFR(A)): (a1)

In the second embodiment, the melt flow rate (230° C., a load of 2.16 kg) MFR(A) of the polypropylene-based resin (A) necessarily exceeds 0.5 g/10 minutes, and is preferably 1 g/10 minutes or more, more preferably 2 g/10 minutes or more. In the above range, the relaxation at the time of three-dimensional decorative thermoforming sufficiently proceeds and sufficient adhesive strength can be exhibited. An upper limit of MFR(A) is not limited but is preferably 100 g/10 minutes or less. In the above range, deterioration of the adhesive strength resulting from a decrease in physical properties does not occur.
2. Molecular Weight Distribution (Mw/Mn(A))

Mw/Mn of the polypropylene-based resin (A) is preferably 3.5 to 10, more preferably 3.7 to 7. In the above range, surface roughness is less prone to be generated at the time of film forming and surface appearance is excellent, so that the range is preferred.
3. Crystallization Temperature (Tc(A)): (a5)

The crystallization temperature of the polypropylene-based resin (A) (Tc(A)) is preferably lower than 100° C., more preferably 97° C. or lower, further preferably 93° C. or lower. In the above range, sufficient adhesive strength can be exhibited and further, sufficient concealability of scratches can be exhibited. When Tc(A) lowers too much, heat resistance decreases and there is a case where a problem may occur in the use of the molded body, so that Tc(A) is preferably 65° C. or higher, more preferably 75° C. or higher.
4. Resin Composition The polypropylene-based resin (A) in the second embodiment is preferably a resin polymerized by means of a Ziegler catalyst, a metallocene catalyst, or the like. That is, the polypropylene-based resin (A) may be a Ziegler catalyst-based propylene polymer or a metallocene catalyst-based propylene polymer.

As the polypropylene-based resin (A) in the second embodiment, there may be selected one of various types of propylene-based polymers, such as propylene homopolymer (homopolypropylene), a propylene-α-olefin copolymer (random polypropylene), and a propylene block copolymer (block polypropylene), or a combination thereof. The propylene-based polymer preferably contains 50 mol % or more of a polymerization unit derived from a propylene monomer. The propylene-based polymer preferably do not contain a polymerization unit derived from a polar group-containing monomer.

The polypropylene-based resin (A) is preferably a propylene-α-olefin copolymer from the viewpoint of sealability. Since the propylene-α-olefin copolymer usually has lowered crystallization temperature as compared with a propylene homopolymer, the copolymer is more prone to deform at the time of thermoforming and thus has a high effect of making scratches inconspicuous.

As the α-olefin, there can be used one selected from ethylene and α-olefins having 3 to 8 carbon atoms or a combination of two or more thereof.

Third Embodiment

In the third embodiment, the sealing layer (I) is composed of a resin composition (X3) containing a polypropylene-based resin (A) and an ethylene-α-olefin random copolymer (C). By providing the sealing layer (I) composed of the resin composition (X3), sufficient adhesive strength can be exhibited even when film heating time is short at the time of three-dimensional decorative thermoforming and scratches formed on the substrate surface can be made inconspicuous.
<<Polypropylene-Based Resin (A)>>

As the polypropylene-based resin (A) in the third embodiment, there may be selected one of various types of propylene-based polymers, such as propylene homopolymer (homopolypropylene), a propylene-α-olefin copolymer (random polypropylene), and a propylene block copolymer (block polypropylene), or a combination thereof. The propylene-based polymer preferably contains 50 mol % or more of a polymerization unit derived from a propylene monomer. The propylene-based polymer preferably do not contain a polymerization unit derived from a polar group-containing monomer.
1. Melt Flow Rate (MFR(A)): (a1)

The melt flow rate (230° C., a load of 2.16 kg) MFR(A) of the polypropylene-based resin (A) necessarily exceeds 0.5 g/10 minutes, and is preferably 1 g/10 minutes or more, more preferably 2 g/10 minutes or more. In the above range, relaxation at the time of three-dimensional decorative thermoforming sufficiently proceeds and sufficient adhesive strength can be exhibited. An upper limit of MFR(A) is not limited but is preferably 100 g/10 minutes or less. In the above range, deterioration of the adhesive strength resulting from a decrease in physical properties does not occur.
2. Melting Peak Temperature (Tm(A))

The melting peak temperature of the polypropylene-based resin (A) (Tm(A)) is preferably 110° C. or higher, more preferably 115° C. or higher, further preferably 120° C. or higher. In the above range, formability at the time of three-dimensional decorative thermoforming is satisfactory. An upper limit of the melting peak temperature is not limited but is preferably 170° C. or lower. In the above range, sufficient adhesive strength can be exhibited.
3. Resin Composition The polypropylene-based resin (A) in the third embodiment is preferably a resin polymerized by means of a Ziegler catalyst, a metallocene catalyst, or the like. That is, the polypropylene-based resin (A) may be a Ziegler catalyst-based propylene polymer or a metallocene catalyst-based propylene polymer.

<<Ethylene-α-Olefin Random Copolymer (C)>>

The ethylene-α-olefin random copolymer (C) to be used as an essential component in the sealing layer of the third embodiment has the following requirements (c1) to (c3), preferably further, requirements (c4) to (c5).

1. Ethylene Content [E(C)]: (e1)

The ethylene content [E(C)] of the ethylene-α-olefin random copolymer (C) of the third embodiment is preferably 65% by weight or more, more preferably 68% by weight or more, further preferably 70% by weight or more. In the above range, sufficient adhesive strength can be exhibited at the time of three-dimensional decorative thermoforming and heating time of the film can be shortened. An upper limit of the ethylene content [E(C)] is not particularly limited but is preferably 95% by weight or less.

(Calculation Method of Ethylene Content [E(C)])

The ethylene content [E(C)] of the ethylene-α-olefin random copolymer (C) can be determined from integrated intensity obtained by $^{13}$C-NMR measurement.

(Calculation Method 1 (Binary System))

First, there is described a method of calculating the ethylene content [E(C)] in a binary copolymer composed of two kinds of repeating units. In this case, the ethylene content of an ethylene-α-olefin binary copolymer can be determined according to (Expression-1).

$$\text{Ethylene content (mol \%)} = IE \times 100/(IE+IX) \quad \text{(Expression 1)}$$

Ethylene content (% by weight)=[Ethylene content (mol %)×Molecular weight of ethylene]/[Ethylene content (mol %)×Molecular weight of ethylene+α-Olefin content (mol %)×Molecular weight of α-olefin]

Here, IE and IX are integrated intensity of ethylene and integrated intensity of the α-olefin, respectively, and can be determined according to the following (Expression-2) and (Expression-3), respectively.

$$IE = (I_{\beta\beta} + I_{\gamma\gamma} + I_{\beta\delta} + I_{\gamma\delta} + I_{\delta\delta})/2 + (I_{\alpha\gamma} + I_{\alpha\delta})/4 \quad \text{(Expression-2)}$$

$$IX = I_{\alpha\alpha} + (I_{\alpha\gamma} + I_{\alpha\delta})/2 \quad \text{(Expression-3)}$$

Here, the subscripts of I of the right side indicate carbons described in the following structural formulae (a) to (d). For example, αα indicates a methylene carbon based on an α-olefin chain, and $I_{\alpha\alpha}$ represents integrated intensity of the signal of the methylene carbon based on the α-olefin chain.

[Chem 1]

Structural formula (a)

$$-\underset{\alpha\alpha}{CH(R)-CH_2-CH(R)}-$$

Structural formula (b)

$$-\underset{\alpha\gamma}{CH(R)}-\underset{\beta\beta}{CH_2-CH_2-CH_2}-\underset{\alpha\gamma}{CH(R)}-$$

Structural formula (c)

$$-\underset{\alpha\delta}{CH(R)}-\underset{\beta\delta}{CH_2}-\underset{\gamma\gamma}{CH_2-CH_2-CH_2}-\underset{\beta\delta}{CH_2}-\underset{\alpha\delta}{CH(R)}-$$

Structural formula (d)

$$-\underset{\alpha\delta}{CH(R)}-\underset{\beta\delta}{CH_2}-\underset{\gamma\delta}{CH_2}-\underset{\delta\delta}{[CH_2]_n}-\underset{\gamma\delta}{CH_2}-\underset{\beta\delta}{CH_2}-\underset{\alpha\delta}{CH_2}-CH(R)-$$

In the structural formula (d), n represents an odd number of 1 or more.

The following will describe integrated intensity to be used in (Expression-2) and (Expression-3) for each α-olefin of an ethylene-α-olefin binary copolymer.

<Case of Ethylene-Propylene Copolymer>

In the case where the α-olefin is propylene, the following values of integrated intensity are substituted into (Expression-2) and (Expression-3) to determine the ethylene content [E(C)].

$I_{\beta\beta} = I_{25.0-24.2}$
$I_{\gamma\gamma} = I_{30.8-30.6}$
$I_{\beta\delta} = I_{27.8-26.8}$
$I_{\gamma\delta} = I_{30.6-30.2}$
$I_{\delta\delta} = I_{30.2-28.0}$
$I_{\alpha\alpha} = I_{48.0-43.9}$
$I_{\alpha\gamma} + I_{\alpha\delta} = I_{39.0-36.2}$ Here, I represents integrated intensity and the subscript numerals of I of the right side indicate a range of chemical shift. For example, $I_{39.0-36.2}$ indicates integrated intensity of $^{13}$C signals detected between 39.0 ppm and 36.2 ppm.

As for the chemical shift, the $^{13}$C signal of hexamethyldisiloxane is set at 1.98 ppm and the chemical shift of the signal derived from another $^{13}$C uses it as a reference. Similarly to the case of the ethylene-propylene copolymer, the following will describe for an ethylene-1-butene copolymer, an ethylene-1-hexene copolymer, and an ethylene-1-octene copolymer.

<Case of Ethylene-1-Butene Copolymer>

In the case where the α-olefin is 1-butene, the following values of integrated intensity are substituted into (Expression-2) and (Expression-3) to determine the ethylene content [E(C)].

$I_{\beta\beta} = I_{24.6-24.4}$
$I_{\gamma\gamma} = I_{30.9-30.7}$
$I_{\beta\delta} = I_{27.8-26.8}$
$I_{\gamma\delta} = I_{30.5-30.2}$
$I_{\delta\delta} = I_{30.2-28.0}$
$I_{\alpha\alpha} = I_{39.3-38.1}$
$I_{\alpha\gamma} + I_{\alpha\delta} = I_{34.5-33.8}$ <Case of Ethylene-1-Hexene Copolymer>

In the case where the α-olefin is 1-hexene, the following values of integrated intensity are substituted into (Expression-2) and (Expression-3) to determine the ethylene content [E(C)].

$I_{\beta\beta} = I_{24.5-24.4}$
$I_{\gamma\gamma} = I_{31.0-30.8}$
$I_{\beta\delta} = I_{27.5-27.0}$
$I_{\gamma\delta} = I_{30.6-30.2}$
$I_{\delta\delta} = I_{30.2-28.0}$
$I_{\alpha\alpha} = I_{40.0-39.0}$
$I_{\alpha\gamma} + I_{\alpha\delta} = I_{35.0-34.0}$ <Case of Ethylene-1-Octene Copolymer>

In the case where the α-olefin is 1-octene, methylene carbons of the hexyl branch based on 1-octene are overlapped to the βδ signal and the αγ+αδ signal (5B6 and 6B6 in the following structural formula).

$I_{\beta\delta} + I_{5B6} = I_{27.6-26.7}$
$I_{\alpha\gamma} + I_{\alpha\delta} + I_{6B6} = I_{35.0-34.0}$

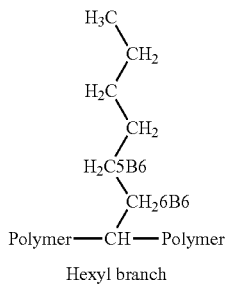

Hexyl branch

Accordingly, using $I_{\beta\delta}$ and $I_{\alpha\gamma}+I_{\alpha\delta}$ in which the overlap of 5B6 and 6B6 has been corrected as substitutes, the following values of integrated intensity are substituted into (Expression-2) and (Expression-3) to determine the ethylene content [E(C)].

$I_{\beta\beta}=I_{24.7-24.2}$
$I_{\gamma\gamma}+I_{\gamma\delta}+I_{\delta\delta}=I_{32.0-28.0}$
$I_{\beta\delta}=\frac{2}{3}\times I_{27.6-26.7}$
$I_{\alpha\alpha}=I_{40.8-39.6}$
$I_{\alpha\gamma}+I_{\alpha\delta}=I_{\beta\delta}+2\times I_{\beta\beta}$ (Calculation Method 2 (Ternary System))

Next, there is explained a method of calculating the ethylene content [E(C)] in a ternary copolymer composed of three kinds of repeating units. For example, the ethylene content of an ethylene-propylene-butene ternary copolymer can be determined according to the following (Expression-4).

Ethylene content (mol %)=$IE\times100/(IE+IP+IB)$ (Expression 4)

Ethylene content (% by weight)=[Ethylene content (mol %)×Molecular weight of ethylene]/[Ethylene content (mol %)×Molecular weight of ethylene+Propylene content (mol %)×Molecular weight of propylene+Butene content (mol %)×Molecular weight of butene]

Here, IE, IP, and IB are integrated intensity of ethylene, propylene, and butene, respectively, and can be determined according to (Expression-5), (Expression-6), and (Expression-7).

$IE=(I_{\beta\beta}+I_{\gamma\gamma}+I_{\beta\delta}+I_{\gamma\delta}+I_{\delta\delta})/2+(I_{\alpha\gamma(P)}+I_{\alpha\delta(P)}+I_{\alpha\gamma(B)}+I_{\alpha\delta(B)})/4$ (Expression-5)

$IP=\frac{1}{3}\times[I_{CH3(P)}+I_{CH(P)}+I_{\alpha\alpha(PP)}+\frac{1}{2}\times(I_{\alpha\alpha(PB)}+I_{\alpha\gamma(P)}+I_{\alpha\delta(P)})]$ (Expression-6)

$IB=\frac{1}{4}\times[I_{CH3(B)}+I_{CH(B)}+I_{2B2}+I_{\alpha\alpha(BB)})+\frac{1}{2}\times(I_{\alpha\alpha(PB)}+I_{\alpha\gamma(B)}+I_{\alpha\delta(B)}]$ (Expression-7)

Here, the subscript (P) means a signal based on the methyl group branch derived from propylene and similarly, the subscript (B) means a signal based on the ethyl group branch derived from butene.

Moreover, αα(PP) means a signal of a methylene carbon based on a propylene chain, and similarly, αα(BB) means a signal of a methylene carbon based on a butene chain and αα(PB) means a signal of a methylene carbon based on a propylene-butene chain.

Here, since the γγ signal overlaps with the skirt of the signal of a methine carbon CH of central propylene aligned as propylene-propylene-ethylene (PPE), it is difficult to separate the signal of γγ.

The γγ signal appears in the structural formula (c) containing two ethylene chains, and (Expression-8) holds between the integrated intensity of γγ derived from ethylene and the integrated intensity of βδ of the structural formula (c).

$I_{\beta\delta}$(structural formula $(c)$)=$2\times I_{\gamma\gamma}$ (Expression-8)

Moreover, βγ appears in the structural formula (d) in which three or more ethylene chains exist, and the integrated intensity of 136 of the structural formula (d) is equal to the integrated intensity of γδ and (Expression-9) holds.

$I_{\beta\delta}$=(structural formula $(d)$)=$I_{\gamma\delta}$ (Expression-9)

Accordingly, βδ based on the structural formula (c) and the structural formula (d) is determined by (Expression-10).

$I_{\beta\delta}=I_{\beta\delta}$(structural formula $(c)$)+$I_{\beta\delta}$(structural formula $(d)$)=$2\times I_{\gamma\gamma}+I_{\gamma\delta}$ (Expression-10)

That is, $I_{\gamma\gamma}=(I_{\beta\delta}-I_{\gamma\delta})/2$ (Expression-10')

Accordingly, when (Expression-10') is substituted into (Expression-5), IE can be replaced by (Expression-11).

$IE=(I_{\beta\delta}-I_{\gamma\delta})/2+(I_{\alpha\gamma(P)}+I_{\alpha\delta(P)}+I_{\alpha\gamma(B)}+I_{\alpha\delta(B)}+3\times I_{\beta\delta}+I_{\gamma\delta})/4$ (Expression-11)

Here, the βδ signal becomes (Expression-12) with correcting the overlap of ethyl branch based on 1-butene.

$I_{\beta\delta}=I_{\alpha\gamma(P)}+I_{\alpha\delta(P)}+I_{\alpha\gamma(B)}+I_{\alpha\delta(B)}-2\times I_{\beta\beta}$ (Expression-12)

From (Expression-11) and (Expression-12), IE becomes (Expression-13).

$IE=I_{\delta\delta}/2+I_{\gamma\delta}/4-I_{\beta\beta}+I_{\alpha\gamma(P)}+I_{\alpha\delta(P)}+I_{\alpha\gamma(B)}+I_{\alpha\delta(B)}$ (Expression-13)

The ethylene content is determined by substituting the following into (Expression-13), (Expression-6), and (Expression-7).

$I_{\beta\beta}=I_{25.2-23.8}$
$I_{\gamma\delta}=I_{30.4-30.2}$
$I_{\delta\delta}=I_{30.2-29.8}$
$I_{\alpha\gamma(P)}+I_{\alpha\delta(P)}=I_{39.5-37.3}$
$I_{\alpha\gamma(B)}+I_{\alpha\delta(B)}=I_{34.6-33.9}$
$I_{CD3(P)}=I_{22.6-19.0}$
$I_{CH(P)}=I_{29.5-27.6}+I_{31.2-30.4}+I_{33.4-32.8}$
$I_{\alpha\alpha(PP)}=I_{48.0-45.0}$
$I_{CH3(B)}=I_{11.4-10.0}$
$I_{CH(B)}=I_{35.5-34.7}+I_{37.4-36.8}+I_{39.7-39.6}$
$I_{\alpha\alpha(BB)}=I_{40.3-40.0}$
$I_{\alpha\alpha(PB)}=I_{44.2-42.0}$
$I_{2B2}=I_{26.7-26.4}$ Incidentally, for assigning each signal, the following five literatures are referred to.
Macromolecules, Vol. 10, No. 4, 1977,
Macromolecules, Vol. 36, No. 11, 2003,
Analytical Chemistry, Vol. 76, No. 19, 2004,
Macromolecules, 2011, 34, 4757-4767,
Macromolecules, Vol. 25, No. 1, 1992.

Also in the case where the α-olefin of the ethylene-α-olefin random copolymer is other than the aforementioned case, the ethylene content can be determined in the same manner as in the aforementioned case with assigning each signal.

2. Density: (c2)

The density of the ethylene-α-olefin random copolymer (C) is preferably 0.850 to 0.950 g/cm$^3$, more preferably 0.855 to 0.900 g/cm$_3$, further preferably 0.86 to 0.890 g/cm$^3$. In the above range, sufficient adhesive strength can be exhibited at the time of three-dimensional decorative thermoforming and further, film formability is also satisfactory.

3. Melt Flow Rate (MFR(C)): (c3)

The melt flow rate (230° C., a load of 2.16 kg) (MFR(C)) of the ethylene-α-olefin random copolymer (C) is preferably 0.1 to 100 g/10 minutes, more preferably 0.5 to 50 g/10 minutes, further preferably 1 to 30 g/10 minutes. In the above range, an effect of making the scratches formed on the substrate inconspicuous is high.

4. Melting Peak Temperature (Tm(C)): (c4)

The melting peak temperature of the ethylene-α-olefin random copolymer (C) (Tm(C)) is preferably 30 to 130° C., more preferably 35 to 120° C., further preferably 40 to 110° C. In the above range, sufficient adhesive strength can be exhibited at the time of three-dimensional decorative thermoforming.

5. Kind of Ethylene-α-Olefin Random Copolymer (C): (c5)

The ethylene-α-olefin random copolymer (C) is preferably a copolymer of ethylene and an α-olefin having 3 to 20 carbon atoms. As the α-olefin having 3 to 20 carbon atoms, there may be specifically mentioned propylene, 1-butene, 1-pentene, 1-hexene, 4-methyl-1-pentene, 1-heptene, 1-octene, 1-decene, 1-dodecene, 1-tetradecene, 1-hexadecene, 1-eicocene, and the like. Of these, particularly, propylene, 1-butene, 1-hexene, and 1-octene are preferably used.

Such an ethylene-α-olefin random copolymer (C) is produced by copolymerizing respective monomers in the presence of a catalyst. Specifically, the ethylene-α-olefin random copolymer (C) can be produced by copolymerizing ethylene and an α-olefin such as propylene, 1-butene, 1-hexene, 4-methyl-1-pentene, or 1-octene through a process such as a vapor-phase process, a solution process, a high-pressure process, or a slurry process using a catalyst such as a Ziegler catalyst, a Philips catalyst, or a metallocene catalyst as a polymerization catalyst of olefins.

Moreover, the ethylene-α-olefin random copolymer (C) to be used for the sealing layer (I) of the third embodiment can be used singly or in combination of two or more thereof within a range where the advantages of the invention are not impaired.

As commercially available products of such an ethylene-α-olefin random copolymer, there may be mentioned Kernel series manufactured by Japan Polyethylene Corporation, TAFMER-P series and TAFMER-A series manufactured by Mitsui Chemicals, Inc., Engage EG series manufactured by DowDuPont Inc., and the like.

<<Resin Composition (X3)>>

In the third embodiment, the resin composition (X3) constituting the sealing layer (I) contains a polypropylene-based resin (A) and an ethylene-α-olefin random copolymer (C) as main components, and may be a mixture of the polypropylene-based resin (A) and the ethylene-α-olefin random copolymer (C) or a melt-kneaded product thereof or a sequentially polymerized product of the polypropylene-based resin (A) and the ethylene-α-olefin random copolymer (C).

1. Weight Ratio of Polypropylene-Based Resin (A) to Ethylene-α-Olefin Random Copolymer (C)

In the resin composition (X3), the weight ratio of the polypropylene-based resin (A) to the ethylene-α-olefin random copolymer (C) ((A):(C)) is preferably selected in the range of 97:3 to 5:95 and is more preferably 95:5 to 10:90, further preferably 93:7 to 20:80. In the above range, sufficient adhesive strength can be exhibited at the time of three-dimensional decorative thermoforming, heating time of the film can be shortened, and also, the adhesiveness between the sealing layer (I) and the layer (II) is satisfactory.

Fourth Embodiment

In the fourth embodiment, the sealing layer (I) is composed of a resin composition (X4) containing a polypropylene-based resin (A) and a thermoplastic elastomer (D) as main components. By providing the sealing layer (I) composed of such a resin composition (X4), sufficient adhesive strength can be exhibited at the time of three-dimensional decorative thermoforming even when the heating time is short and further, scratches formed on the substrate surface can be made inconspicuous.

<<Polypropylene-Based Resin (A)>>

1. Melt flow rate (MFR(A)): (a1)

The melt flow rate (230° C., a load of 2.16 kg) MFR(A) of the polypropylene-based resin (A) contained in the sealing layer (I) necessarily exceeds 0.5 g/10 minutes, and is preferably 1 g/10 minutes or more, more preferably 2 g/10 minutes or more. In the above range, the relaxation at the time of three-dimensional decorative thermoforming sufficiently proceeds and sufficient adhesive strength can be exhibited, and also the scratched formed on the substrate becomes inconspicuous. An upper limit of MFR(A) is not limited but is preferably 100 g/10 minutes or less. In the above range, deterioration of the adhesive strength resulting from a decrease in physical properties does not occur.

2. Melting Peak Temperature (Tm(A))

The melting peak temperature of the polypropylene-based resin (A) (Tm(A)) is preferably 110° C. or higher, more preferably 115° C. or higher, further preferably 120° C. or higher. In the above range, formability at the time of three-dimensional decorative thermoforming is satisfactory. An upper limit of the melting peak temperature is not limited but is preferably 170° C. or lower. In the above range, sufficient adhesive strength can be exhibited.

3. Resin Composition

The polypropylene-based resin (A) in the fourth embodiment is preferably a resin polymerized by means of a Ziegler catalyst, a metallocene catalyst, or the like. That is, the polypropylene-based resin (A) may be a Ziegler catalyst-based propylene polymer or a metallocene catalyst-based propylene polymer.

As the polypropylene-based resin (A) in the fourth embodiment, there may be selected one of various types of propylene-based polymers, such as propylene homopolymer (homopolypropylene), a propylene-α-olefin copolymer (random polypropylene), or a propylene block copolymer (block polypropylene), or a combination thereof. The propylene-based polymer preferably contains 50 mol % or more of a polymerization unit derived from a propylene monomer. The propylene-based polymer preferably do not contain a polymerization unit derived from a polar group-containing monomer.

<<Thermoplastic Elastomer (D)>>

The thermoplastic elastomer (D) to be used as an essential component in the sealing layer of the fourth embodiment satisfies the following requirements (d1) to (d3), and preferably further, has a requirement (d4).

1. Composition: (d1)

The thermoplastic elastomer (D) of the present invention is a thermoplastic elastomer in which at least one of propylene and butene is a main component. Here, the term "thermoplastic elastomer in which at least one of propylene and butene is a main component" includes (i) a thermoplastic elastomer in which propylene is a main component, (ii)

a thermoplastic elastomer in which butene is a main component, and (iii) a thermoplastic elastomer in which components of propylene and butene altogether are main components.

The content of propylene or butene in the thermoplastic elastomer (D) is not particularly limited but is preferably 30 wt % or more, more preferably 40 wt % or more, further preferably 50 wt % or more. For example, the thermoplastic elastomer (D) can contain propylene or butene in an amount of more than 35 wt %.

Moreover, the thermoplastic elastomer (D) may contain both of propylene and butene and, in that case, components of propylene and butene altogether are main components of the thermoplastic elastomer (D). The total of the contents of propylene and butene is preferably 30 wt % or more, more preferably 40 wt % or more, further preferably 50 wt % or more. In the case where both of propylene and butene are contained, for example, the thermoplastic elastomer (D) can contain propylene and butene in an amount of more than 35 wt % in total. In the above range, sufficient adhesive strength can be exhibited at the time of three-dimensional decorative thermoforming, heating time of the film can be shortened, and an effect of making the scratches formed on the substrate inconspicuous is high. Incidentally, the thermoplastic elastomer in which propylene or butene is a main component has high uniform dispersibility into the polypropylene-based resin (A) and it is considered that this fact further enhances the effect of making the scratches formed on the substrate inconspicuous. Incidentally, the thermoplastic elastomer (D) may be composed of propylene or butene as a sole component.

2. Density: (d2)

The density of the thermoplastic elastomer (D) is preferably 0.850 to 0.950 g/cm$^3$, more preferably 0.855 to 0.940 g/cm$^3$, further preferably 0.86 to 0.93 g/cm$^3$. In the above range, sufficient adhesive strength can be exhibited at the time of three-dimensional decorative thermoforming, and further, film formability also becomes satisfactory.

3. Melt Flow Rate (MFR(D)): (d3)

The melt flow rate (230° C., a load of 2.16 kg) (MFR(D)) of the thermoplastic elastomer (D) is preferably 0.1 to 100 g/10 minutes, more preferably 0.5 to 50 g/10 minutes, further preferably 1 to 30 g/10 minutes. In the above range, the effect of making the scratches formed on the substrate inconspicuous is high.

4. Melting Peak Temperature (Tm(D)): (d4)

The melting peak temperature of the thermoplastic elastomer (D) (Tm(D)) is preferably 30 to 170° C., more preferably 35 to 168° C., further preferably 40 to 165° C. or higher. In the above range, sufficient adhesive strength can be exhibited at the time of three-dimensional decorative thermoforming.

The thermoplastic elastomer (D) of the present invention may be appropriately selected and used as long as it satisfies the aforementioned requirements (d1) to (d3) but is preferably a propylene-ethylene copolymer having an ethylene content of less than 50 wt %, a butene-ethylene copolymer having an ethylene content of less than 50 wt %, a propylene-ethylene-butene copolymer having an ethylene content of less than 50 wt %, a propylene-butene copolymer, or butene homopolymer.

5. Ethylene Content [E(D)]

The ethylene content [E(D)] of the propylene-ethylene copolymer, butene-ethylene copolymer or propylene-ethylene-butene copolymer is more preferably 45 wt % or less, further preferably 40 wt % or less. In the above range, sufficient adhesive strength can be exhibited at the time of three-dimensional decorative thermoforming.

(Calculation Method of Ethylene Content [E(D)])

In the case where the thermoplastic elastomer (D) is an elastomer containing ethylene, the ethylene content [E(D)] of the thermoplastic elastomer (D) can be determined from integrated intensity obtained by $^{13}$C-NMR measurement.

The calculation method is the same as "Calculation Method 1 (Binary System)" or "Calculation Method 2 (Ternary System)" mentioned in the calculation method of the ethylene content [E(C)] of the ethylene-α-olefin random copolymer (C) explained in the above third embodiment.

Moreover, the thermoplastic elastomer (D) may be a copolymer with an α-olefin other than propylene and butene as long as the copolymer does not impair the advantages of the present invention. As the α-olefin, there may be specifically mentioned ethylene, 1-pentene, 1-hexene, 4-methyl-1-pentene, 1-heptene, 1-octene, 1-decene, 1-dodecene, 1-tetradecene, 1-hexadecene, 1-eicocene, and the like. These α-olefins may be used singly or as a combination. Of these, particularly, 1-hexene and 1-octene are preferably used.

Such a thermoplastic elastomer is produced by copolymerizing respective monomers in the presence of a catalyst. Specifically, such a thermoplastic elastomer can be produced by copolymerizing α-olefins such as propylene, 1-butene, ethylene, 1-hexene, 4-methyl-1-pentene, and/or 1-octene through a process such as a vapor-phase process, a solution process, a high-pressure process, or a slurry process using a catalyst such as a Ziegler catalyst, a Philips catalyst, or a metallocene catalyst as a polymerization catalyst of olefins.

Moreover, the thermoplastic elastomer (D) to be used selectively for the sealing layer (I) of the fourth embodiment can be used singly or in combination of two or more thereof within a range where the advantages of the invention are not impaired.

As commercially available products of such a thermoplastic elastomer, there may be mentioned TAFMER-XM series, TAFMER-BL series, and TAFMER-PN series manufactured by Mitsui Chemicals, Inc., VISTAMAXX series manufactured by Exxon Mobil Chemical, Corporation, and the like.

<<Resin Composition (X4)>>

In the fourth embodiment, the resin composition (X4) constituting the sealing layer (I) contains a polypropylene-based resin (A) and a thermoplastic elastomer (D). The resin composition (X4) may be a mixture of the polypropylene-based resin (A) and the thermoplastic elastomer (D) or a melt-kneaded product thereof or a sequentially polymerized product of the polypropylene-based resin (A) and the thermoplastic elastomer (D).

1. Weight Ratio of Polypropylene-Based Resin (A) to Thermoplastic Elastomer (D)

In the resin composition (X4), the weight ratio of the polypropylene-based resin (A) to the thermoplastic elastomer (D) ((A):(D)) is preferably composed in the ratio of 97:3 to 5:95 and is more preferably 95:5 to 10:90, further preferably 93:7 to 20:80. In the above range, sufficient adhesive strength can be exhibited at the time of three-dimensional decorative thermoforming, heating time of the film can be shortened, and also, the adhesiveness between the sealing layer (I) and the layer (II) becomes satisfactory.

Fifth Embodiment

In the fifth embodiment, the sealing layer (I) is composed of a resin composition (X5) containing a polypropylene-based resin (A) and a thermoplastic resin (E). By providing the sealing layer (I) composed of such a resin composition (X5), sufficient adhesive strength can be exhibited at the time of three-dimensional decorative thermoforming even when the heating time of the film is short and further, scratches formed on the substrate surface can be made inconspicuous.

<<Polypropylene-Based Resin (A)>>

As the polypropylene-based resin (A) in the fifth embodiment, there may be selected one of various types of propylene-based polymers, such as propylene homopolymer (homopolypropylene), a propylene-α-olefin copolymer (random polypropylene), or a propylene block copolymer (block polypropylene), or a combination thereof. The polypropylene-based polymer preferably contains 50 mol % or more of a polymerization unit derived from a propylene monomer. The propylene-based polymer preferably do not contain a polymerization unit derived from a polar group-containing monomer.

1. Melt Flow Rate (MFR(A)): (a1)

The melt flow rate (230° C., a load of 2.16 kg) MFR(A) of the polypropylene-based resin (A) contained in the sealing layer (I) necessarily exceeds 0.5/10 minutes, and is preferably 1 g/10 minutes or more, more preferably 2 g/10 minutes or more. In the above range, the relaxation at the time of three-dimensional decorative thermoforming sufficiently proceeds, sufficient adhesive strength can be exhibited, and also the scratches formed on the substrate becomes inconspicuous. An upper limit of MFR(A) is not limited but is preferably 100 g/10 minutes or less. In the above range, deterioration of the adhesive strength by a decrease in physical properties does not occur.

2. Melting Peak Temperature (Tm(A))

The melting peak temperature of the polypropylene-based resin (A) (Tm(A)) is preferably 110° C. or higher, more preferably 115° C. or higher, further preferably 120° C. or higher. In the above range, formability at the time of three-dimensional decorative thermoforming is satisfactory. An upper limit of the melting peak temperature is not limited but is preferably 170° C. or lower. In the above range, sufficient adhesive strength can be exhibited.

3. Resin Composition

The polypropylene-based resin (A) in the present invention is preferably a resin polymerized by means of a Ziegler catalyst, a metallocene catalyst, or the like. That is, the polypropylene-based resin (A) may be a Ziegler catalyst-based propylene polymer or a metallocene catalyst-based propylene polymer.

<<Thermoplastic Resin (E)>>

The thermoplastic resin (E) to be used in the sealing layer of the fifth embodiment as an essential component is a component having a function of retarding the crystallization of the polypropylene-based resin (A) by incorporating the resin (E) into the polypropylene-based resin (A). By retarding the crystallization of the polypropylene-based resin (A), at the time of decorative forming, the adhesive force can be prevented from decreasing through crystallization (solidification) of the sealing layer resin before thermal fusion of the sealing layer (I) to the substrate surface. As a result, strong adhesive force can be exhibited even when the heating time of the decorative film is short and also the effect of making the scratches formed on the substrate surface inconspicuous is high. The effect of retarding the crystallization of the polypropylene-based resin (A) is evaluated by isothermal crystallization temperature of the resin composition (X5) to be mentioned later.

1. Resin Composition: (e1)

The thermoplastic resin (E) in the present invention preferably contains at least one of an alicyclic hydrocarbon group and an aromatic hydrocarbon group. When the thermoplastic resin (E) has the above characteristic, at the time of mixing it with the polypropylene-based resin (A), the effect of retarding the crystallization of the polypropylene-based resin (A) is exhibited and the effect of making the scratches formed on the substrate surface inconspicuous is high. Specifically, as the alicyclic hydrocarbon group, there may be mentioned a cyclopropyl group, a cyclobutyl group, a cyclopentyl group, a cyclohexyl group, a cyclooctyl group, and a substituted derivative, a condensed cyclic compound, and a crosslinked compound thereof, and the like. Especially, it is preferred to contain a cyclopentyl group or a cyclohexyl group. As the aromatic hydrocarbon group, there may be mentioned a phenyl group, a methylphenyl group, a biphenyl group, an indenyl group, a fluorenyl group, and a substituted derivative, a condensed cyclic compound, and a crosslinked compound thereof, and the like. Especially, it is preferred to contain a phenyl group, a biphenyl group, or an indenyl group. Moreover, the alicyclic hydrocarbon group may be one obtained by hydrogenating an aromatic group contained in the resin.

Incidentally, as the thermoplastic resin (E), any one can be appropriately selected and used as long as it satisfies the aforementioned requirement (e1) but a styrene-based elastomer or an alicyclic hydrocarbon resin can be particularly preferably used and both of them may be contained.

As the styrene-based elastomer, there may be exemplified a styrene•butadiene•styrene triblock copolymer elastomer (SBS), a styrene•isoprene•styrene triblock copolymer elastomer (SIS), a styrene-ethylene•butylene copolymer elastomer (SEB), a styrene-ethylene•propylene copolymer elastomer (SEP), a styrene-ethylene•butyrene-styrene copolymer elastomer (SEBS), a styrene-ethylene•butyrene-ethylene copolymer elastomer (SEBC), a hydrogenated styrene•butadiene elastomer (HSBR), a styrene-ethylene•propylene-styrene copolymer elastomer (SEPS), a styrene-ethylene•ethylene propylene-styrene copolymer elastomer (SEEPS), a styrene-butadiene=butylene-styrene copolymer elastomer (SBBS), and the like, and hydrogenated one can be particularly preferably used.

As commercially available products, there may be mentioned DYNARON series manufactured by JSR Corporation, Kraton G series manufactured by Kraton Polymer Japan Corporation, Tuftec series manufactured by Asahi Kasei Corporation, and the like.

As the alicyclic hydrocarbon resin, for example, there may be mentioned hydrocarbon resins obtained by polymerizing one of dicyclopentadiene derivatives such as dicyclopentadiene, methyldicyclopentadiene, and dimethyldicyclopentadiene or a mixture of two or more thereof as a main raw material, a hydrogenated coumarone•indene resin, a hydrogenated C9 petroleum resin, a hydrogenated C5 petroleum resin, a C5/C9 copolymer-based petroleum resin, a hydrogenated terpene resin, a hydrogenated rosin resin, and the like. A commercially available product can be used, and specifically, Arkon series manufactured by Arakawa Chemical Industries, Ltd. and the like may be mentioned.

<<Resin Composition (X5)>>

In the fifth embodiment, the resin composition (X5) constituting the sealing layer (I) contains a polypropylene-based resin (A) and a thermoplastic resin (E) as main components and may be a mixture of the polypropylene-based resin (A) and the thermoplastic resin (E) or a melt-kneaded product thereof.

1. Weight Ratio of Polypropylene-Based Resin (A) to Thermoplastic Resin (E)

In the resin composition (X5), the weight ratio of the polypropylene-based resin (A) to the thermoplastic resin (E) ((A):(E)) is preferably selected from a range of 97:3 to 5:95 and is more preferably 95:5 to 10:90, further preferably 93:7 to 20:80. Here, plural kinds of polypropylene-based resins (A) or thermoplastic resins (E) may be contained and, for example, in the case where a thermoplastic resin (E1) and a thermoplastic resin (E2) are contained, the total of the thermoplastic resin (E1) and the thermoplastic resin (E2) is taken as the weight of the thermoplastic resin (E). In the above range, sufficient adhesive strength can be exhibited at the time of three-dimensional decorative thermoforming, heating time of the film can be shortened, and also, the scratches formed on the substrate surface can be made inconspicuous. Furthermore, the adhesiveness between the sealing layer (I) and the layer (II) is satisfactory.

2. Isothermal Crystallization Time (t(X)): (x1)

As for the resin composition (X5), the isothermal crystallization time (t(X)) (second) of the resin composition (X5) determined by a differential scanning calorimeter (DSC) preferably satisfies the following expression (x-1), and satisfies more preferably the expression (x-2), further preferably the expression (x-3):

$$t(X) \geq 1.5 \times t(A) \quad \text{Expression (x-1)}$$

$$t(X) \geq 2.0 \times t(A) \quad \text{Expression (x-2)}$$

$$t(X) \geq 2.5 \times t(A) \quad \text{Expression (x-3)}$$

wherein t(A) represents isothermal crystallization time (second) of the polypropylene-based resin (A) measured at a temperature 10° C. higher than the crystallization initiation temperature of the polypropylene-based resin (A) and t(X) is isothermal crystallization time (second) of the resin composition (X5) measured at a temperature that is 10° C. higher than the crystallization initiation temperature of the polypropylene-based resin (A).

When the isothermal crystallization time (t(X)) of the resin composition (X5) is in the above range, at the time of decorative forming, a time for thermal fusion of the sealing layer (I) of the decorative film to the substrate surface can be earned and effects of achieving high adhesive force and making the scratches formed on the substrate surface inconspicuous are high.

An upper limit of the isothermal crystallization time (t(X)) is not particularly limited but, when 30t(A)≥t(X) is satisfied, the formability of the film is satisfactory.

(Measurement of Isothermal Crystallization Time by Differential Scanning Calorimeter (DSC))

The isothermal crystallization time in the present invention is a value measured using a differential scanning calorimeter (DSC) and is measured in accordance with JIS-K7121 (2012) "Method for measuring transition temperature of plastics".

Specifically, 5 mg of a sample of the polypropylene-based resin (A) is placed in an aluminum-made holder and is heated from 40° C. to 200° C. at a rate of 10° C./min under a nitrogen atmosphere. After the temperature is kept at 200° C. for 10 minutes, the resin is crystallized at a cooling rate of 10° C./minute to 40° C. and crystallization initiation temperature is measured/calculated from the DSC curve at this time.

Next, 5 mg of a sample of the polypropylene-based resin (A) or the resin composition (X5) is placed in an aluminum-made holder and is heated from 40° C. to 200° C. at a rate of 10° C./min under a nitrogen atmosphere to melt the sample. Subsequently, the sample is cooled at a rate of 40° C./min to a temperature (hereinafter sometimes referred to as "measurement temperature") 10° C. higher than the crystallization initiation temperature of the polypropylene-based resin (A) determined by the aforementioned method, thereafter is kept at the measurement temperature, and behavior of crystallization and heat generation of the sample is measured. A period from the time at which the temperature of the sample reaches the measurement temperature to the heat generation peak time is taken as the isothermal crystallization time. Here, since it is considered that the adhesive force is remarkably decreased only by slight crystallization of the sealing layer of the decorative film at the time of decorative forming, in the case where two or more heat generation peaks at the isothermal crystallization measurement exist, the time to the first heat generation peak time is taken as the isothermal crystallization time.

Moreover, depending on the kind of the polypropylene-based resin (A), there is a possibility of occurrence of a case where the isothermal crystallization time of the polypropylene-based resin (A) is extremely short (e.g., 120 seconds or less) or long (e.g., 3,000 seconds or more) even at the temperature 10° C. higher than the crystallization initiation temperature. In that case, the isothermal crystallization time may be measured at a temperature 10±2° C. higher than the crystallization initiation temperature. However, in the case of performing such measurement, the isothermal crystallization time of the resin composition (X5) should be measured in conformity to the measurement temperature of the polypropylene-based resin (A).

Sixth Embodiment

In the sixth embodiment, the sealing layer (I) is composed of a resin composition (X6) containing a propylene-ethylene block copolymer (F). By providing the sealing layer (I), sufficient adhesive strength can be exhibited even when the heating time is short at the time of three-dimensional decorative thermoforming and further, scratches formed on the substrate surface can be made inconspicuous.

<<Propylene-Ethylene Block Copolymer (F)>>

The propylene-ethylene block copolymer (F) contains a component (F1) composed of propylene homopolymer or a propylene-ethylene random copolymer and component (F2) composed of a propylene-ethylene random copolymer having an ethylene content larger than that of the component (F1). Owing to the component (F2) that is a rubber component in the propylene-ethylene block copolymer (F), the adhesive force with the resin molded body (substrate) is improved. Moreover, the component (F2) has high homogeneity of dispersion form to propylene is high and thus the effect of making the scratches inconspicuous is high. The propylene-ethylene block copolymer (F) is obtained by (co)polymerization of the component (F1) composed of propylene homopolymer or a propylene-ethylene random copolymer in a first polymerization step and sequential copolymerization of the component (F2) composed of a propylene-ethylene random copolymer having an ethylene content larger than that of the component (F1) in a second polymerization step.

1. Proportion of Component (F1) and Component (F2): (f2)

As for the content proportion of the ratio of the component (F1) and the proportion of the component (F2) constituting the propylene-ethylene block copolymer (F) of the present invention, it is preferred that the proportion of the component (F1) is 5 to 97% by weight and the proportion of the component (F2) is 3 to 95% by weight. More preferably, the proportion of the component (F1) is 30 to 95% by weight and the proportion of the component (F2) is 5 to 70% by weight and further preferably, the proportion of the component (F1) is 52 to 92% by weight and the proportion of the component (F2) is 8 to 48% by weight. When the proportion of the component (F1) and the proportion of the component (F2) are in the above ranges, sufficient adhesive strength can be exhibited and the effect of making the scratches inconspicuous is high. Moreover, in the above ranges, the film is not sticky and film formability is satisfactory.

2. Melt Flow Rate (MFR(F)): (a1)

The melt flow rate (230° C., a load of 2.16 kg) MFR(F) of the propylene-ethylene block copolymer (F) necessarily exceeds 0.5/10 minutes, and is preferably 1 g/10 minutes or more, more preferably 2 g/10 minutes or more. When MFR(F) is in the above range, relaxation of the propylene-ethylene block copolymer (F) sufficiently proceeds at the time of three-dimensional decorative thermoforming and sufficient adhesive strength can be exhibited, and the scratches formed on the substrate becomes inconspicuous. An upper limit of MFR(F) is not limited but is preferably 100 g/10 minutes or less. In the above range, deterioration of the adhesive strength by a decrease in physical properties does not occur.

3. Melting Peak Temperature (Tm(F)): (f1)

The melting point (melting peak temperature) of the propylene-ethylene block copolymer (F) Tm(F) is preferably 110 to 170° C., more preferably 113 to 169° C., further preferably 115 to 168° C. When Tm(F) is in the above range, formability at the time of three-dimensional decorative thermoforming is satisfactory. The melting peak temperature is mainly derived from the component (F1) having a small ethylene content, i.e., the component (F1) having high crystallinity and the melting peak temperature can be changed by the content of ethylene to be copolymerized.

4. Ethylene Content (E(F)) in Propylene-Ethylene Block Copolymer (F): (f3)

The ethylene content in the propylene-ethylene block copolymer (F) (hereinafter referred to as "E(F)") of the present invention is preferably 0.15 to 85% by weight. More preferred is 0.5 to 75% by weight and further preferred is 2 to 50% by weight. When E(F) is in the above range, sufficient adhesive strength can be exhibited, the adhesiveness with the layer (II) of the decorative film is satisfactory, and the film formability is also excellent.

5. Ethylene Content of Component (F1) (E(F1)): (f4)

The component (F1) is preferably propylene homopolymer or a propylene-ethylene random copolymer which has a relatively high melting point and an ethylene content (hereinafter referred to as "E(F1)") ranging from 0 to 6% by weight. More preferred is 0 to 5% by weight. When E(F1) is in the above range, formability at the time of three-dimensional decorative thermoforming is satisfactory and also stickiness of the film is a little and film formability is also excellent.

6. Ethylene Content of Component (F2) (E(F2)): (f5)

In the component (F2), the ethylene content (hereinafter referred to as "E(F2)") is more than the ethylene content E(F1) of the component (F1). Moreover, the component (F2) is preferably a propylene-ethylene random copolymer having E(F2) ranging from 5 to 90% by weight. E(F2) is more preferably 7 to 80% by weight, further preferably 9 to 50% by weight. When E(F2) is in the above range, sufficient adhesive strength can be exhibited and the effect of making the scratches inconspicuous is high.

(Method for Producing Propylene-Ethylene Block Copolymer (F))

The propylene-ethylene block copolymer (F) to be used in the present invention and the component (F1) composed of propylene homopolymer or the propylene-ethylene random copolymer and the component (F2) composed of the propylene-ethylene random copolymer, which constitute the copolymer (F), can be preferably produced by the following raw materials and polymerization method. The following will explain the method for producing the propylene-ethylene block copolymer (F) to be used in the present invention.

Raw Materials to be Used

As a catalyst to be used at the time of producing the propylene-ethylene block copolymer (F) to be used in the present invention, there can be used a magnesium-supported catalyst having magnesium, halogen, titanium, and an electron donor as catalyst components, a catalyst composed of a solid catalyst component having titanium trichloride as a catalyst and an organoaluminum, or a metallocene catalyst. Specific method for producing the catalyst is not particularly limited but, for example, there can be exemplified the Ziegler catalyst disclosed in JP-A-2007-254671 and the metallocene catalyst disclosed in JP-A-2010-105197.

Moreover, the raw material olefins to be polymerized are propylene and ethylene and, if necessary, there can be also used other olefins, e.g., butene-1, 1-hexene, 1-octene, 4-methyl-pentene-1, and the like in such an amount that the purpose of the present invention is not impaired.

Polymerization Step

The polymerization step to be performed in the presence of the above catalyst comprises multi-stages of a first polymerization step of producing the component (F1) and a second polymerization step of producing the component (F2).

First Polymerization Step

The first polymerization step is a step of feeding propylene alone or a mixture of propylene/ethylene to a polymerization system to which the catalyst is added and producing propylene homopolymer or a propylene-ethylene random copolymer to form the component (F1) so as to be an amount that corresponds to 5 to 97% by weight of the total polymer amount.

MFR of the component (F1) (hereinafter referred to as "MFR(F1)") can be regulated by using hydrogen as a chain transfer agent. Specifically, when the concentration of hydrogen that is a chain transfer agent is increased, MFR of the component (F1) becomes high. Vice versa. For increasing the concentration of hydrogen in a polymerization tank, it is sufficient to increase the feed amount of hydrogen to the polymerization tank and the regulation is extremely easy for one skilled in the art. Moreover, in the case where the component (F1) is a propylene-ethylene random copolymer, as a method for controlling the ethylene content, it is convenient to use a method of controlling the amount of ethylene to be fed to the polymerization tank. Specifically, when the amount ratio of ethylene to propylene (ethylene feed amount/propylene feed amount) to be fed to the polymerization tank is increased, the ethylene content of the component (F1) becomes high. Vice versa. Although the relation between the amount ratio of propylene and ethylene to be fed to the polymerization tank and the ethylene content of the component (F1) varies depending on the kind of the catalyst to be used, it is extremely easy for one skilled in the art to obtain the component (F1) having an objective ethylene content by regulating the feed amount ratio appropriately.

Second Polymerization Step

The second polymerization step is a step of further introducing a propylene/ethylene mixture subsequently to the first polymerization step and producing a propylene-ethylene random copolymer to form the component (F2) so as to be an amount that corresponds to 3 to 95% by weight of the total polymer amount.

MFR of the component (F2) (hereinafter referred to as "MFR(F2)" can be regulated by using hydrogen as a chain transfer agent. Specific controlling method is the same as the controlling method of MFR of the component (F1). As a method for controlling the ethylene content of the component (F2), it is convenient to use a method of controlling the amount of ethylene to be fed to the polymerization tank. Specific controlling method is the same as in the case where the component (F1) is a propylene-ethylene random copolymer.

Next, there is explained a method of controlling index of the propylene-ethylene block copolymer (F).

First, a method of controlling the weight ratio of the component (F1) to the component (F2) is explained. The weight ratio of the component (F1) to the component (F2) is controlled by the production amount in the first polymerization step in which the component (F1) is produced and the production amount in the second polymerization step in which the component (F2) is produced. For example, for increasing the amount of the component (F1) and decreasing the amount of the component (F2), it is sufficient to decrease the production amount of the second polymerization step while maintaining the production amount of the first polymerization step. For the purpose, it is sufficient to shorten residence time of the second polymerization step or lower the polymerization temperature. Moreover, the weight ratio can be also controlled by adding a polymerization inhibitor such as ethanol or oxygen or, in the case where it has been originally added, increasing the adding amount thereof. Vice versa.

Usually, the weight ratio of the component (F1) to the component (F2) is defined by the production amount in the first polymerization step of producing the component (F1) and the production amount in the second polymerization step of producing the component (F2). The expression is shown below.

$$\text{Weight of Component }(F1)\text{:Weight of Component }(F2)=W(F1){:}W(F2)$$

W(F1)=Production amount in first polymerization step÷(Production amount in first polymerization+Production amount in second polymerization)
W(F2)=Production amount in second polymerization step÷(Production amount in first polymerization+Production amount in second polymerization)

$$W(F1)+W(F2)=1$$

wherein W(F1) and W(F2) are the weight ratios of the component (F1) and the component (F2) in the propylene-ethylene block copolymer (F), respectively.

In an industrial production facility, it is usual to determine a production amount from heat balance and material balance of each polymerization tank. Moreover, in the case where the crystallinity of the component (F1) and that of the component (F2) are sufficiently different from each other, the both may be separated and identified by an analytical method such as TREF (temperature rising elution fractionation method) and the amount ratio may be determined. The method of evaluating crystallinity distribution of polypropylene by TREF measurement is well known by one skilled in the art and detailed measurement methods are shown in literatures of G Glokner, J. Appl. Polym. Sci: Appl. Poly. Symp.; 45, 1-24 (1990), L. Wild, Adv. Polym. Sci.; 98, 1-47 (1990), J. B. P. Soares, A. E. Hamielec, Polymer; 36, 8, 1639-1654 (1995), and the like.

Next, a method for controlling the ethylene content will be explained. Since the propylene-ethylene block copolymer (F) is a mixture of the component (F1) composed of propylene homopolymer or a propylene-ethylene random copolymer and the component (F2) composed of a propylene-ethylene random copolymer, the following relational expression holds between respective ethylene contents.

$$E(F)=E(F1)\times W(F1)+E(F2)\times W(F2)$$

wherein E(F), E(F1), and E(F2) are the ethylene contents of the propylene-ethylene block copolymer (F), the component (F1) composed of propylene homopolymer or a propylene-ethylene random copolymer, and the component (F2) composed of a propylene-ethylene random copolymer, respectively, and W(F1) and W(F2) are the same as above.

The expression represents material balance regarding to the ethylene contents. Therefore, when the weight ratio of the component (F1) and the component (F2) is determined, that is, W(F1) and W(F2) are determined, E(F) is uniquely determined by E(F1) and E(F2). That is, E(F) can be controlled by controlling the three factors of the weight ratio of the component (F1) and the component (F2), E(F1), and E(F2). For example, for increasing E(F), E(F1) may be increased or E(F2) may be increased. Moreover, when it is reminded that E(F2) is higher than E(F1), it is also easily understood that W(F1) may be decreased while W(F2) may be increased. The same applies to the reverse direction of the control.

Incidentally, those for which measured values can be actually directly obtained are E(F) and E(F1) and hence E(F2) is to be calculated using the measured values of the both. Therefore, at the time of performing an operation of increasing E(F), in the case where an operation of increasing E(F2), i.e., an operation of increasing the amount of ethylene to be fed to the second polymerization step is assumingly selected as a method, one directly confirmed as a measured value is E(F) and not E(F2) but it is obvious that the cause of an increase of E(F) is the increase of E(F2).

Finally, a method for controlling MFR(F) will be explained. In the present application, MFR(F2) is determined by the following expression.

$$MFR(F2)=\exp\{(\log e[MFR(F)]-W(F1)\times\log e[MFR(F1)])\div W(F2)\}$$

wherein log e is a logarithm to base e. MFR(F), MFR(F1), and MFR(F2) are MFR of the propylene-ethylene block copolymer (F), MFR of the component (F1) composed of propylene homopolymer or a propylene-ethylene random copolymer, and MFR of the component (F2) composed of a propylene-ethylene random copolymer, respectively, and W(F1) and W(F2) are the same as above.

The expression is a transformed one of the empirical expression generally called as logarithmic additive rule of viscosity:

$$\text{Log }e[MFR(F)]=W(F1)\times\log e[MFR(F1)]+W(F2)\times\log e[MFR(F2)]$$

and is routinely used in the art.

Since they are defined by the expression, the weight ratio of the component (F1) to the component (F2), MFR(F), MFR(F1), and MFR(F2) are not independent. Therefore, for controlling MFR(F), it is sufficient to control the three factors of the weight ratio of the component (F1) to the component (F2), MFR(F1), and MFR(F2). For example, for increasing MFR(F), MFR(F1) may be increased or MFR (F2) may be increased. Moreover, in the case where MFR (F2) is lower than MFR(F1), it is also understood that MFR(F) can be increased by increasing MFR(F1) and decreasing MFR(F2). The same applies to the reverse direction of the control.

Incidentally, those for which measured values can be actually directly obtained are MFR(F) and MFR(F1) and hence MFR(F2) is calculated using the measured values of the both. Therefore, at the time of performing an operation of increasing MFR(F), in the case where an operation of increasing MFR(F2), i.e., an operation of increasing the amount of hydrogen to be fed to the second polymerization step is assumingly selected as a method, one directly confirmed as a measured value is MFR(F) and not MFR(F2) but it is obvious that the cause of an increase of MFR(F) is the increase of MFR(F2).

The polymerization process of the propylene-ethylene block copolymer can be carried out by any method of a batch-wise method and a continuous method. On this occasion, it is possible to employ a method of performing polymerization in an inert hydrocarbon solvent such as hexane or heptane, a method of using propylene as a solvent without substantially using an inert solvent, a method of performing polymerization in a gaseous monomer without substantially using a liquid solvent, and a method in which these methods are combined. Moreover, in the first polymerization step and the second polymerization step, the same polymerization tank may be used or different polymerization tanks may be used.

(1) Measurement of Ethylene Content in Copolymer

Using the propylene-ethylene block copolymer (F), each ethylene content was measured in the copolymer. That is, each ethylene content in the component (F1) composed of propylene homopolymer or a propylene-ethylene random copolymer obtained at the time of completion of the first polymerization step and in the propylene-ethylene block copolymer (F) obtained via the second polymerization step were determined by analyzing $^{13}$C-NMR spectra measured according to the following conditions by a complete proton decoupling method.

Instrument: GSX-400 or an equivalent apparatus (carbon nuclear resonance frequency of 100 MHz or more) manufactured by JEOL Ltd.

Solvent: o-dichlorobenzene+deuterated benzene (4:1 (volume ratio))
Concentration: 100 mg/mL
Temperature: 130° C.
Pulse angle: 90°
Pulse interval: 15 seconds
Number of integration times: 5,000 times or more Assignment of spectra may be conducted, for example, with reference to Macromolecules 17, 1950 (1984). The assignment of the spectra measured under the above conditions are as shown in the following table. In the table, the signs such as Sαα are described in accordance with the notation of Carman et al. (Macromolecules 10, 536 (1977)) and P, S, and T represents a methyl carbon, a methylene carbon, and a methine carbon, respectively.

TABLE 1

| Chemical shift (ppm) | Assignment |
| --- | --- |
| 45 to 48 | $S_{\alpha\alpha}$ |
| 37.8 to 37.9 | $S_{\alpha\gamma}$ |

TABLE 1-continued

| Chemical shift (ppm) | Assignment |
| --- | --- |
| 37.4 to 37.5 | $S_{\alpha\delta}$ |
| 33.1 | $T_{\delta\delta}$ |
| 30.9 | $T_{\beta\delta}$ |
| 30.6 | $S_{\gamma\gamma}$ |
| 30.2 | $S_{\gamma\delta}$ |
| 29.8 | $S_{\delta\delta}$ |
| 28.7 | $T_{\beta\beta}$ |
| 27.4 to 27.6 | $S_{\beta\delta}$ |
| 24.4 to 24.7 | $S_{\beta\beta}$ |
| 19.1 to 22.0 | P |

Hereinafter, when "P" is a propylene unit in the copolymer chain and "E" is an ethylene unit, six kinds of triads of PPP, PPE, EPE, PEP, PEE, and EEE may be present in the chain. As described in Macromolecules 15, 1150 (1982) and the like, the concentration of the triads and the peak intensity of a spectrum are correlated by the following relational expressions (1) to (6).

$$[PPP]=k \times I(T\beta\beta) \quad (1)$$

$$[PPE]=k \times I(T\beta\delta) \quad (2)$$

$$[EPE]=k \times I(T\delta\delta) \quad (3)$$

$$[PEP]=k \times I(S\beta\beta) \quad (4)$$

$$[PEE]=k \times I(S\beta\delta) \quad (5)$$

$$[EEE]=k \times \{I(S\delta\delta)/2+I(S\gamma\delta)/4\} \quad (6)$$

Here, the parenthesis [ ] represents the fraction of a triad and, for example, [PPP] is the fraction of the PPP triad in all triads. Therefore, [PPP]+[PPE]+[EPE]+[PEP]+[PEE]+[EEE]=1 (7).

Moreover, k is a constant and I represents spectrum intensity. For example, 1(Tββ) means intensity of a peak at 28.7 ppm assigned to Tδδ. By using the above relational expressions (1) to (7), each triad fraction is determined and further, the ethylene content is determined according to the following expression.

Ethylene content (% by mol)=([PEP]+[PEE]+[EEE])×100

Incidentally, the conversion of % by mol to % by weight of the ethylene content is conducted using the following expression.

Ethylene content (% by weight)=(28×X/100)/{28×X/100+42×(1−X/100)}×100

Here, X is an ethylene content in terms of % by mol.

[Other Components of Sealing Layer (I)]

In the above basic embodiment and the first to sixth embodiments, the resin composition (X) (resin compositions (X1) to (X6)) constituting the sealing layer (I) may contain an additive, a filler, other resin components, and the like unless they impair the advantages of the present invention. However, the total amount of the additive, the filler, other resin components, and the like is preferably 50% by weight or less relative to the resin composition.

When the resin composition (X) is composed of the polypropylene-based resin (A), the resin composition (X) preferably has the properties of the above polypropylene-based resin (A).

As the additive, there can be blended known various additives that can be used for a polypropylene-based resin, such as an antioxidant, a neutralizing agent, a light stabilizer, a UV absorber, a crystal nucleating agent, a blocking inhibitor, a lubricant, an antistatic agent, and a metal inactivating agent.

As the antioxidant, phenol-based antioxidants, phosphite-based antioxidants, thio-based antioxidants, and the like can be exemplified. As the neutralizing agent, higher fatty acid salts such as calcium stearate and zinc stearate can be exemplified. As the light stabilizer and the UV absorber, hindered amines, benzotriazoles, benzophenones, and the like can be exemplified.

As the crystal nucleating agent, aromatic carboxylic acid metal salts, aromatic phosphoric acid metal salts, sorbitol-based derivatives, metal salts and the like of rosin, amide-based nucleating agents, and the like can be exemplified. Of these crystal nucleating agents, there can be exemplified aluminum p-t-butylbenzoate, 2,2'-methylenebis(4,6-di-t-butylphenyl) sodium phosphate, 2,2'-methylenebis(4,6-di-t-butylphenyl) aluminum phosphate, a complex of an organic compound and bis(2,4,8,10-tetra-tert-butyl-6-hydroxy-12H-dibenzo [d,g] [1,2,3] dioxaphosphocin-6-oxide) aluminum hydroxide salt, p-methyl-benzylidenesorbitol, p-ethyl-benzylidenesorbitol, 1,2,3-trideoxy-4,6:5,7-bis-[(4-propylphenyl)methylene]-nonitol, sodium salt of rosin, and the like.

As the lubricant, higher fatty acid amides such as stearic acid amide can be exemplified. As the antistatic agent, fatty acid partial esters such as glycerol fatty acid monoesters can be exemplified. As the metal inactivating agent, triazines, phosphones, epoxys, triazoles, hydrazides, oxamides, and the like can be exemplified.

As the filler, there can be blended known various fillers that can be used for a polypropylene-based resin, such as inorganic fillers and organic fillers. As the inorganic fillers, there can be exemplified calcium carbonate, silica, hydrotalcite, zeolite, aluminum silicate, magnesium silicate, glass fibers, carbon fibers, and the like. Moreover, as the organic fillers, crosslinked rubber fine particles, thermosetting resin fine particles, thermosetting resin hollow fine particles and the like can be exemplified.

As the other resin components, there can be exemplified elastomers such as modified polyolefins and ethylene-α-olefin copolymers, low density polyethylene, high density polyethylene, petroleum resins, other thermoplastic resins, and the like.

As methods for producing the resin composition (X), it can be produced by a method of melt-kneading the polypropylene-based resin (A) (in the case of the basic embodiment and the first and second embodiments), the polypropylene-based resin (A) and the ethylene-α-olefin random copolymer (C) (in the case of the third embodiment), the polypropylene-based resin (A) and the thermoplastic elastomer (D) (in the case of the fourth embodiment), the polypropylene-based resin (A) and the thermoplastic resin (E) (in the case of the fifth embodiment), or the propylene-ethylene block copolymer (F) (in the case of the sixth embodiment), and an additive, a filler, other resin components, and the like, and, in the third to fifth embodiments, a method of dry blending the ethylene-α-olefin random copolymer (C), the thermoplastic elastomer (D), or the thermoplastic resin (E) with a melt-kneaded product of the polypropylene-based resin (A), an additive, a filler, other resin components, and the like or a method of adding the polypropylene-based resin (A) to the ethylene-α-olefin random copolymer (C), the thermoplastic elastomer (D), or the thermoplastic resin (E) and dry blending a master batch in which an additive, a filler, other resin components, and the like are dispersed in a carrier resin in a high concentration.

[Layer (II)]

The layer (II) contained in the decorative film of the present invention is composed of a resin composition (Y) containing the polypropylene-based resin (B). By providing the layer (II) to the decorative film, the occurrence of appearance defects resulting from the film being broken or violent by moved at the time of three-dimensional decorative thermoforming can be suppressed. Thereby, the decorative film may not contain a thermosetting resin layer excellent in thermoformability for improving thermoformability.

<<Polypropylene-Based Resin (B)>>

Next, the polypropylene-based resin (B) constituting the layer (II) will be explained. The polypropylene-based resin (B) is preferably a resin that is less prone to melt and relax as compared with the polypropylene-based resin (A).

1. Melt Flow Rate (MFR(B)): (b1)

The melt flow rate (230° C., a load of 2.16 kg) (MFR(B)) of the polypropylene-based resin (B) is necessarily low as compared with MFR(A) of the polypropylene-based resin (A). That is, the following relational expression (b-1) is satisfied.

$$MFR(B) < MFR(A) \qquad \text{Expression (b-1)}$$

MFR(B)/MFR(A) that is a ratio of MFR of the polypropylene-based resin (B) to the polypropylene-based resin (A) is less than 1 (i.e., MFR(B)<MFR(A)), preferably 0.8 or less, more preferably 0.7 or less, further preferably 0.5 or less, particularly preferably 0.25 or less. When MFR(B)/MFR(A) is in the above range, thermoformability becomes satisfactory. A lower limit of MFR(B)/MFR(A) is not limited but is preferably 0.01 or more.

MFR(B) is not particularly limited as long as it is in the above range but is preferably 0.1 g/10 minutes or more, more preferably 0.2 g/10 minutes or more. In the above range, at the time of thermoforming, spreadability of the decorative film is satisfactory. Moreover, MFR(B) is preferably 20 g/10 minutes or less, more preferably 15 g/10 minutes or less.

2. Melting Peak Temperature (Tm(B)): (b2)

The melting peak temperature of the polypropylene-based resin (B) (Tm(B)) on DSC measurement is not particularly limited but is preferably 150° C. or higher, more preferably 155° C. or higher. When Tm(B) is in the above range, heat resistance, scratch resistance, and solvent resistance become satisfactory.

Moreover, the melting peak temperature of the polypropylene-based resin (B) (Tm(B)) is preferably higher than the melting peak temperature of the polypropylene-based resin (A) (Tm(A)) and satisfies the following relational expression (b-2).

$$Tm(B) > Tm(A) \qquad \text{Expression (b-2)}$$

In the above range, thermoformability becomes satisfactory.

3. Crystallization Temperature (Tc(B)): (b3)

The crystallization temperature of the polypropylene-based resin (B) (Tc(B)) on DSC measurement is preferably higher than the crystallization temperature of the polypropylene-based resin (A) (Tc(A)) and satisfies the following relational expression (b-3).

$$Tc(B) > Tc(A) \qquad \text{Expression (b-3)}$$

In the above range, thermoformability becomes satisfactory.

Tc(B) is not particularly limited as long as it is in the above range but is preferably 95° C. or higher, more preferably 100° C. or higher.

4. Resin Composition

The polypropylene-based resin (B) can be selected from a metallocene catalyst-based propylene polymer, a Ziegler-Natta catalyst-based propylene polymer and the like. The Ziegler-Natta catalyst-based propylene polymer is preferred.

As the polypropylene-based resin (B) in the present invention, there may be selected one of various types of propylene-based polymers, such as propylene homopolymer (homopolypropylene), a propylene-α-olefin copolymer (random polypropylene), or a propylene-α-olefin block copolymer (block polypropylene), or a combination thereof. The polypropylene-based polymer preferably contains 50 mol % or more of a polymerization unit derived from a propylene monomer.

In the present invention, preferred combinations with the sealing layer (I) are as follows.

The layer (II) preferably satisfies the above requirements (b1) and (b2) in the first embodiment, the layer (II) preferably satisfies the above requirements (b1) and (b3) in the second embodiment, and the layer (II) satisfies the above requirement (b1) in the third to sixth embodiments.

[Other Components of Layer (II)]

The resin composition (Y) constituting the layer (II) may contain an additive, a filler, a colorant, other resin components, and the like in addition to the polypropylene-based resin (B). That is, the composition may be a resin composition (polypropylene-based resin composition) containing a propylene-based polymer (polypropylene-based resin (B)), an additive, a filler, a colorant, other resin components, and the like. The total amount of the additive, filler, colorant, other resin components, and the like is preferably 50% by weight or less relative to the polypropylene-based resin composition.

As the additive, the additives and the like which may be contained in the resin composition (X) constituting the above sealing layer (I) can be used.

The resin composition (Y) can be produced by a method of melt-kneading the propylene-based polymer, an additive, a filler, other resin components, and the like, a method of melt-kneading the propylene-based polymer, an additive, a filler, and the like and dry blending other resin components to the melt blended one, or a method of adding the propylene-based polymer to the other resin components and dry blending a master batch in which an additive, a filler, and the like are dispersed in a carrier resin in a high concentration.

When the resin composition (Y) is composed of the polypropylene-based resin (B), the resin composition (Y) has the properties of the above polypropylene-based resin (B).

Moreover, for imparting design, coloring is also possible. For coloring, various colorants such as pigments, organic pigments, and dyes can be used. Moreover, it is also possible to use a brilliant material such aluminum flakes, titanium oxide flakes, and (synthetic) mica.

In the case where the decorative molded body of the present invention is formed as a colored molded body, the colorant may be used only in the decorative film, so that the use of an expensive colorant can be suppressed as compared with the case where the whole resin molded body is colored. Moreover, it is possible to suppress change in physical properties that may be accompanied by the blending of the colorant.

[Decorative Film]

The decorative film in the present invention includes the sealing layer (I) containing the polypropylene-based resin (A) and the layer (II) containing the polypropylene-based resin (B). The decorative film can take various configurations in addition to the sealing layer (I) and the layer (II). That is, the decorative film may be a two-layered film composed of the sealing layer (I) and the layer (II) or a multi-layered film having three or more layers composed of the sealing layer (I) and the layer (II) and the other layer(s). Incidentally, the sealing layer (I) is stuck along a resin molded body (substrate). Moreover, the decorative film may be provided with crimping, embossing, printing, sandblasting, scratching, and the like.

The decorative film has large freedom of shape, is excellent in appearance owing to no generation of a seam since the edge of the decorative film is wound to the back side of a decoration object, and further, can express a variety of textures by applying crimps or the like to the surface of the decorative film. For example, in the case of applying a texture such as embossment to the resin molded body, it is sufficient to perform three-dimensional thermoforming using a decorative film to which embossment had been applied. Therefore, there can be solved problems in the case of forming with a forming mold that applies embossment, i.e., problems that a forming mold is necessary for each embossed pattern and it is very difficult and expensive to provide complex embossment on a curved mold, so that it is possible to obtain a decorative molded body to which embossment of various patterns has been applied.

In the multi-layered film, it is possible to include, in addition to the sealing layer (I) and the layer (II), a surface layer, a surface decorative layer, a printing layer, a light-shielding layer, a coloring layer, a substrate layer, a barrier layer, a tie layer that can be provided between these layers, and the like. The layer (II) containing the polypropylene-based resin (B) may be any layer of the layers constituting the multi-layered film excluding the sealing layer.

In the multi-layered film, the layer other than the sealing layer (I) and the layer (II) is preferably a layer composed of a thermoplastic resin, more preferably a layer composed of a polypropylene-based resin. In the layer other than the sealing layer (I) and the layer (II), MFR (230° C., a load of 2.16 kg) of the polypropylene-based resin constituting the layer is not particularly limited as long as it can be discriminated from the sealing layer (I) and the layer (II). Each layer is preferably a layer containing no thermosetting resin. By using the thermoplastic resin, recyclability is improved and, by using the polypropylene-based resin, complication of layer configuration can be suppressed and further the recyclability is more improved.

When the decorative film is two-layered film, the sealing layer (I) constitutes a sealing layer of the sticking surface to the resin molded body and the layer (II) constitutes a surface layer reverse to the sticking surface to the resin molded body.

When the decorative film is a multi-layered film having three or more layers, there is a case where an effect of suppressing emergence of scratches on the substrate surface decreases when the other layer intervenes between the sealing layer (I) and the layer (II). Therefore, the multi-layered film preferably has a configuration of the sealing layer (I)/the layer (II)/the other layer(s) (including plural layers) from the sticking surface side of the resin molded body.

Figure 1B:
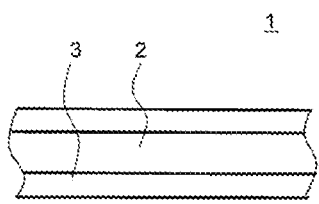
Figure 1C:
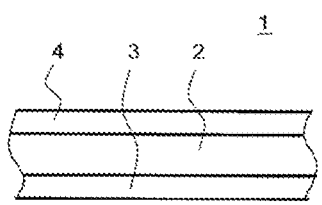

FIG. 1A to FIG. 1C are explanatory drawings schematically exemplifying the cross-sections of embodiments of the decorative film stuck to the resin molded body. In FIG. 1A to FIG. 1C, for easy understanding, explanation is conducted while specifying the disposition of the sealing layer (I) and the layer (II) but the layer configuration of the decorative film should not be construed as being limited to these exemplifications. Herein, the reference numeral 1 in the drawings represents the decorative film, the reference numeral 2 represents the layer (II), the reference numeral 3 represents the sealing layer (I), and the reference numeral 4 represents the surface decorative layer (III). FIG. 1A is an example in which the decorative film 1 is composed of a two-layered film, and the layer (II) 2 is laminated on the sealing layer (I) 3. The decorative film 1 of FIG. 1B is composed of the sealing layer (I) 3, the layer (II) 2, and a surface layer, and the layer (II) and the surface layer are laminated on the sealing layer (I) in this order. The decorative film 1 of FIG. 1C is composed of the sealing layer (I) 3, the layer (II) 2, and the surface decorative layer (III) 4, and the layer (II) and the surface decorative layer (III) are laminated on the sealing layer (I) in this order.

Figure 8A:
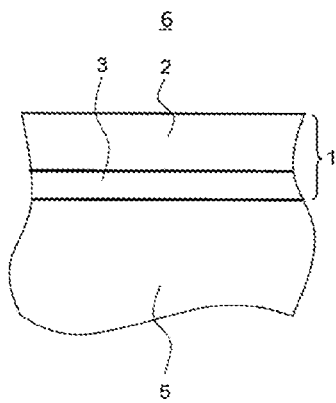
FIG. 8A to FIG. 8C are drawings showing examples of layer configuration of the obtained decorative molded body.
Figure 8B:
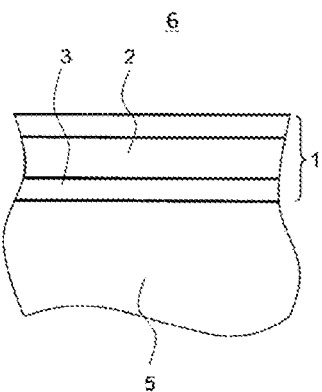
Figure 8C:
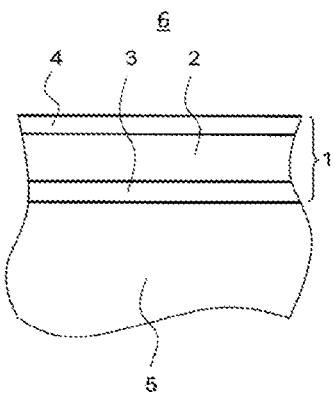

FIG. 8A to FIG. 8C are explanatory drawings schematically exemplifying the cross-sections of embodiments of the decorative molded body 6 in which the decorative film 1 has been stuck to the resin molded body 5. In FIG. 8A to FIG. 8C, for easy understanding, explanation is conducted while specifying the disposition of the sealing layer (I) and the layer (II) but the layer configuration of the decorative film 1 should not be construed as being limited to these exemplifications. FIG. 8A is an example in which the decorative film 1 is composed of a two-layered film, and the sealing layer (I) 3 is stuck on the surface of the resin molded body 5 and the layer (II) 2 is laminated on the sealing layer (I) 3. The decorative film 1 of FIG. 8B is composed of the sealing layer (I) 3, the layer (II) 2, and a surface layer, and the sealing layer (I) is stuck on the surface of the resin molded body 5 and the layer (II) and the surface layer are laminated on the sealing layer (I) in this order. The decorative film of FIG. 8C is composed of the sealing layer (I) 3, the layer (II) 2, and a surface decorative layer (III) 4, and the sealing layer (I) is stuck on the surface of the resin molded body 5 and the layer (II) and the surface decorative layer (III) are laminated on the sealing layer (I) in this order.

As another preferable embodiment of the decorative film, there may be mentioned a multi-layered film including a surface decorative layer (III) composed of a surface decorative layer resin on the uppermost surface at an opposite surface side to the sticking surface side to the resin molded body.

The surface decorative layer resin is preferably a thermoplastic resin, more preferably a polypropylene-based resin (H).

The melt flow rate (230° C., a load of 2.16 kg) (MFR(H)) of the polypropylene-based resin (H) in the present invention preferably satisfies the following: MFR(H)>MFR(B). By controlling the value to the above range, more beautiful surface texture can be expressed.

As the polypropylene-based resin (H) in the present invention, there may be selected one of various types of propylene-based polymers, such as propylene homopolymer (homopolypropylene), a propylene-α-olefin copolymer (random polypropylene), or a propylene-α-olefin block copolymer (block polypropylene), or a combination thereof. The propylene-based polymer preferably contains 50 mol % or more of a polymerization unit derived from a propylene monomer. The propylene-based polymer preferably does not contain a polymerization unit derived from a polar group-containing monomer. The polypropylene-based resin (H) is preferably homopolypropylene from the viewpoints of oil resistance, solvent resistance, scratch resistance, and the like. From the viewpoints of gloss and transparency (color development), a propylene-α-olefin copolymer is preferred. In the present invention, the polypropylene-based resin (H) constituting the surface decorative layer (III) may be the same as or different from the polypropylene-based resin (A) constituting the sealing layer (I).

The polypropylene-based resin (H) may contain an additive, a filler, other resin components, and the like. That is, it may be a resin composition (polypropylene-based resin composition) of a propylene-based polymer, an additive, a filler, other resin components, and the like. The total amount of the additive, filler, other resin components, and the like is preferably 50% by weight or less relative to the polypropylene-based resin composition.

As the additive, the additives and the like which may be contained in the resin composition (X) constituting the above sealing layer (I) can be used.

The polypropylene-based resin composition can be produced by a method of melt-kneading the polypropylene-based resin, an additive, a filler, other resin components, and the like, a method of melt-kneading the polypropylene-based resin, an additive, a filler, and the like and dry blending other resin components to the melt blended one, or a method of adding the polypropylene-based resin to the other resin components and dry blending a master batch in which an additive, a filler, and the like are dispersed in a carrier resin in a high concentration.

When the polypropylene-based resin (H) constituting the surface decorative layer (III) is a polypropylene-based resin composition, the polypropylene-based resin composition may be the same as or different from the polypropylene-based resin composition that composes the polypropylene-based resin (A) constituting the sealing layer (I).

The decorative film of the present invention has a thickness of preferably about 20 μm or more, more preferably about 50 μm or more, further preferably about 80 μm or more. By controlling the thickness of the decorative film to such a value or more, an effect of imparting design is improved and the stability at the forming is also improved, so that it becomes possible to obtain a more satisfactory decorative molded body. On the other hand, the thickness of the decorative film is preferably about 2 mm or less, more preferably about 1.2 mm or less, further preferably about 0.8 mm or less. By controlling the thickness of the decorative film to such a value or less, a time required for heating at the time of thermoforming is shortened, thereby improving productivity, and it becomes easy to trim an unnecessary portion.

In the decorative film of the present invention, the ratio of the thickness of the sealing layer (I) to the thickness of the whole decorative film is preferably 1 to 70% and the ratio of the thickness of the layer (II) is preferably 30 to 99%. When the ratio of thickness of the sealing layer (I) relative to the whole decorative film is in the above range, sufficient adhesive strength can be exhibited and the emergence of the scratches of the resin molded body (substrate) to the surface can be suppressed. Moreover, when the ratio of thickness of the layer (II) relative to the whole decorative film decorative film is in the above range, it can be avoided that the thermoformability of the decorative film becomes insufficient.

Furthermore, in the multi-layered film where the surface decorative layer (III) composed of the polypropylene-based resin (H) is provided on the uppermost surface of the decorative film, the ratio of the thickness of the surface decorative layer (III) in the decorative film is preferably 30% or less.

[Production of Decorative Film]

The decorative film of the present invention can be produced by known various molding methods.

For example, there may be mentioned a method of co-extrusion molding of the sealing layer (I) composed of the resin composition (X) and the layer (II) composed of the resin composition (Y), a method of co-extrusion molding of the sealing layer (I), the layer (II), and further the other layer(s), a thermal lamination method of attaching the other layer on one surface of one layer subjected to extrusion molding beforehand by applying heat and pressure, a dry lamination method and a wet lamination method of attaching layers through an adhesive, an extrusion lamination method of melt-extruding a polypropylene-based resin on one surface of one layer subjected to extrusion molding beforehand, a sand lamination method, and the like. As an apparatus for forming the decorative film, a known co-extrusion T-die molding machine or a known laminate molding machine can be used. Of these, from the viewpoint of productivity, the co-extrusion T-die molding machine is suitably used.

As a method of cooling a melted decorative film extruded from a die, there may be mentioned a method of bringing the melted decorative film into contact with one cooling roll through air discharged from an air knife unit or an air chamber unit and a method of cooling by pressing the film by means of a plurality of cooling rolls.

In the case of imparting gloss to the decorative film of the present invention, there is used a method of subjecting the decorative film to mirror finishing by surface-transferring a mirror surface-shaped cooling roll to a design surface of a product of the decorative film.

Furthermore, the decorative film of the present invention may have a crimped shape on the surface. Such a decorative film can be produced by a method of directly pressing a melted resin extruded from a die with a roll having an uneven shape and a smooth roll to surface-transferring the uneven shape, a method of pressing a smooth film with a roll having an uneven shape and a smooth roll, and other methods. As the crimped shape, satin-tone, animal skin-tone, hairline-tone, carbon-tone, and the like are exemplified.

The decorative film of the present invention may be subjected to a heat treatment after film forming. As methods for the heat treatment, there may be mentioned a method of heating with a hot roll, a method of heating with a heating furnace or a far-infrared heater, a method of blowing hot air, and other methods.

[Decorative Molded Body]

As a molded body to be decorated (a decoration object) in the present invention, various type of resin molded body (hereinafter, sometimes referred to as "substrate") composed of a polypropylene-based resin or a polypropylene-based resin composition can be used. The molding method of the resin molded body is not particularly limited and, for example, injection molding, blow molding, press molding, extrusion molding, and the like may be mentioned.

Since the polypropylene-based resin is non-polar, it is a hardly adhesive polymer but the decorative film in the invention includes the sealing layer (I) composed of the resin composition (X) and the layer (II) composed of the resin composition (Y), so that very high adhesive strength is exhibited through the sticking of the decoration object, which is composed of a polypropylene-based resin, and the decorative film, and also the scratches formed on the surface of the decoration object can be made inconspicuous.

As the base resin of the polypropylene-based resin and the polypropylene-based resin composition of the molded body that is the decoration object, there can be selected known various type ones using a propylene monomer as a main raw material, such as propylene homopolymer (homopolypropylene), propylene-α-olefin copolymers, or propylene block copolymers. Moreover, a filler such as talc for imparting rigidity, an elastomer for imparting impact resistance, and the like may be contained as long as they do not impair the advantages of the present invention. Furthermore, similarly to the aforementioned polypropylene-based resin composition that can constitute the decorative film, additive components and other resin components may be contained.

In the decorative molded bodies where the decorative film in the present invention is stuck to various molded bodies, which are composed of a polypropylene-based resin and formed into a three-dimensional shape, VOC contained in coating and adhesives is remarkably reduced, so that the decorative molded bodies can be suitably used as automobile members, home electric appliances, vehicles (railway etc.), building materials, daily necessities, and the like.

[Production of Decorative Molded Body]

The method for producing the decorative film of the present invention is characterized by including a step of preparing the aforementioned decorative film, a step of preparing a resin molded body, a step of setting the resin molded body and the decorative film in a pressure-reducible chamber box, a step of reducing the pressure in the chamber box, a step of heating and softening the decorative film, a step of pushing the decorative film to the resin molded body, and a step of returning the inside of the pressure-reduced chamber box to atmospheric pressure or pressurizing the inside.

The three-dimensional decorative thermoforming has a basic steps of setting an decoration object and the decorative film in a pressure-reducible chamber box, heating and softening the film in a state that the pressure in the chamber box is reduced, pushing the decorative film to the decoration object, and sticking the decorative film to the surface of the decoration object by returning the inside of the chamber box to atmospheric pressure or pressurizing the inside, thus performing attachment of the film under reduced pressure. Thereby, a beautiful decorative molded body can be obtained without generation of air bubbles. In the production method of the present invention, known any techniques can be used as long as they are equipments and conditions suitable to the three-dimensional decorative thermoforming.

That is, the chamber box may be one chamber box which accommodates all of the decoration object and the decorative film and a mechanism for pushing it, an apparatus for heating the decorative film, and the like or may be plural ones divided by the decorative film.

Moreover, the mechanism for pushing the decoration object to the decorative film may be any type of one that transfers the decoration object, one that transfers the decorative film, and one that transfers the both.

More specifically, typical forming methods are exemplified in the following.

Hereinafter, with reference to drawings, there is illustratively explained the method of sticking the decorative film to the decoration object using a three-dimensional decorative thermoforming machine.

Figure 2:
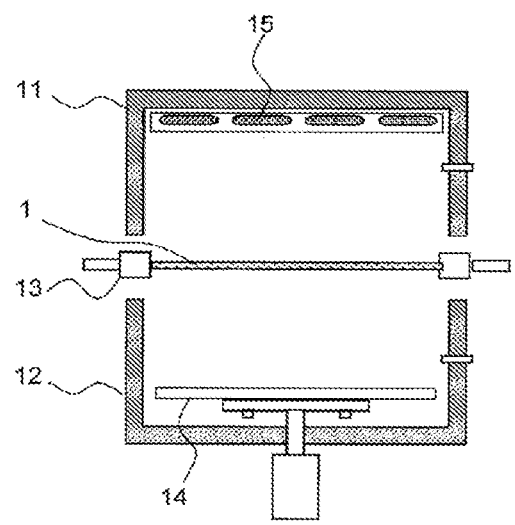
FIG. 2 is a schematic cross-sectional view illustrating outline of an apparatus to be used in the method for producing the decorative film of the present invention.

As shown in FIG. 2, the three-dimensional decorative thermoforming machine of this embodiment has chamber boxes 11 and 12 at the upper and lower sides and also thermoforming of the decorative film 1 is performed inside the two chamber boxes 11 and 12. A vacuum circuit (not shown in the figure) and an air circuit (not shown in the figure) are piped to the upper and lower chamber boxes 11 and 12, respectively.

Further, between the upper and lower chamber boxes 11 and 12, a jig 13 for fixing the decorative film 1 is provided. Moreover, a table 14 that can ascend and descend is installed in the lower chamber box 12 and a resin molded body (decoration object) 5 is set on the table 14 (through a jig or the like or directly). A heater 15 is incorporated in the upper chamber box 11 and the decorative film 1 is heated by the heater 15. As the decoration object 5, a propylene-based resin composition may be a substrate.

As such a three-dimensional decorative thermoforming machine, a commercially available forming machine (e.g., NGF series manufactured by Fu-se Vacuum Forming Ltd.) can be used.

Figure 3:
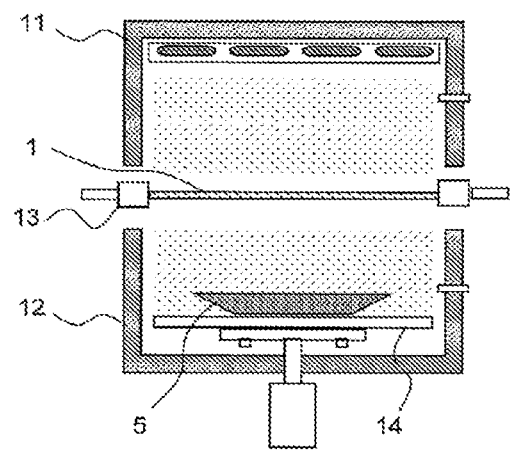
FIG. 3 is a schematic cross-sectional view illustrating a state that a resin molded body and a decorative film has been set in the apparatus of FIG. 2.

As shown in FIG. 3, first, in a state that the upper and lower chamber boxes 11 and 12 are opened, the decoration object 5 is placed on the table 14 in the lower chamber box 12 and the table 14 is set in a descended state. Subsequently, the decorative film 1 is set on the jig 13 for film fixing between the upper and lower chamber boxes 11 and 12 so that the sealing layer (I) faces to the substrate, i.e., the decoration object 5.

Figure 4:
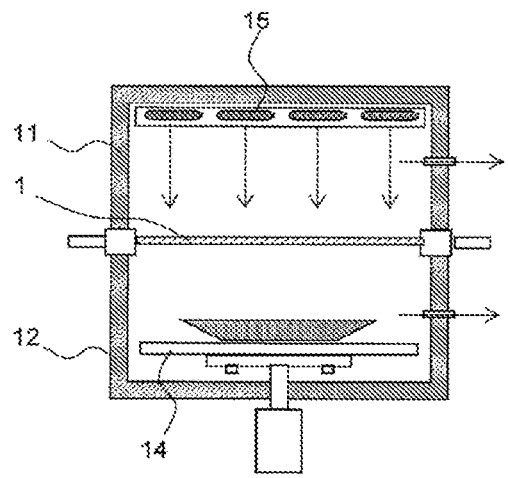
FIG. 4 is a schematic cross-sectional view illustrating a state of performing heating and pressure reduction in the apparatus of FIG. 2.

As shown in FIG. 4, the upper chamber box 11 is descended and the upper and lower chamber boxes 11 and 12 are jointed to make the insides of the boxes a closed state. Thereafter, a vacuum-suctioned state is achieved in the inside of each of the upper and lower chamber boxes 11 and 12 and the decorative film 1 is heated by the heater 15.

Figure 5:
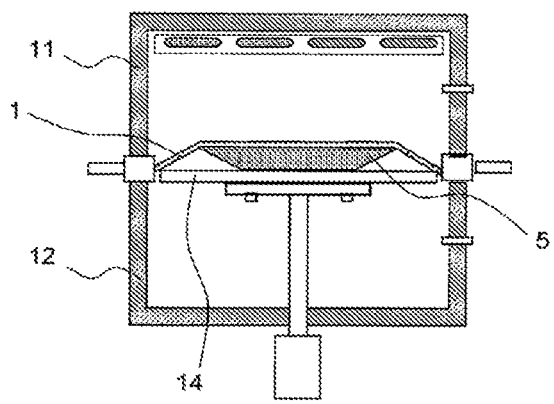
FIG. 5 is a schematic cross-sectional view illustrating a state of pressing a decorative film to a resin molded body in the apparatus of FIG. 2.
Figure 6:
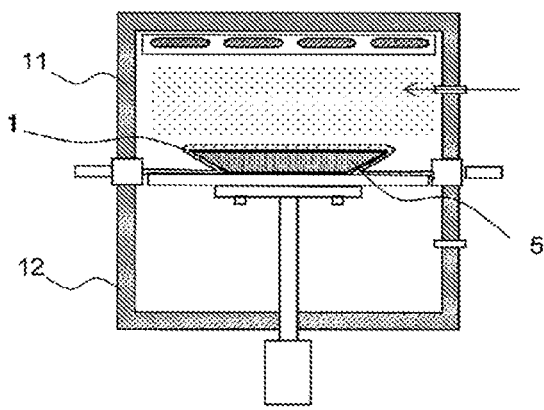
FIG. 6 is a schematic cross-sectional view illustrating a state of returning the pressure to atmospheric pressure or performing pressurization in the apparatus of FIG. 2.

After the decorative film 1 is heated and softened, as shown in FIG. 5, the table 14 in the lower chamber box 12 is ascended while maintaining the inside of the upper and lower chamber boxes 11 and 12 in the vacuum suctioned state. The decorative film 1 is pushed to the decoration object 5 to cover the decoration object 5. Further, as shown in FIG. 6, by opening the upper chamber box 11 under atmospheric pressure or feeding compressed air from an air pressure tank, the decorative film 1 is closely adhered to the decoration object 5 by greater force.

Figure 7:
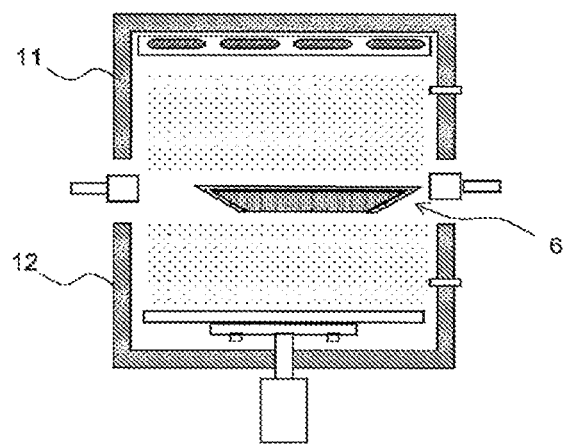
FIG. 7 is a schematic cross-sectional view illustrating a state that the unnecessary edge of a decorative film has been trimmed in an obtained decorative molded body.

Subsequently, the insides of the upper and lower chamber boxes 11 and 12 are opened under atmospheric pressure and a decorative molded body 6 is taken out of the lower chamber box 12. Finally, as exemplified in FIG. 7, an unnecessary edge of the decorative film 1 around the decorative molded body 6 is trimmed.

[Forming Conditions]

The reduction of the pressure in the chamber boxes 11 and 12 may be to such a degree that air bubbles are not generated and the pressure in the chamber boxes is 10 kPa or less, preferably 3 kPa or less, more preferably 1 kPa or less.

Moreover, in the two chamber boxes 11 and 12 divided into upper and lower ones by the decorative film 1, it is sufficient that the pressure in the chamber box at the side where the decoration object 5 and the decorative film 1 are attached is in the above range, and draw-down of the decorative film 1 can be also suppressed by changing the pressure of the upper and lower chamber boxes 11 and 12.

At this time, a film composed of a common polypropylene-based resin is sometimes remarkably deformed or broken by slight pressure variation owing to a decrease in viscosity at the time of heating.

The decorative film 1 of the present invention not only is less prone to generate draw-down but also has resistance to film deformation.

The heating of the decorative film 1 is controlled by heater temperature (output) and heating time. Further, it is also possible that the surface temperature of the film is measured on a thermometer such as a radiation thermometer and the temperature is used as a measure of suitable conditions.

In the present invention, for sticking the polypropylene-based decorative film 1 to the decoration object 5 composed of a polypropylene-based resin, it is necessary to soften or melt the surface of the resin molded body 5 and the decorative film 1 sufficiently.

Therefore, the heater temperature should be higher than melting temperature of the polypropylene-based resin constituting the decoration object 5 and the polypropylene-based resin constituting the decorative film 1. The heater temperature is preferably 160° C. or higher, more preferably 180° C. or higher, most preferably 200° C. or higher.

Although a time required for heating is shortened as the heater temperature becomes high, the temperature at the heater side becomes too high until the inside of the decorative film 1 (or an opposite face to the heater in the case where the heater is installed only at one side) is sufficiently heated and thus not only deterioration of the formability is invited but also the resin is thermally degraded, so that the heater temperature is preferably 500° C. or lower, more preferably 450° C. or lower, most preferably 400° C. or lower.

Suitable heating time varies depending on the heater temperature but, if short, it is preferred to continue heating for such a period of time that the polypropylene-based decorative film is heated and tension-back called spring-back is started or for a period of time that is longer than the period. In the basic embodiment, the first embodiment, and the second embodiment, it is preferred to continue heating for a period of time after 2 seconds from the finish of tension-back or for a period of time that is longer than the period.

That is, the decorative film heated by the heater shows behavior that it is thermally expanded by heating from a solid state and once slackens with the progress of crystal melting, spring-back where tension temporarily returns is observed through relaxation of the molecule when the crystal melting proceeds throughout the film, and thereafter it hangs down by its own weight. After the spring-back, crystals are completely melted in the film and the relaxation of the molecule is sufficient, so that sufficient adhesive strength is obtained.

Furthermore, since the decorative film of the present invention can surprisingly adhere to the substrate strongly even when decorative thermoforming is performed before the tension return is finished, it is possible to reduce such damage to the film that the additive(s) contained in the film migrate to the outside of the film and a large effect is also observed on the suppression of fading of crimps.

On the other hand, when the heating time is too long, the film hangs down by it own weight or is deformed due to pressure difference between the upper and lower chamber boxes, so that the heating time is preferably less than 120 seconds after the finish of the spring-back.

In the case where a complex-shape molded body having unevenness is decorated or in the case where higher adhesive force is achieved, it is preferred to feed compressed air at the time of closely adhering the decorative film to the substrate. The pressure in the upper chamber box at the time of introducing the compressed air is 150 kPa or more, preferably 200 kPa or more, more preferably 250 kPa or more. An upper limit is not particularly limited but, since there is a concern of damaging devices when the pressure is too high, it is suitable that the pressure is 450 kPa or less, preferably 400 kPa or less.

EXAMPLE

Hereinafter, the present invention will be further specifically explained as Examples, but the invention should not be construed as being limited to the Examples.

Test Examples 1 and 2

(Measurement Methods and Evaluation Methods of Various Physical Properties)
1. Measurement Methods of Various Physical Properties
(i) Melt Flow Rate (MFR)

It was measured at 230° C. under a load of 2.16 kg in accordance with ISO 1133:1997 Conditions M. The unit is g/10 minutes.
(ii) Melting Peak Temperature (Melting Point)

Using a differential scanning calorimeter (DSC), after temperature was once raised to 200° C. and kept for 10 minutes, the temperature was lowered to 40° C. at a temperature-lowering rate of 10° C./minute, and, at the time of measurement again at a temperature-raising rate of 10° C./minute, a temperature at the endothermic peak top was taken as melting peak temperature (melting point). The unit is ° C.
(iii) Crystallization Temperature Using a differential scanning calorimeter (DSC), 5 mg of sheet-shaped sample pieces were placed in an aluminum pan and, after temperature was once raised from 50° C. to 200° C. at a temperature-raising rate of 100° C./min and kept for 5 minutes, the temperature was lowered to 40° C. at a rate of 10° C./minute to effect crystallization. Crystallization maximum peak temperature at this time was taken as crystallization temperature (Tc).
(iv) GPC Measurement GPC measurement was performed using the following apparatus and conditions and calculation of Mw/Mn was conducted.

Apparatus: GPC manufactured by Waters Corporation (ALC/GPC 150C)
Detector: MIRAN 1A IR detector (measurement wavelength: 3.42 μm) manufactured by FOXBORO.
Column: AD806M/S (3 columns) manufactured by Showa Denko K.K.
Mobile phase solvent: ortho-dichlorobenzene (ODCB)
Measurement temperature: 140° C.
Flow rate: 1.0 ml/min
Injection amount: 0.2 nil
Sample preparation: A sample is prepared as a 1 mg/mL solution using ODCB (containing 0.5 mg/mL of BHT), which is dissolved at 140° C. with taking about 1 hour.

The conversion from retention volume obtained on GPC measurement into molecular weight is performed using a calibration curve preliminarily generated with standard polystyrenes (PS). The standard polystyrenes to be used are the following brands all manufactured by Tosoh Corporation.

F380, F288, F128, F80, F40, F20, F10, F4, F1, A5000, A2500, A1000

A solution dissolved in ODCB (containing 0.5 mg/mL of BHT) so that each of them becomes 0.5 mg/mL is injected in an amount of 0.2 mL to create a calibration curve. As for the calibration curve, there is used a cubic expression obtained through approximation by the least square method.

Incidentally, in a viscosity expression $[\eta]=K \times M^{\alpha}$ to be used for the conversion into molecular weight, the following numerals are used.

PS: $K=1.38 \times 10^{-4}$, $\alpha=0.7$
PP: $K=1.03 \times 10^{-4}$, $\alpha=0.78$ 2. Physical Property Evaluation of Decorative Molded Body
(1) Evaluation of Thermoformability A draw-down state of the decorative film at the time of three-dimensional decorative thermoforming and a sticking state of the decorative film of the decorative molded body where the decorative film is stuck to the substrate were visually observed and evaluated by the criteria shown below.

○: Since the contact between the substrate and the decorative film is simultaneously achieved over a whole contact surface without generating draw-down of the decorative film at the time of three-dimensional decorative thermoforming, uneven contact is not generated and the film is uniformly stuck.

Δ: Since slight draw-down of the decorative film occurs at the three-dimensional decorative thermoforming, the contact with the decorative film is started from the center of the substrate and thus uneven contact is generated at an edge part of the upper surface of the substrate.

x: Since draw-down of the decorative film remarkably occurs at the time of three-dimensional decorative thermoforming, uneven contact is generated all over the surface of the substrate.
(2) Adhesive Force Between Resin Molded Body (Substrate) and Decorative Film "Craft pressure-sensitive adhesive tape No. 712N" manufactured by Nitoms, Inc. was cut into a size having a width of 75 mm and a length of 120 mm and was attached to a resin molded body (substrate) in the range of 75 mm×120 mm from the edge part of the resin molded body (substrate) to perform a masking treatment (a surface exposed part of the substrate had a width of 45 mm and a length of 120 mm). The resin molded body (substrate) was placed on a three-dimensional decorative thermoforming apparatus NGF-0406-SW so that the masking face of the molded body came into contact with the decorative film, and three-dimensional decorative thermoforming was conducted.

The decorative film face of the obtained decorative molded body was cut to the substrate surface at a width of 10 mm using a cutter in a vertical direction toward a longitudinal direction of the pressure-sensitive adhesive tape to prepare a test specimen. In the obtained test specimen, the adhesion face between the substrate and the decorative film has a width of 10 mm and a length of 45 mm. It was fixed to a tensile tester so that the substrate part and the decorative film part of the test specimen made an angle of 180°, and 180° peeling strength of the adhesion face was measured at a tensile rate of 200 mm/min. Maximum strength (N/10 mm) at peeling or at break was measured five times and averaged strength was taken as adhesive force.
(3) Evaluation of Effect of Making Scratches Inconspicuous Depth of scratches at the portion where scratches was present on a three-dimensional decorative thermoformed product of a resin molded body (substrate) which had been scratched with a load of 15 N was measured by means of a shape-measuring laser microscope ("VX-X200" manufactured by KEYENCE Corporation). The number of measurement times was 5 times (n=5) and an average value thereof was taken as scratch depth (μm).

Moreover, as whitened appearance, it was visually judged by the following criteria whether whitened scratches of the molded body (substrate), which had been scratched with a load of 15 N, were made inconspicuous or not by the decorative film, and evaluated.

○: Scars of whitened scratches are inconspicuous and appearance is excellent.

Δ: Whitened scratches partially remain and appearance is poor.

x: Whitened scratches remain as a whole and appearance is poor.

(4) Gloss

The gloss in the vicinity of the center of the decorative molded body to which a decorative film had been stuck was measured at an incident angle of 60° using Gloss Meter VG2000 manufactured by Nippon Denshoku Industries Co., Ltd. The measurement method was in accordance with JIS K7105-1981.

(5) Evaluation of Recyclability

The obtained decorative molded body was pulverized and a recycled molded body was obtained by injection molding in the same manner as in the production of the resin molded body (substrate). The appearance was visually evaluated. One excellent in appearance was evaluated as "O".

(Preparation of Resin Molded Body (Substrate))

1. Polypropylene-Based Resin Used for Resin Molded Body

The following polypropylene-based resins were used.

(X-1): Propylene homopolymer (MFR=40 g/10 minutes, Tm=165° C.), trade name "NOVATEC (registered trademark) MA04H" manufactured by Japan Polypropylene Corporation (X-2): Propylene ethylene block copolymer (MFR=30 g/10 minutes, Tm=164° C.), trade name "NOVATEC (registered trademark) NBC03HR" manufactured by Japan Polypropylene Corporation (X-3): Polypropylene-based resin composition obtained by blending 60% by weight of the polypropylene-based resin (X-2) with 20% of EBR (TAFMER (registered trademark) A0550S manufactured by Mitsui Chemicals, Inc.) of MFR=1.0 and 20% by weight of an inorganic filler (TALC P-6 manufactured by Nippon Talc Co., Ltd., average particle size of 4.0 µm)

2. Production of Resin Molded Body (Substrate)

Using the polypropylene-based resins (X-1) to (X-3), injection molded bodies were obtained by the following method. Moreover, the obtained injection molded bodies were scratched by the following method to form resin molded bodies (substrates). Injection molding machine: "IS100GN" manufactured by Toshiba Machine Co., Ltd., mold clamping pressure of 100 tons
Cylinder temperature: 200° C.
Mold temperature: 40° C.
Injection mold: A flat plate of width×height×thickness=120 mm×120 mm×3 mm Condition control: Kept in a constant-temperature constant-humidity chamber at a temperature of 23° C. and a humidity of 50% RH for 5 days
Processing for scratch evaluation: In a constant-temperature constant-humidity chamber at a temperature of 23° C. and a humidity of 50% RH, using a scratch tester ("SCRATCH & MAR TESTER" manufactured by ROCKWOOD SYSTEMS AND EQUIPMENT), each of the above injection molded bodies was scratched with a scratching tip subjected to shape (curvature radius of 0.5 mm, ball shape) processing, at a scratching rate of 100 mm/minute under a load of 15 N.

When the scratches formed on the surface of the resin molded body (substrate) was measured by means of a shape-measuring laser microscope ("VX-X200" manufactured by KEYENCE Corporation), the depth of the scratches was 13 µm. Further, the scratches became whitened scratches.

Test Example 1

[Used Materials]
(1) Polypropylene-Based Resins

The following polypropylene-based resins were used.

(1A-1): Propylene-α-olefin copolymer (MFR=7 g/10 minutes, Tm=125° C., Mw/Mn=2.5) by metallocene catalyst, trade name "WINTEC (registered trademark) WFX4M" manufactured by Japan Polypropylene Corporation (1A-2): Propylene-α-olefin copolymer (MFR=25 g/10 minutes, Tm=125° C., Mw/Mn=2.4) by metallocene catalyst, trade name "WINTEC (registered trademark) WSX03" manufactured by Japan Polypropylene Corporation (1A-3): Propylene-α-olefin copolymer (MFR=7 g/10 minutes, Tm=135° C., Mw/Mn=2.3) by metallocene catalyst, trade name "WINTEC (registered trademark) WFW4M" manufactured by Japan Polypropylene Corporation (1A-4): Propylene-α-olefin copolymer (MFR=30 g/10 minutes, Tm=145° C., Mw/Mn=2.4) by metallocene catalyst, trade name "WINTEC (registered trademark) WMG03" manufactured by Japan Polypropylene Corporation (1A-5): Propylene-α-olefin copolymer (MFR=7 g/10 minutes, Tm=145° C., Mw/Mn=4.0) by Ziegler-Nana catalyst, trade name "NOVATEC (registered trademark) FW3GT" manufactured by Japan Polypropylene Corporation (1B-1): Propylene homopolymer (MFR=2.4 g/10 minutes, Tm=161° C.) by Ziegler-Natta catalyst, trade name "NOVATEC (registered trademark) FY6" manufactured by Japan Polypropylene Corporation (1B-2): Propylene homopolymer (MFR=0.4 g/10 minutes, Tm=161° C.) by Ziegler-Natta catalyst, trade name "NOVATEC (registered trademark) EA9" manufactured by Japan Polypropylene Corporation (1B-3): Polypropylene-based resin composition (MFR=2.4 g/10 minutes, Tm=161° C.) obtained by blending 96% by weight of the polypropylene-based resin (1B-1) with 4% by weight of a black pigment MB (EPP-K-120601 manufactured by Polycol Kogyo K.K.)

(1C-1): Propylene homopolymer (MFR=10 g/10 minutes, Tm=161° C.), trade name "NOVATEC (registered trademark) FA3KM" manufactured by Japan Polypropylene Corporation (1C-2): Polypropylene-based resin composition (MFR=10 g/10 minutes, Tm=164° C.) obtained by blending 100% by weight of the polypropylene-based resin (1C-1) with 0.4% by weight of a nucleating agent (trademark "Millad NX8000J" manufactured by Milliken Japan)

(1C-3): Polypropylene-based resin composition (MFR=7 g/10 minutes, Tm=127° C.) obtained by blending 100% by weight of the polypropylene-based resin (1A-1) with 0.4% by weight of a nucleating agent (trademark "Millad NX8000J" manufactured by Milliken Japan)

(1C-4): Polypropylene-based resin composition (MFR=10 g/10 minutes, Tm=161° C.) obtained by blending 96% by weight of the polypropylene-based resin (1C-1) with 4% by weight of a white pigment MB (EPP-W-59578 manufactured by Polycol Kogyo K.K., titanium oxide content of 80% by weight)

(1C-5): Polypropylene-based resin composition (MFR=10 g/10 minutes, Tm=161° C.) obtained by blending 96% by weight of the polypropylene-based resin (1C-1) with 4% by weight of a silver pigment MB (PPCM913Y-42 SILVER21X manufactured by TOYOCOLOR Co., Ltd.)

Example 1-1

Production of Decorative Film

There was used a 2-kind 2-layer T-die having a lip opening of 0.8 mm and a die width of 400 mm, to which an extruder-1 for a sealing layer (I) having a nozzle diameter of 30 mm (diameter) and an extruder-2 for a layer (II) having a nozzle diameter of 40 mm (diameter) had been connected.

The polypropylene-based resin (1A-1) was charged into the extruder-1 for a sealing layer (I) and the polypropylene-based resin (1B-1) was charged into the extruder-2 for a layer (II) and melt-extrusion was performed under conditions of a resin temperature of 240° C., a discharge amount from the extruder-1 for a sealing layer (I) of 4 kg/h, and a discharge amount from the extruder-2 for a layer (II) of 12 kg/h. The melt-extruded film was cooled and solidified while pushing it to a first roll rotating at 3 m/min at 80° C. with an air knife so that the sealing layer (I) came outside, thereby obtaining a two-layered unstretched film where a sealing layer (I) having a thickness of 50 μm and a layer (II) having a thickness of 150 μm were laminated.

Three-Dimensional Decorative Thermoforming

As the resin molded body (substrate) 5, there was used the injection molded body composed of the polypropylene-based resin (X-1) obtained in the above.

As a three-dimensional decorative thermoforming apparatus, "NGF-0406-SW" manufactured by Fu-se Vacuum Forming Ltd. was used. As shown in FIG. 2 to FIG. 7, a decorative film 1 was cut into a size having a width of 250 mm and a length of 350 min and was set to a jig 13 for film fixing having an opening part size of 210 mm×300 mm so that the sealing layer (I) faced to the substrate (resin molded body 5) and the longitudinal direction became the MD direction of the film. The resin molded body 5 was attached on a sample-placing stand having a height of 20 mm, which was placed on a table 14 positioned below the jig 13, through "NICETACK NW-K15" manufactured by Nichiban Co., Ltd. The jig 13 and the table 14 were placed in upper and lower chamber boxes 11 and 12 and the upper and lower chamber boxes 11 and 12 were closed to make the inside of the chamber boxes a tightly closed state. The chamber boxes were divided into upper and lower ones through the decorative film 1. The upper and lower chamber boxes 11 and 12 were vacuum-suctioned and a far-infrared heater 15 placed on the upper chamber box 11 was started at an output of 80% to heat the decorative film 1 in a state that the pressure was reduced from atmospheric pressure (101.3 kPa) to 1.0 kPa. During heating, the vacuum-suction was continued and finally, the pressure was reduced to 0.1 kPa. After 5 seconds from the finish of a spring-back phenomenon that the decorative film 1 was heated to temporarily slacken and thereafter tension returned, the table 14 placed in the lower chamber box 12 was transferred upward to push the resin molded body 5 to the decorative film 1 and immediately after that, compressed air was fed so that the pressure in the upper chamber box 11 became 270 kPa to adhere the resin molded body 5 and the decorative film 1 closely. Thus, there was obtained a three-dimensional decorative thermoformed article (decorative molded body 6) where the decorative film 1 was stuck on the upper surface and side surface of the resin molded body 5.

Table 1-1 shows evaluation results of physical properties of the obtained decorative molded bodies and the like.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 1-2

Evaluation was performed in the same manner as in Example 1-1 except that, in the production of the decorative film of Example 1-1, the polypropylene-based resin (1A-1) used for the sealing layer (I) was changed to the polypropylene-based resin (1A-2). Table 1-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 1-3

Evaluation was performed in the same manner as in Example 1-1 except that, in the production of the decorative film of Example 1-1, the polypropylene-based resin (1A-1) used for the sealing layer (1) was changed to the polypropylene-based resin (1A-3). Table 1-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 1-4

Evaluation was performed in the same manner as in Example 1-1 except that, in the production of the decorative film of Example 1-1, the polypropylene-based resin (1A-1) used for the sealing layer (I) was changed to the polypropylene-based resin (1A-4). Table 1-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 1-5

Evaluation was performed in the same manner as in Example 1-1 except that, in the production of the decorative film of Example 1-1, the polypropylene-based resin (1B-1) used for the layer (II) was changed to the polypropylene-based resin (1B-2). Table 1-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 1-6

Evaluation was performed in the same manner as in Example 1-5 except that, in the production of the decorative film of Example 1-5, the polypropylene-based resin (1A-1) used for the sealing layer (I) was changed to the polypropylene-based resin (1A-2). Table 1-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 1-7

Evaluation was performed in the same manner as in Example 1-5 except that, in the production of the decorative film of Example 1-5, the polypropylene-based resin (1A-1) used for the sealing layer (I) was changed to the polypropylene-based resin (1A-3). Table 1-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 1-8

Evaluation was performed in the same manner as in Example 1-5 except that, in the production of the decorative film of Example 1-5, the polypropylene-based resin (1A-1) used for the sealing layer (I) was changed to the polypropylene-based resin (1A-4). Table 1-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 1-9

Evaluation was performed in the same manner as in Example 1-1 except that, in the three-dimensional decorative thermoforming of Example 1-1, the substrate was changed to the injection molded body using the resin (X-2). Table 1-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 1-10

Evaluation was performed in the same manner as in Example 1-1 except that, in the three-dimensional decorative thermoforming of Example 1-1, the substrate was changed to the injection molded body using the resin (X-3). Table 1-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Reference Example 1-1

Evaluation was performed in the same manner as in Example 1-1 except that, in the production of the decorative film of Example 1-1, the polypropylene-based resin (1A-1) used for the sealing layer (I) was changed to the polypropylene-based resin (1A-5). Table 1-1 shows evaluation results.

Since the polypropylene-based resin (1A-5) had so high Mw/Mn as 4.0, adhesive force was small and emergence of scratches could not be sufficiently suppressed. Thus, the appearance was poor.

Example 1-11

In the production of the decorative film of Example 1-1, there was used a 3-kind 3-layer T-die having a lip opening of 0.8 mm and a die width of 400 mm, to which an extruder-1 for a sealing layer (I) having a nozzle diameter of 30 mm (diameter), an extruder-2 for an intermediate layer (layer (II)) having a nozzle diameter of 40 mm (diameter), and an extruder-3 for a surface layer (surface decorative layer (III)) having a nozzle diameter of 30 mm (diameter), had been connected. The polypropylene-based resin (1A-3) was charged into the extruder-1 for a sealing layer (I), the polypropylene-based resin (1B-1) was charged into the extruder-2 for an intermediate layer, and the polypropylene-based resin (1A-3) was charged into the extruder-3 for a surface layer, and melt-extrusion was performed under conditions of a resin temperature of 240° C., a discharge amount from the extruder-1 for a sealing layer (I) of 4 kg/h, a discharge amount from the extruder-2 for an intermediate layer of 8 kg/h, and a discharge amount from the extruder-3 for a surface layer of 4 kg/h.

The melt-extruded film was cooled and solidified so that the surface decorative layer came into contact with a cooling roll rotating at 3 m/min at 80° C., thereby obtaining a three-layered unstretched film where a surface decorative layer (III) having a thickness of 50 μm, a layer (II) (intermediate layer) having a thickness of 100 μm, and a sealing layer (I) having a thickness of 50 μm were laminated.

Evaluation was performed in the same manner as in Example 1-1 except that the unstretched film obtained in the above decorative film production was used. Table 1-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the polypropylene-based resin (1A-3) was laminated as the surface decorative layer (III) at the uppermost surface side, so that a result of excellent gloss was observed.

Furthermore, the recycled molded body was excellent in appearance (evaluation: O).

Example 1-12

Evaluation was performed in the same manner as in Example 1-11 except that, in the production of the decorative film of Example 1-11, the polypropylene-based resin (1A-3) used for the surface decorative layer (III) was changed to the polypropylene-based resin (1C-1). Table 1-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the polypropylene-based resin (1C-1) was laminated as the surface decorative layer (111) at the uppermost surface side, so that a result of excellent gloss was observed.

Furthermore, the recycled molded body was excellent in appearance (evaluation: O).

Example 1-13

Evaluation was performed in the same manner as in Example 1-11 except that, in the production of the decorative film of Example 1-11, the polypropylene-based resin (1A-3) used for the surface decorative layer (III) was changed to the polypropylene-based resin (1C-2). Table 1-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous.

Moreover, the polypropylene-based resin (1C-2) to which a nucleating agent had been added was laminated as the surface decorative layer (III) at the uppermost surface side, so that a result of excellent gloss was observed. Furthermore, the recycled molded body was excellent in appearance (evaluation: O).

Example 1-14

Evaluation was performed in the same manner as in Example 1-11 except that, in the production of the decorative film of Example 1-11, the polypropylene-based resin (1A-3) used for the surface decorative layer (III) was changed to the polypropylene-based resin (1A-1). Table 1-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the polypropylene-based resin (1A-1) was laminated as the surface decorative layer (III) at the uppermost surface side, so that a result of excellent gloss was observed.

Furthermore, the recycled molded body was excellent in appearance (evaluation: O).

Example 1-15

Evaluation was performed in the same manner as in Example 1-11 except that, in the production of the decorative film of Example 1-11, the polypropylene-based resin (1A-3) used for the surface decorative layer (III) was changed to the polypropylene-based resin (1C-3). Table 1-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the polypropylene-based resin (1C-3) to which a nucleating agent had been added was laminated as the surface decorative layer (III) at the uppermost surface side, so that a result of excellent gloss was observed. Furthermore, the recycled molded body was excellent in appearance (evaluation: O).

Example 1-16

Evaluation was performed in the same manner as in Example 1-11 except that, in the production of the decorative film of Example 1-11, the polypropylene-based resin (1A-3) used for the surface decorative layer (III) was changed to the polypropylene-based resin (1C-4). Table 1-1 shows evaluation results.

Since the polypropylene-based resin (A) and the polypropylene-based resin (B) satisfy all the requirements of the present invention, the obtained decorative molded body was excellent in appearance and adhesive force. Further, coupled with the sticking of the white-colored decorative film, the scratches were sufficiently hidden to such a degree that the scratched place was not able to identify. Therefore, the scratch depth was not measured. Moreover, since the surface decorative layer (III) excellent in gloss was colored white, appearance was excellent. Furthermore, the recycled molded body was excellent in appearance (evaluation: O).

Example 1-17

Evaluation was performed in the same manner as in Example 1-12 except that, in the production of the decorative film of Example 1-12, the polypropylene-based resin (1B-1) used for the layer (II) that is an intermediate layer was changed to the polypropylene-based resin (1B-3). Table 1-1 shows evaluation results.

Since the polypropylene-based resin (A) and the polypropylene-based resin (B) satisfy all the requirements of the present invention, the obtained decorative molded body was excellent in appearance and adhesive force. Further, coupled with the sticking of the black-colored decorative film, the scratches were sufficiently hidden to such a degree that the scratched place was not able to identify. Therefore, the scratch depth was not measured. Moreover, since the layer (II) was colored black, appearance was excellent. Furthermore, the recycled molded body was excellent in appearance (evaluation: O).

Example 1-18

Evaluation was performed in the same manner as in Example 1-17 except that, in the production of the decorative film of Example 1-17, the polypropylene-based resin (1C-1) used for the surface decorative layer (III) was changed to the polypropylene-based resin (1C-5). Table 1-1 shows evaluation results.

Since the polypropylene-based resin (A) and the polypropylene-based resin (B) satisfy all the requirements of the present invention, the obtained decorative molded body was excellent in appearance and adhesive force. Further, coupled with the sticking of the colored decorative film, the scratches were sufficiently hidden to such a degree that the scratched place was not able to identify. Therefore, the scratch depth was not measured. Moreover, since the layer (II) was colored black and the layer (III) was colored silver, the film became a metallic film and appearance was excellent. Furthermore, the recycled molded body was excellent in appearance (evaluation: O).

TABLE 1-1

| | | Unit | Example 1-1 | Example 1-2 | Example 1-3 | Example 1-4 | Example 1-5 | Example 1-6 | Example 1-7 | Example 1-8 | Example 1-9 | Example 1-10 |
|---|---|---|---|---|---|---|---|---|---|---|---|---|
| Surface decorative layer (III) | Resin H Kind | | — | — | — | — | — | — | — | — | — | — |
| | MFR | g/10 min | — | — | — | — | — | — | — | — | — | — |
| Layer (II) | Resin B Kind | | 1B-1 | 1B-1 | 1B-1 | 1B-1 | 1B-2 | 1B-2 | 1B-2 | 1B-2 | 1B-1 | 1B-1 |
| | MFR | g/10 min | 2.4 | 2.4 | 2.4 | 2.4 | 0.4 | 0.4 | 0.4 | 0.4 | 2.4 | 2.4 |
| | Tm | °C. | 161 | 161 | 161 | 161 | 161 | 161 | 161 | 161 | 161 | 161 |
| Sealing layer (I) | Resin A Kind | | 1A-1 | 1A-2 | 1A-3 | 1A-4 | 1A-1 | 1A-2 | 1A-3 | 1A-4 | 1A-1 | 1A-1 |
| | MFR | g/10 min | 7 | 25 | 7 | 30 | 7 | 25 | 7 | 30 | 7 | 7 |
| | Tm | °C. | 125 | 125 | 135 | 145 | 125 | 125 | 135 | 145 | 135 | 135 |
| | Mw/Mn | | 2.5 | 2.4 | 2.3 | 2.4 | 2.5 | 2.4 | 2.3 | 2.4 | 2.3 | 2.3 |
| MFR(B)/MFR(A) | | | 0.343 | 0.096 | 0.343 | 0.080 | 0.057 | 0.016 | 0.057 | 0.013 | 0.343 | 0.343 |
| Substrate | Kind | | X-1 | X-1 | X-1 | X-1 | X-1 | X-1 | X-1 | X-1 | X-2 | X-3 |
| Heating time | | sec | 5 | 5 | 5 | 5 | 5 | 5 | 5 | 5 | 5 | 5 |
| Appearance of decorative molded body | | | ○ | ○ | ○ | ○ | ○ | ○ | ○ | ○ | ○ | ○ |
| Adhesive force | | N/10 mm | 20 | 19 | 15 | 12 | 21 | 19 | 16 | 13 | 15 | 15 |
| Scratch evaluation | Depth | μm | 0.2 | 0.3 | 0.6 | 0.9 | 0.1 | 0.2 | 0.6 | 0.8 | 0.4 | 0.6 |
| | Whitened appearance | | ○ | ○ | ○ | ○ | ○ | ○ | ○ | ○ | ○ | ○ |
| GLOSS (60°) | | % | 17 | 17 | 18 | 18 | 14 | 14 | 15 | 14 | 19 | 18 |
| Appearance of recycled molded body | | | ○ | ○ | ○ | ○ | ○ | ○ | ○ | ○ | ○ | ○ |

| | | Unit | Reference Example 1-1 | Example 1-11 | Example 1-12 | Example 1-13 | Example 1-14 | Example 1-15 | Example 1-16 | Example 1-17 | Example 1-18 |
|---|---|---|---|---|---|---|---|---|---|---|---|
| Surface decorative layer (III) | Resin H Kind | | — | 1A-3 | 1C-1 | 1C-2 | 1A-1 | 1C-3 | 1C-4 | 1C-1 | 1C-5 |
| | MFR | g/10 min | — | 7 | 10 | 10 | 7 | 7 | 10 | 10 | 10 |
| Layer (II) | Resin B Kind | | 1B-1 | 1B-1 | 1B-1 | 1B-1 | 1B-1 | 1B-1 | 1B-1 | 1B-3 | 1B-3 |
| | MFR | g/10 min | 2.4 | 2.4 | 2.4 | 2.4 | 2.4 | 2.4 | 2.4 | 2.4 | 2.4 |
| | Tm | °C. | 161 | 161 | 161 | 161 | 161 | 161 | 161 | 161 | 161 |
| Sealing layer (I) | Resin A Kind | | 1A-5 | 1A-3 | 1A-3 | 1A-3 | 1A-3 | 1A-3 | 1A-3 | 1A-3 | 1A-3 |
| | MFR | g/10 min | 7 | 7 | 7 | 7 | 7 | 7 | 7 | 7 | 7 |
| | Tm | °C. | 145 | 135 | 135 | 135 | 135 | 135 | 135 | 135 | 135 |
| | Mw/Mn | | 4.0 | 2.3 | 2.3 | 2.3 | 2.3 | 2.3 | 2.3 | 2.3 | 2.3 |
| MFR(B)/MFR(A) | | | 0.343 | 0.343 | 0.343 | 0.343 | 0.343 | 0.343 | 0.343 | 0.343 | 0.343 |
| Substrate | Kind | | X-1 | X-1 | X-1 | X-1 | X-1 | X-1 | X-1 | X-1 | X-1 |
| Heating time | | sec | 5 | 5 | 5 | 5 | 5 | 5 | 5 | 5 | 5 |
| Appearance of decorative molded body | | | ○ | ○ | ○ | ○ | ○ | ○ | ○ | ○ | ○ |
| Adhesive force | | N/10 mm | 3 | 14 | 15 | 16 | 15 | 15 | 15 | 14 | 16 |
| Scratch evaluation | Depth | μm | 1.5 | 0.7 | 0.6 | 0.5 | 0.5 | 0.4 | — | — | — |
| | Whitened appearance | | X | ○ | ○ | ○ | ○ | ○ | ○ | ○ | ○ |
| GLOSS (60°) | | % | 17 | 30 | 32 | 85 | 35 | 94 | 33 | 32 | 33 |
| Appearance of recycled molded body | | | ○ | ○ | ○ | ○ | ○ | ○ | ○ | ○ | ○ |

Test Example 2

[Used Materials]
(1) Polypropylene-Based Resins
The following polypropylene-based resins were used.
(2A-1): Propylene-α-olefin copolymer (MFR=7 g/10 minutes, Tc=86° C.), trade name "NOVATEC (registered trademark) FX4G" manufactured by Japan Polypropylene Corporation
(2A-2): Propylene-α-olefin copolymer (MFR=7 g/10 minutes, Tc=96° C.), trade name "NOVATEC (registered trademark) FW4B" manufactured by Japan Polypropylene Corporation
(2A-3): Propylene-α-olefin copolymer (MFR=7 g/10 minutes, Tc=107° C.), trade name "NOVATEC (registered trademark) FW3GT" manufactured by Japan Polypropylene Corporation
(2B-1): Propylene homopolymer (MFR=2.4 g/10 minutes, Tc=112° C.), trade name "NOVATEC (registered trademark) FY6" manufactured by Japan Polypropylene Corporation
(2B-2): Polypropylene-based resin composition (MFR=2.4 g/10 minutes, Tc=112° C.) obtained by blending 96% by weight of the polypropylene-based resin (2B-1) with 4% by weight of a black pigment MB (EPP-K-120601 manufactured by Polycol Kogyo K.K.)
(2C-1): Propylene homopolymer (MFR=10 g/10 minutes, Tc=116° C.), trade name "NOVATEC (registered trademark) FA3KM" manufactured by Japan Polypropylene Corporation
(2C-2): Polypropylene-based resin composition (MFR=10 g/10 minutes, Tc=129° C.) obtained by blending 100% by weight of the polypropylene-based resin (2C-1) with 0.4% by weight of a nucleating agent (trademark "Millad NX8000J" manufactured by Milliken Japan)
(2C-3): Propylene-α-olefin copolymer (MFR=7 g/10 minutes, Tc=95° C.) by a metallocene catalyst, trade name "WINTEC (registered trademark) WFX4M" manufactured by Japan Polypropylene Corporation
(2C-4): Polypropylene-based resin composition (MFR=7 g/10 minutes, Tc=103° C.) obtained by blending 100% by weight of the polypropylene-based resin (2C-3) with 0.4% by weight of a nucleating agent (trademark "Millad NX8000J" manufactured by Milliken Japan)

(2C-5): Polypropylene-based resin composition (MFR=10 g/10 minutes) obtained by blending 96% by weight of the polypropylene-based resin (2C-1) with 4% by weight of a white pigment MB (EPP-W-59578 manufactured by Polycol Kogyo K.K., titanium oxide content of 80% by weight)

(2C-6): Polypropylene-based resin composition (MFR=10 g/10 minutes) obtained by blending 96% by weight of the polypropylene-based resin (2C-1) with 4% by weight of a silver pigment MB (PPCM913Y-42 SILVER21X manufactured by TOYOCOLOR Co., Ltd.)

Example 2-1

Production of Decorative Film

There was used a 2-kind 2-layer T-die having a lip opening of 0.8 mm and a die width of 400 mm, to which an extruder-1 for a sealing layer (I) having a nozzle diameter of 30 mm (diameter) and an extruder-2 for a layer (II) having a nozzle diameter of 40 mm (diameter) had been connected. The polypropylene-based resin (2A-1) was charged into the extruder-1 for a sealing layer (I) and the polypropylene-based resin (2B-1) was charged into the extruder-2 for a layer (II) and melt-extrusion was performed under conditions of a resin temperature of 240° C., a discharge amount from the extruder-1 for a sealing layer (I) of 4 kg/h, and a discharge amount from the extruder-2 for a layer (II) of 12 kg/h. The melt-extruded film was cooled and solidified while pushing it to a first roll rotating at 3 m/min at 80° C. with an air knife so that the sealing layer (I) came outside, thereby obtaining a two-layered unstretched film where a sealing layer (I) having a thickness of 50 μm and a layer (II) having a thickness of 150 μm were laminated.

Three-Dimensional Decorative Thermoforming

As the resin molded body (substrate) 5, there was used the injection molded body composed of the polypropylene-based resin (X-1) obtained in the above.

As a three-dimensional decorative thermoforming apparatus, "NGF-0406-SW" manufactured by Fu-Se Vacuum Forming Ltd. was used. As shown in FIG. 2 to FIG. 7, a decorative film 1 was cut into a size having a width of 250 mm and a length of 350 mm and was set to a jig 13 for film fixing having an opening part size of 210 mm×300 mm so that the sealing layer (I) faced to the substrate (resin molded body 5) and the longitudinal direction became the MD direction of the film. The resin molded body 5 was attached on a sample-placing stand having a height of 20 mm, which was placed on a table 14 positioned below the jig 13, through "NICETACK NW-K15" manufactured by Nichiban Co., Ltd. The jig 13 and the table 14 were placed in upper and lower chamber boxes 11 and 12 and the upper and lower chamber boxes 11 and 12 were closed to make the inside of the chamber boxes a tightly closed state. The chamber boxes were divided into upper and lower ones through the decorative film 1. The upper and lower chamber boxes 11 and 12 were vacuum-suctioned and a far-infrared heater 15 placed on the upper chamber box 11 was started at an output of 80% to heat the decorative film 1 in a state that the pressure was reduced from atmospheric pressure (101.3 kPa) to 1.0 kPa. During heating, the vacuum-suction was continued and finally, the pressure was reduced to 0.1 kPa. After 10 seconds from the finish of a spring-back phenomenon that the decorative film 1 was heated to temporarily slacken and thereafter tension returned, the table 14 placed in the lower chamber box 12 was transferred upward to push the resin molded body 5 to the decorative film 1 and immediately after that, compressed air was fed so that the pressure in the upper chamber box 11 became 270 kPa to adhere the resin molded body 5 and the decorative film 1 closely. Thus, there was obtained a three-dimensional decorative thermoformed article (decorative molded body 6) where the decorative film 1 was stuck on the upper surface and side surface of the resin molded body 5.

Table 2-1 shows evaluation results of physical properties of the obtained decorative molded bodies and the like.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 2-2

Evaluation was performed in the same manner as in Example 2-1 except that, in the production of the decorative film of Example 2-1, the polypropylene-based resin (2A-1) used for the sealing layer (I) was changed to the polypropylene-based resin (2A-2). Table 2-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 2-3

Evaluation was performed in the same manner as in Example 2-1 except that, in the three-dimensional decorative thermoforming of Example 2-1, the substrate was changed to the injection molded body using the resin (X-2). Table 2-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 2-4

Evaluation was performed in the same manner as in Example 2-1 except that, in the three-dimensional decorative thermoforming of Example 2-1, the substrate was changed to the injection molded body using the resin (X-3). Table 2-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Reference Example 2-1

Evaluation was performed in the same manner as in Example 2-1 except that, in the production of the decorative film of Example 2-1, the polypropylene-based resin (2A-1)

used for the sealing layer (I) was changed to the polypropylene-based resin (2A-3). Table 2-1 shows evaluation results.

Since the polypropylene-based resin (2A-3) had so high Tc as 107° C., adhesive force was small and emergence of scratches could not be sufficiently suppressed. Thus, the appearance was poor.

Example 2-5

In the production of the decorative film of Example 2-1, there was used a 3-kind 3-layer T-die having a lip opening of 0.8 mm and a die width of 400 mm, to which an extruder-1 for a sealing layer (I) having a nozzle diameter of 30 mm (diameter), an extruder-2 for an intermediate layer (layer (II)) having a nozzle diameter of 40 mm (diameter), and an extruder-3 for a surface layer (surface decorative layer (III)) having a nozzle diameter of 30 mm (diameter), had been connected. The polypropylene-based resin (2A-1) was charged into the extruder-1 for a sealing layer (I), the polypropylene-based resin (2B-1) was charged into the extruder-2 for an intermediate layer, and the polypropylene-based resin (2A-1) was charged into the extruder-3 for a surface layer, and melt-extrusion was performed under conditions of a resin temperature of 240° C., a discharge amount from the extruder-1 for a sealing layer (I) of 4 kg/h, a discharge amount from the extruder-2 for an intermediate layer of 8 kg/h, and a discharge amount from the extruder-3 for a surface layer of 4 kg/h.

The melt-extruded film was cooled and solidified so that the surface decorative layer came into contact with a cooling roll rotating at 3 m/min at 80° C., thereby obtaining a three-layered unstretched film where a surface decorative layer (III) having a thickness of 50 μm, a layer (II) (intermediate layer) having a thickness of 100 μm, and a sealing layer (I) having a thickness of 50 μM were laminated.

Evaluation was performed in the same manner as in Example 2-1 except that the unstretched film obtained in the above decorative film production was used. Table 2-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the polypropylene-based resin (2A-1) was laminated as the surface decorative layer (III) at the uppermost surface side, so that a result of excellent gloss was observed. Furthermore, the recycled molded body was excellent in appearance (evaluation: O).

Example 2-6

Evaluation was performed in the same manner as in Example 2-5 except that, in the production of the decorative film of Example 2-5, the polypropylene-based resin (2A-1) used for the surface decorative layer (III) was changed to the polypropylene-based resin (2C-1). Table 2-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the polypropylene-based resin (2C-1) was laminated as the surface decorative layer (III) at the uppermost surface side, so that a result of excellent gloss was observed. Furthermore, the recycled molded body was excellent in appearance (evaluation: O).

Example 2-7

Evaluation was performed in the same manner as in Example 2-5 except that, in the production of the decorative film of Example 2-5, the polypropylene-based resin (2A-1) used for the surface decorative layer (III) was changed to the polypropylene-based resin (2C-2). Table 2-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the polypropylene-based resin (2C-2) to which a nucleating agent had been added was laminated as the surface decorative layer (III) at the uppermost surface side, so that a result of excellent gloss was observed. Furthermore, the recycled molded body was excellent in appearance (evaluation: O).

Example 2-8

Evaluation was performed in the same manner as in Example 2-5 except that, in the production of the decorative film of Example 2-5, the polypropylene-based resin (2A-1) used for the surface decorative layer (III) was changed to the polypropylene-based resin (2C-3). Table 2-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the polypropylene-based resin (2C-3) was laminated as the surface decorative layer (III) at the uppermost surface side, so that a result of excellent gloss was observed. Furthermore, the recycled molded body was excellent in appearance (evaluation: O).

Example 2-9

Evaluation was performed in the same manner as in Example 2-5 except that, in the production of the decorative film of Example 2-5, the polypropylene-based resin (2A-1) used for the surface decorative layer (III) was changed to the polypropylene-based resin (2C-4). Table 2-1 shows evaluation results.

Since the polypropylene-based resin (A) and the polypropylene-based resin (B) satisfy all the requirements of the present invention, the obtained decorative molded body was excellent in appearance and adhesive force, and scratches were made inconspicuous. Moreover, the polypropylene-based resin (2C-4) to which a nucleating agent had been added was laminated as the surface decorative layer (III) at the uppermost surface side, so that a result of excellent gloss was observed. Furthermore, the recycled molded body was excellent in appearance (evaluation: O).

Example 2-10

Evaluation was performed in the same manner as in Example 2-5 except that, in the production of the decorative film of Example 2-5, the polypropylene-based resin (2A-1) used for the surface decorative layer (III) was changed to the polypropylene-based resin (2C-5). Table 2-1 shows evaluation results.

Since the polypropylene-based resin (A) and the polypropylene-based resin (B) satisfy all the requirements of the present invention, the obtained decorative molded body was excellent in appearance and adhesive force. Further, coupled with the sticking of the white-colored decorative film, the scratches were sufficiently hidden to such a degree that the scratched place was not able to identify. Therefore, the scratch depth was not measured. Moreover, since the surface decorative layer (III) excellent in gloss was colored white, appearance was excellent. Furthermore, the recycled molded body was excellent in appearance (evaluation: O).

Example 2-11

Evaluation was performed in the same manner as in Example 2-6 except that, in the production of the decorative film of Example 2-6, the polypropylene-based resin (2B-1) used for the layer (II) that is an intermediate layer was changed to the polypropylene-based resin (2B-2). Table 2-1 shows evaluation results.

Since the polypropylene-based resin (A) and the polypropylene-based resin (B) satisfy all the requirements of the present invention, the obtained decorative molded body was excellent in appearance and adhesive force. Further, coupled with the sticking of the black-colored decorative film, the scratches were sufficiently hidden to such a degree that the scratched place was not able to identify. Therefore, the scratch depth was not measured. Moreover, since the layer (II) was colored black, appearance was excellent. Furthermore, the recycled molded body was excellent in appearance (evaluation: O).

Example 2-12

Evaluation was performed in the same manner as in Example 2-11 except that, in the production of the decorative film of Example 2-11, the polypropylene-based resin (2C-1) used for the surface decorative layer (III) was changed to the polypropylene-based resin (2C-6). Table 2-1 shows evaluation results.

Since the polypropylene-based resin (A) and the polypropylene-based resin (B) satisfy all the requirements of the present invention, the obtained decorative molded body was excellent in appearance and adhesive force. Further, coupled with the sticking of the colored decorative film, the scratches were sufficiently hidden to such a degree that the scratched place was not able to identify. Therefore, the scratch depth was not measured. Moreover, since the layer (II) was colored black and the layer (III) was colored silver, the film became a metallic film and appearance was excellent. Furthermore, the recycled molded body was excellent in appearance (evaluation: O).

TABLE 2-1

|  |  |  | Unit | Example 2-1 | Example 2-2 | Example 2-3 | Example 2-4 | Reference Example 2-1 | Example 2-5 | Example 2-6 |
|---|---|---|---|---|---|---|---|---|---|---|
| Surface decorative layer (III) | Resin H | Kind |  | — | — | — | — | — | 2A-1 | 2C-1 |
|  |  | MFR | g/10 min | — | — | — | — | — | 7 | 10 |
| Layer (II) | Resin B | Kind |  | 2B-1 | 2B-1 | 2B-1 | 2B-1 | 2B-1 | 2B-1 | 2B-1 |
|  |  | MFR | g/10 min | 2.4 | 2.4 | 2.4 | 2.4 | 2.4 | 2.4 | 2.4 |
|  |  | Tc | °C. | 112 | 112 | 112 | 112 | 112 | 112 | 112 |
| Sealing layer (I) | Resin A | Kind |  | 2A-1 | 2A-2 | 2A-1 | 2A-1 | 2A-3 | 2A-1 | 2A-1 |
|  |  | MFR | g/10 min | 7 | 7 | 7 | 7 | 7 | 7 | 7 |
|  |  | Tc | °C. | 86 | 96 | 86 | 86 | 107 | 86 | 86 |
|  |  | Mw/Mn |  | 4.0 | 3.9 | 4.0 | 4.0 | 4.0 | 4.0 | 4.0 |
| MFR(B)/MFR (A) |  |  |  | 0.343 | 0.343 | 0.343 | 0.343 | 0.343 | 0.343 | 0.343 |
| Substrate | Kind |  |  | X-1 | X-1 | X-2 | X-3 | X-1 | X-1 | X-1 |
| Heating time |  |  | sec | 10 | 10 | 10 | 10 | 10 | 10 | 10 |
| Appearance of decorative molded body |  |  |  | O | O | O | O | O | O | O |
| Adhesive force |  |  | N/10 mm | 25 | 18 | 24 | 25 | 14 | 25 | 24 |
| Scratch evaluation | Depth |  | μm | 2.1 | 2.5 | 2.1 | 2.0 | 3.1 | 2.1 | 2.1 |
|  | Whitened appearance |  |  | O | O | O | O | X | O | O |
| GLOSS (60°) |  |  | % | 16 | 17 | 16 | 16 | 16 | 30 | 32 |
| Appearance of recycled molded body |  |  |  | O | O | O | O | O | O | O |

|  |  |  | Unit | Example 2-7 | Example 2-8 | Example 2-9 | Example 2-10 | Example 2-11 | Example 2-12 |
|---|---|---|---|---|---|---|---|---|---|
| Surface decorative layer (III) | Resin H | Kind |  | 2C-2 | 2C-3 | 2C-4 | 2C-5 | 2C-1 | 2C-6 |
|  |  | MFR | g/10 min | 10 | 7 | 7 | 10 | 10 | 10 |
| Layer (II) | Resin B | Kind |  | 2B-1 | 2B-1 | 2B-1 | 2B-1 | 2B-2 | 2B-2 |
|  |  | MFR | g/10 min | 2.4 | 2.4 | 2.4 | 2.4 | 2.4 | 2.4 |
|  |  | Tc | °C. | 112 | 112 | 112 | 112 | 112 | 112 |
| Sealing layer (I) | Resin A | Kind |  | 2A-1 | 2A-1 | 2A-1 | 2A-1 | 2A-1 | 2A-1 |
|  |  | MFR | g/10 min | 7 | 7 | 7 | 7 | 7 | 7 |
|  |  | Tc | °C. | 86 | 86 | 86 | 86 | 86 | 86 |
|  |  | Mw/Mn |  | 4.0 | 4.0 | 4.0 | 4.0 | 4.0 | 4.0 |
| MFR(B)/MFR (A) |  |  |  | 0.343 | 0.343 | 0.343 | 0.343 | 0.343 | 0.343 |
| Substrate | Kind |  |  | X-1 | X-1 | X-1 | X-1 | X-1 | X-1 |
| Heating time |  |  | sec | 10 | 10 | 10 | 10 | 10 | 10 |
| Appearance of decorative molded body |  |  |  | O | O | O | O | O | O |

TABLE 2-1-continued

| | | | | | | | | |
|---|---|---|---|---|---|---|---|---|
| Adhesive force | | N/10 mm | 25 | 26 | 24 | 27 | 26 | 25 |
| Scratch evaluation | Depth | | 2.1 | 2.0 | 2.0 | — | — | — |
| | Whitened appearance | | ◯ | ◯ | ◯ | ◯ | ◯ | ◯ |
| GLOSS (60°) | | % | 85 | 35 | 94 | 29 | 30 | 29 |
| Appearance of recycled molded body | | | ◯ | ◯ | ◯ | ◯ | ◯ | ◯ |

Test Examples 3 to 6

(Measurement Methods of Various Physical Properties and Evaluation Methods)
1. Measurement Methods of Various Physical Properties
(i) Melt Flow Rate (MFR)

It was measured at 230° C. under a load of 2.16 kg in accordance with ISO 1133:1997 Conditions M. The unit is g/10 minutes.

(ii) Melting Peak Temperature (Melting Point)

Using a differential scanning calorimeter (DSC), after temperature was once raised to 200° C. and kept for 10 minutes, the temperature was lowered to 40° C. at a temperature-lowering rate of 10° C./minute, and, at the time of measurement again at a temperature-raising rate of 10° C./minute, a temperature at the endothermic peak top was taken as melting peak temperature (melting point). The unit is ° C.

(iii) Density

The density of an ethylene-α-olefin random copolymer (C) and a thermoplastic elastomer (D) is measured according to the density gradient column method of JIS K7112 (1999).

(iv) Ethylene Content [E(C)]/[E(D)]

The ethylene content [E(C)] of an ethylene-α-olefin random copolymer (C) and the ethylene content [E(D)] of a thermoplastic elastomer (D) were determined from integrated intensity obtained by $^{13}$C-NMR measurement based on the aforementioned method. Preparation of a sample and measurement conditions are as follows.

Into an NMR sample tube having an internal diameter of 10 mmφ was put 200 mg of an ethylene-α-olefin random copolymer (C) or a thermoplastic elastomer (D) as a sample together with 2.4 ml of o-dichlorobenzene/deuterated bromobenzene ($C_6D_5Br$)=4/1 (volume ratio) and hexamethyldisiloxane as a reference substance for chemical shift, followed by dissolution.

The $^{13}$C-NMR measurement was performed using an AV400 model NMR apparatus manufactured by Burker-Biospin K.K., which had been fitted with a cryoprobe of 10 mmφ.

The conditions for the $^{13}$C-NMR measurement were as follows: sample temperature of 120° C., pulse angle of 90°, pulse interval of 20 seconds, number of integration times of 512 times, and the measurement was conducted by a broadband decoupling method.

(v): Calculation of Ethylene Content of Propylene-Ethylene Block Copolymer (F), Component (F1), and Component (F2)

The ethylene contents of the propylene-ethylene block copolymer (F), the component (F1), and the component (F2) were determined by the aforementioned measurement method of ethylene content by means of $^{13}$C-NMR.

(vi) Isothermal Crystallization Time

The isothermal crystallization time was measured by the aforementioned method using a differential scanning calorimeter (DSC).

Incidentally, in the case of measuring the isothermal crystallization time of the resin composition (X), the polypropylene-based resin (A) and the thermoplastic resin (B) were melt-kneaded on a twin-screw extruder to obtain pellets of the resin composition (X) and the isothermal crystallization time was measured using the pellets. As the twin-screw extruder, KZW-15 manufactured by TECH-NOVEL Corporation was used and the number of screw rotations was set at 400 RPM and the kneading temperature was set at 80° C., 120° C., and 200° C. (hereinafter the same temperature to a die exit) from under the hopper.

2. Physical Property Evaluation of Decorative Molded Body
(1) Evaluation of Thermoformability (Appearance of Decorative Molded Body)

A draw-down state of the decorative film at the time of three-dimensional decorative thermoforming and a sticking state of the decorative film of the decorative molded body where the decorative film has been stuck to the substrate were visually observed and evaluated by the criteria shown below.

◯: Since the contact between the substrate and the decorative film is simultaneously effected all over the surface of the contact face without generating draw-down of the decorative film at the time of three-dimensional decorative thermoforming, uneven contact is not generated and the film is uniformly stuck.

x: Since draw-down of the decorative film occurs at the time of three-dimensional decorative thermoforming, uneven contact is generated all over the surface of the substrate.

(2) Gloss

The gloss in the vicinity of the center of the decorative molded body to which a decorative film had been stuck was measured at an incident angle of 60° using Gloss Meter VG2000 manufactured by Nippon Denshoku Industries Co., Ltd. The measurement method was in accordance with JIS K7105-1981.

(3) Adhesive Force Between Resin Molded Body (Substrate) and Decorative Film

"Craft adhesive tape No. 712N" manufactured by Nitoms, Inc. was cut into a size having a width of 75 mm and a length of 120 mm and was attached to a resin molded body (substrate) in the range of 75 mm×120 mm from the edge part of the resin molded body to perform a masking treatment (a surface exposed part of the substrate had a width of 45 mm and a length of 120 mm). The resin molded body (substrate) was placed on a three-dimensional decorative thermoforming apparatus NGF-0406-SW so that the masking face of the molded body came into contact with the decorative film, and three-dimensional decorative thermoforming was conducted.

The decorative film face of the obtained decorative molded body was cut until the substrate surface at a width of 10 mm using a cutter in a vertical direction toward a longitudinal direction of the pressure-sensitive adhesive tape to prepare a test specimen. In the obtained test specimen, the adhesion face between the substrate and the decorative film has a width of 10 mm and a length of 45 mm. It was fixed to a tensile tester so that the substrate part and the decorative film part of the test specimen made an angle of 180°, and 180° peeling strength of the adhesion face was measured at a tensile rate of 200 mm/min. Maximum strength (N/10 mm) at peeling or at break was measured five times and averaged strength was taken as adhesive force.

(4) Evaluation of Effect of Making Scratches Inconspicuous

Depth of scratches at the portion where scratches were present on a three-dimensional decorative thermoformed product of a resin molded body (substrate) which had been scratched with a load of 25 N was measured by means of a shape-measuring laser microscope ("VX-X200" manufactured by KEYENCE Corporation). The number of measurement times was 5 times (n=5) and an average value thereof was taken as scratch depth (μm).

Moreover, as whitened appearance, it was visually judged by the following criteria whether whitened scratches of the molded body (substrate), which had been scratched with a load of 25 N, were made inconspicuous or not by the decorative film, and evaluated.

◯: Scars of whitened scratches are inconspicuous and appearance is excellent.

×: Whitened scratches remain and appearance is poor.

(5) Evaluation of Recyclability

The obtained decorative molded body was pulverized and a recycled molded body was obtained by injection molding in the same manner as in the production of the resin molded body (substrate). The appearance was visually evaluated. Those excellent in appearance was evaluated as "O".

(Preparation of Resin Molded Body (Substrate))

1. Polypropylene-Based Resin Used for Resin Molded Body

The following polypropylene-based resins were used.

(X-1): Propylene homopolymer (MFR=40 g/10 minutes, Tm=165° C.), trade name "NOVATEC (registered trademark) MA04H" manufactured by Japan Polypropylene Corporation (X-2): Propylene ethylene copolymer (MFR-30 g/10 minutes, Tm=164° C.), trade name "NOVATEC (registered trademark) NBC03HR" manufactured by Japan Polypropylene Corporation (X-3): Polypropylene-based resin composition obtained by blending 60% by weight of the polypropylene-based resin (X-2) with 20% of EBR (TAFMER (registered trademark) A0550S manufactured by Mitsui Chemicals, Inc.) of MFR=1.0 and 20% by weight of an inorganic filler (TALC P-6 manufactured by Nippon Talc Co., Ltd., average particle size of 4.0 μm)

2. Production of Resin Molded Body (Substrate)

Using the polypropylene-based resins (X-1) to (X-3), injection molded bodies were obtained by the following method. Moreover, the obtained injection molded bodies were scratched by the following method to form resin molded bodies (substrates).

Injection molding machine: "IS100GN" manufactured by Toshiba Machine Co., Ltd., mold clamping pressure of 100 tons Cylinder temperature: 200° C.

Mold temperature: 40° C.

Injection mold: A flat plate of width×height×thickness=120 mm×120 mm×3 mm

Condition control: Kept in a constant-temperature constant-humidity chamber at a temperature of 23° C. and a humidity of 50% RH for 5 days Processing for scratch evaluation: In a constant-temperature constant-humidity chamber at a temperature of 23° C. and a humidity of 50% RH, using a scratch tester ("SCRATCH & MAR TESTER" manufactured by ROCKWOOD SYSTEMS AND EQUIPMENT), each of the above injection molded bodies was scratched with a scratching tip end subjected to shape (curvature radius of 0.5 mm, ball shape) processing, at a scratching rate of 100 mm/minute under a load of 25 N.

When the scratches formed on the surface of the resin molded body (substrate) was measured by means of a shape-measuring laser microscope ("VX-X200" manufactured by KEYENCE Corporation), the depth of the scratches was 16 vim. Further, the scratches became whitened scratches.

(Physical Property Evaluation of Embossed Film)

(1) Evaluation of Embossment Transfer

The depth of hairline pattern portion formed on the surface decorative layer of the obtained decorative film was measured by means of a shape-measuring laser microscope ("VX-X200" manufactured by KEYENCE Corporation). The number of measurement times was 5 times (n=5) and an average value thereof was taken as embossment depth (μm).

(2) Evaluation of Embossed Pattern after Thermoforming

A degree of remaining embossed pattern after three-dimensional decorative thermoforming was visually observed and was evaluated by the criteria shown below.

◯: Embossed pattern remains on the surface of a three-dimensional decorative thermoformed product after three-dimensional decorative thermoforming and thus designability is excellent ×: Embossed pattern disappears on the most part of the surface of a three-dimensional decorative thermoformed product after three-dimensional decorative thermoforming and thus designability is poor Test Example 3

[Used Materials]

(1) Polypropylene-Based Resins

The following polypropylene-based resins were used.

(3A-1): Propylene-α-olefin copolymer (MFR=7 g/10 minutes, Tm=146° C.), trade name "NOVATEC (registered trademark) FW3GT" manufactured by Japan Polypropylene Corporation (3A-2): Propylene homopolymer (MFR=10 g/10 minutes, Tm=161° C.), trade name "NOVATEC (registered trademark) FA3KM" manufactured by Japan Polypropylene Corporation (3C-1): Propylene homopolymer (MFR=2.4 g/10 minutes, Tm=161° C.), trade name "NOVATEC (registered trademark) FY6" manufactured by Japan Polypropylene Corporation (3C-2): Propylene homopolymer (MFR=0.4 g/10 minutes, Tm=161° C.), trade name "NOVATEC (registered trademark) EA9" manufactured by Japan Polypropylene Corporation (3C-3): Polypropylene-based resin composition (MFR=2.4 g/10 minutes, Tm=161° C.) obtained by blending 96% by weight of the polypropylene-based resin (3C-1) with 4% by weight of a black pigment MB (EPP-K-120601 manufactured by Polycol Kogyo K.K.)

(3D-1): Polypropylene-based resin composition (MFR=10 g/10 minutes, Tm=164° C.) obtained by blending 100% by weight of the polypropylene-based resin (3A-2) with 0.4% by weight of a nucleating agent (trademark "Millad NX8000J" manufactured by Milliken Japan)

(3D-2): Propylene-α-olefin copolymer (MFR=7 g/10 minutes, Tm=125° C., Mw/Mn=2.5) by a metallocene-based catalyst, trade name "WINTEC (registered trademark) WFX4M" manufactured by Japan Polypropylene Corporation (3D-3): Polypropylene-based resin composition (MFR=7 g/10 minutes, Tm=127° C.) obtained by blending 100% by weight of the polypropylene-based resin (3D-2) with 0.4% by weight of a nucleating agent (trademark "Millad NX8000J" manufactured by Milliken Japan)

(3D-4): Polypropylene-based resin composition (MFR=10 g/10 minutes, Tm=161° C.) obtained by blending 96% by weight of the polypropylene-based resin (3A-2) with 4% by weight of a white pigment MB (EPP-W-59578 manufactured by Polycol Kogyo K.K., titanium oxide content of 80% by weight)

(3D-5): Polypropylene-based resin composition (MFR=10 g/10 minutes, Tm=161° C.) obtained by blending 96% by weight of the polypropylene-based resin (3A-2) with 4% by weight of a silver pigment MB (PPCM913Y-42 SILVER21X manufactured by TOYOCOLOR Co., Ltd.)

(2) Ethylene-α-Olefin Random Copolymer

The following ethylene-α-olefin random copolymers were used.

(3B-1): Ethylene-butene random copolymer (MFR=6.8 g/10 minutes, Tm=66° C., density=0.885 g/cm$^3$, ethylene content=84% by weight): trade name "TAFMER A4085S" manufactured by Mitsui Chemicals, Inc.

(3B-2): Ethylene-butene random copolymer (MFR=7.0 g/10 minutes, Tm=47° C., density=0.860 g/cm$^3$, ethylene content=73% by weight): trade name "TAFMER A4050S" manufactured by Mitsui Chemicals, Inc.

(3B-3): Ethylene-octene random copolymer (MFR=2.0 g/10 minutes, Tm=77° C., density=0.885 g/cm$^3$, ethylene content=85% by weight): trade name "Engage EG8003" manufactured by DowDuPont Inc.

(3B-4): Ethylene-octene random copolymer (MFR=2.0 g/10 minutes, Tm=38° C., density=0.860 g/cm$^3$, ethylene content=75% by weight): trade name "Engage EG8842" manufactured by DowDuPont Inc.

(3B-5): Ethylene-hexene random copolymer (MFR=3.5 g/10 minutes, Tm=60° C., density=0.880 g/cm$^3$, ethylene content=76% by weight): trade name "Kernel KS340T" manufactured by Japan Polyethylene Corporation (3B-6): Ethylene-propylene random copolymer (MFR=7.0 g/10 minutes, Tm=38° C., density=0.860 g/cm$^3$, ethylene content=73% by weight): trade name "TAFMER P0280" manufactured by Mitsui Chemicals, Inc.

Example 3-1

Production of Decorative Film

There was used a 2-kind 2-layer T-die having a lip opening of 0.8 mm and a die width of 400 mm, to which an extruder-1 for a sealing layer (I) having a nozzle diameter of 30 mm (diameter) and an extruder-2 for a layer (II) having a nozzle diameter of 40 mm (diameter) had been connected. One obtained by blending the polypropylene-based resin (3A-1) and the ethylene-α-olefin random copolymer (3B-1) so as to be a weight ratio of 85:15 was charged into the extruder-1 for a sealing layer (I) and the polypropylene-based resin (3C-1) was charged into the extruder-2 for a layer (II) and melt-extrusion was performed under conditions of a resin temperature of 240° C., a discharge amount from the extruder-1 for a sealing layer (I) of 4 kg/h, and a discharge amount from the extruder-2 for a layer (II) of 12 kg/h. The melt-extruded film was cooled and solidified while pushing it to a first roll rotating at 3 m/min at 80° C. with an air knife so that the sealing layer (I) came outside, thereby obtaining a two-layered unstretched film where a sealing layer (I) having a thickness of 50 μm and a layer (II) having a thickness of 150 μm were laminated.

Three-Dimensional Decorative Thermoforming

As the resin molded body (substrate) 5, there was used the injection molded body composed of the polypropylene-based resin (X-1) obtained in the above.

As a three-dimensional decorative thermoforming apparatus, "NGF-0406-SW" manufactured by Fu-se Vacuum Forming Ltd. was used. As shown in FIG. 2 to FIG. 7, a decorative film 1 was cut into a size having a width of 250 mm and a length of 350 mm and was set to a jig 13 for film fixing having an opening part size of 210 mm×300 mm so that the sealing layer (I) faced to the substrate (resin molded body 5) and the longitudinal direction became the MD direction of the film. The resin molded body 5 was attached on a sample-placing stand having a height of 20 mm, which was placed on a table 14 positioned below the jig 13, through "NICETACK NW-K15" manufactured by Nichiban Co., Ltd. The jig 13 and the table 14 were placed in upper and lower chamber boxes 11 and 12 and the upper and lower chamber boxes 11 and 12 were closed to make the inside of the chamber boxes a tightly closed state. The chamber boxes were divided into upper and lower ones through the decorative film 1. The upper and lower chamber boxes 11 and 12 were vacuum-suctioned and a far-infrared heater 15 placed on the upper chamber box 11 was started at an output of 80% to heat the decorative film 1 in a state that the pressure was reduced from atmospheric pressure (101.3 kPa) to 1.0 kPa. During heating, the vacuum-suction was continued and finally, the pressure was reduced to 0.1 kPa. Immediately after the finish of a spring-back phenomenon that the decorative film 1 was heated to temporarily slacken and thereafter tension returned (i.e., heating time after the spring-back phenomenon was 0 second), the table 14 placed in the lower chamber box 12 was transferred upward to push the resin molded body 5 to the decorative film 1 and immediately after that, compressed air was fed so that the pressure in the upper chamber box 11 became 270 kPa to adhere the resin molded body 5 and the decorative film 1 closely. Thus, there was obtained a three-dimensional decorative thermoformed article (decorative molded body 6) where the decorative film 1 was stuck on the upper surface and side surface of the resin molded body 5.

Table 3-1 shows evaluation results of physical properties of the obtained decorative molded bodies and the like.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 3-2

Evaluation was performed in the same manner as in Example 3-1 except that, in the production of the decorative film of Example 3-1, the ethylene-α-olefin random copolymer (3B-1) used for the sealing layer (I) was changed to the ethylene-α-olefin random copolymer (3B-2). Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 3-3

Evaluation was performed in the same manner as in Example 3-1 except that, in the production of the decorative film of Example 3-1, the ethylene-α-olefin random copolymer (3B-1) used for the sealing layer (I) was changed to the ethylene-α-olefin random copolymer (3B-3). Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 3-4

Evaluation was performed in the same manner as in Example 3-1 except that, in the production of the decorative film of Example 3-1, the ethylene-α-olefin random copolymer (3B-1) used for the sealing layer (I) was changed to the ethylene-α-olefin random copolymer (3B-4). Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 3-5

Evaluation was performed in the same manner as in Example 3-1 except that, in the production of the decorative film of Example 3-1, the ethylene-α-olefin random copolymer (3B-1) used for the sealing layer (I) was changed to the ethylene-α-olefin random copolymer (3B-5). Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 3-6

Evaluation was performed in the same manner as in Example 3-1 except that, in the production of the decorative film of Example 3-1, the ethylene-α-olefin random copolymer (3B-1) used for the sealing layer (I) was changed to the ethylene-α-olefin random copolymer (3B-6). Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 3-7

Evaluation was performed in the same manner as in Example 3-1 except that, in the production of the decorative film of Example 3-1, the blending ratio of the propylene-based resin (3A-1) to the ethylene-α-olefin random copolymer (3B-1) was controlled to 70:30. Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 3-8

Evaluation was performed in the same manner as in Example 3-1 except that, in the production of the decorative film of Example 3-1, the blending ratio of the propylene-based resin (3A-1) to the ethylene-α-olefin random copolymer (3B-1) was controlled to 30:70. Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 3-9

Evaluation was performed in the same manner as in Example 3-1 except that, in the production of the decorative film of Example 3-1, the polypropylene-based resin (3A-1) used for the sealing layer (I) was changed to the polypropylene-based resin (3A-2). Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 3-10

Evaluation was performed in the same manner as in Example 3-1 except that, in the production of the decorative film of Example 3-1, the polypropylene-based resin (3C-1) used for the layer (II) was changed to the polypropylene-based resin (3C-2). Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 3-11

Evaluation was performed in the same manner as in Example 3-1 except that, in the three-dimensional decorative thermoforming of Example 3-1, the substrate was changed to the injection molded body using the resin (X-2). Table 3-1 shows obtained evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 3-12

Evaluation was performed in the same manner as in Example 3-1 except that, in the three-dimensional decorative thermoforming of Example 3-1, the substrate was changed to the injection molded body using the resin (X-3). Table 3-1 shows obtained evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Reference Example 3-1

Evaluation was performed in the same manner as in Example 3-1 except that, in the production of the decorative film of Example 3-1, the ethylene-α-olefin random copolymer (3B-1) was not blended in the sealing layer (I) and only the polypropylene-based resin (3A-1) was used. Table 3-1 shows evaluation results.

Since the ethylene-α-olefin random copolymer (C) was not contained in the sealing layer (I), adhesive force was small and emergence of scratches could not be sufficiently suppressed. Thus, the appearance was poor.

Reference Example 3-2

Evaluation was performed in the same manner as in Example 3-1 except that, in the production of the decorative film of Example 3-1, the ethylene-α-olefin random copolymer (3B-1) was not blended in the sealing layer (I), only the polypropylene-based resin (3A-1) was used and further, in the three-dimensional decorative thermoforming, heating was continued for 20 seconds after the spring-back phenomenon was finished and then the decorative thermoforming was conducted. Table 3-1 shows evaluation results.

By lengthening the film heating time, adhesive force was improved but draw-down of the film was severe and the appearance of the decorative molded body was poor, so that the evaluation of the scratches was not performed.

Example 3-13

In the production of the decorative film of Example 3-1, there was used a 3-kind 3-layer T-die having a lip opening of 0.8 mm and a die width of 400 mm, to which an extruder-1 for a sealing layer (I) having a nozzle diameter of 30 mm (diameter), an extruder-2 for an intermediate layer (layer (II)) having a nozzle diameter of 40 mm (diameter), and an extruder-3 for a surface layer (surface decorative layer (III)) having a nozzle diameter of 30 mm (diameter), had been connected. One obtained by blending the polypropylene-based resin (3A-1) and the ethylene-α-olefin random copolymer (3B-1) so as to be a weight ratio of 85:15 was charged into the extruder-1 for a sealing layer (I), the polypropylene-based resin (3C-1) was charged into the extruder-2 for an intermediate layer, and the polypropylene-based resin (3A-2) was charged into the extruder-3 for a surface layer, and melt-extrusion was performed under conditions of a resin temperature of 240° C., a discharge amount from the extruder-1 for a sealing layer (I) of 4 kg/h, a discharge amount from the extruder-2 for an intermediate layer of 8 kg/h, and a discharge amount from the extruder-3 for a surface layer of 4 kg/h.

The melt-extruded film was cooled and solidified so that the surface decorative layer (III) came into contact with a cooling roll rotating at 3 m/min at 80° C., thereby obtaining a three-layered unstretched film where a surface decorative layer having a thickness of 50 μm, a layer (II) (intermediate layer) having a thickness of 100 and a sealing layer (I) having a thickness of 50 μM were laminated.

Evaluation was performed in the same manner as in Example 3-1 except that the unstretched film obtained in the above decorative film production was used. Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the polypropylene-based resin (3A-2) was laminated as the surface decorative layer (III) at the uppermost surface side, so that a result of excellent gloss was observed. Furthermore, the recycled molded body was excellent in appearance (evaluation: O).

Example 3-14

Evaluation was performed in the same manner as in Example 3-13 except that, in the production of the decorative film of Example 3-13, the polypropylene-based resin (3A-2) used for the surface decorative layer (III) was changed to the polypropylene-based resin (3D-1). Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the polypropylene-based resin (3D-1) to which a nucleating agent had been added was laminated as the surface decorative layer (III) at the uppermost surface side, so that a result of excellent gloss was observed. Furthermore, the recycled molded body was excellent in appearance (evaluation: O).

Example 3-15

Evaluation was performed in the same manner as in Example 3-13 except that, in the production of the decorative film of Example 3-13, the polypropylene-based resin (3A-2) used for the surface decorative layer (III) was changed to the polypropylene-based resin (3D-2). Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the polypropylene-based resin (3D-2) was laminated as the surface decorative layer (III) at the uppermost surface side, so that a result of excellent gloss was observed. Furthermore, the recycled molded body was excellent in appearance (evaluation: O).

Example 3-16

Evaluation was performed in the same manner as in Example 3-13 except that, in the production of the decorative film of Example 3-13, the polypropylene-based resin (3A-2) used for the surface decorative layer (III) was changed to the polypropylene-based resin (3D-3). Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Moreover, the polypropylene-based resin (3D-3) to which a nucleating agent had been added was laminated as the surface decorative layer (III) at the uppermost surface side, so that a result of excellent gloss was observed. Furthermore, the recycled molded body was excellent in appearance (evaluation: O).

Example 3-17

Evaluation was performed in the same manner as in Example 3-13 except that, in the production of the decorative film of Example 3-13, the polypropylene-based resin (3A-2) used for the surface decorative layer (III) was changed to the polypropylene-based resin (3D-4). Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Further, coupled with the sticking of the white-colored decorative film, the scratches were sufficiently hidden to such a degree that the scratched place was not able to identify. Therefore, the scratch depth was not measured. Moreover, since the surface decorative layer (III) excellent in gloss was colored white, appearance was excellent. Furthermore, the recycled molded body was excellent in appearance (evaluation: O).

Example 3-18

Evaluation was performed in the same manner as in Example 3-13 except that, in the production of the decorative film of Example 3-13, the polypropylene-based resin (3C-1) used for the layer (II) was changed to the polypropylene-based resin (3C-3). Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Further, coupled with the sticking of the black-colored decorative film, the scratches were sufficiently hidden to such a degree that the scratched place was not able to identify. Therefore, the scratch depth was not measured. Moreover, since the layer (II) was colored black, appearance was excellent. Furthermore, the polypropylene-based resin (3A-2) was laminated as the surface decorative layer (III) at the uppermost surface side, so that a result of excellent gloss was observed. In addition, the recycled molded body was excellent in appearance (evaluation: O).

Example 3-19

Evaluation was performed in the same manner as in Example 3-18 except that, in the production of the decorative film of Example 3-18, the polypropylene-based resin (3A-2) used for the surface decorative layer (III) was changed to the polypropylene-based resin (3D-5). Table 3-1 shows evaluation results.

Since the polypropylene-based resin (A), the ethylene-α-olefin random copolymer (C), and the polypropylene-based resin (B) satisfy all the requirements of the present invention, the obtained decorative molded body was excellent in appearance and adhesive force, and scratches were made inconspicuous. Further, coupled with the sticking of the colored decorative film, the scratches were sufficiently hidden to such a degree that the scratched place was not able to identify. Therefore, the scratch depth was not measured. Moreover, the polypropylene-based resin (3D-5) was laminated as the surface decorative layer (III) at the uppermost surface side, so that a result of excellent gloss was observed. Further, since the layer (II) was colored black and the surface decorative layer (III) was colored silver, the film became a metallic film and appearance was excellent. Furthermore, the recycled molded body was excellent in appearance (evaluation: O).

TABLE 3-1

| | | | Unit | Example 3-1 | Example 3-2 | Example 3-3 | Example 3-4 | Example 3-5 | Example 3-6 |
|---|---|---|---|---|---|---|---|---|---|
| Surface decorative layer (III) | Polypropylene-based resin (H) | Kind | | — | — | — | — | — | — |
| | | MFR | g/10 min | — | — | — | — | — | — |
| Layer (II) | Polypropylene-based resin (B) | Kind | | 3C-1 | 3C-1 | 3C-1 | 3C-1 | 3C-1 | 3C-1 |
| | | MFR | g/10 min | 2.4 | 2.4 | 2.4 | 2.4 | 2.4 | 2.4 |
| | | MFR(B)/MFR (A) | | 0.343 | 0.343 | 0.343 | 0.343 | 0.343 | 0.343 |
| | | Tm | ° C. | 161 | 161 | 161 | 161 | 161 | 161 |
| Sealing layer (I) | Polypropylene-based resin (A) | Kind | | 3A-1 | 3A-1 | 3A-1 | 3A-1 | 3A-1 | 3A-1 |
| | | MFR | g/10 min | 7 | 7 | 7 | 7 | 7 | 7 |
| | | Tm | ° C. | 146 | 146 | 146 | 146 | 146 | 146 |
| | | Blending amount | wt % | 85 | 85 | 85 | 85 | 85 | 85 |
| | Co-polymer (C) | Kind | | 3B-1 | 3B-2 | 3B-3 | 3B-4 | 3B-5 | 3B-6 |
| | | MFR | g/10 min | 6.8 | 7 | 2.3 | 2.3 | 6.8 | 5.4 |
| | | Density | g/cm³ | 0.885 | 0.86 | 0.885 | 0.86 | 0.88 | 0.87 |
| | | Blending amount | wt % | 15 | 15 | 15 | 15 | 15 | 15 |

TABLE 3-1-continued

| | | | Example 3-1 | Example 3-2 | Example 3-3 | Example 3-4 | Example 3-5 | Example 3-6 |
|---|---|---|---|---|---|---|---|---|
| Substrate | Kind | | X-1 | X-1 | X-1 | X-1 | X-1 | X-1 |
| Heating time after spring-back | | sec | 0 | 0 | 0 | 0 | 0 | 0 |
| Appearance of decorative molded body | | | ○ | ○ | ○ | ○ | ○ | ○ |
| Adhesive force | | N/10 mm | 35 | 25 | 38 | 26 | 21 | 35 |
| Scratch evaluation | Depth | μm | 2.6 | 5.6 | 3.3 | 5 | 3.3 | 3.4 |
| | Whitened appearance | | ○ | ○ | ○ | ○ | ○ | ○ |
| GLOSS (60°) | | % | 18 | 17 | 18 | 18 | 18 | 16 |
| Appearance of recycled molded body | | | ○ | ○ | ○ | ○ | ○ | ○ |

| | | Unit | Example 3-7 | Example 3-8 | Example 3-9 | Example 3-10 | Example 3-11 | Example 3-12 |
|---|---|---|---|---|---|---|---|---|
| Surface decorative layer (III) | Polypropylene-based resin (H) | Kind | — | — | — | — | — | — |
| | | MFR g/10 min | — | — | — | — | — | — |
| Layer (II) | Polypropylene-based resin (B) | Kind | 3C-1 | 3C-1 | 3C-1 | 3C-2 | 3C-1 | 3C-1 |
| | | MFR g/10 min | 2.4 | 2.4 | 2.4 | 0.4 | 2.4 | 2.4 |
| | | MFR(B)/MFR (A) | 0.343 | 0.343 | 0.240 | 0.057 | 0.343 | 0.343 |
| | | Tm °C. | 161 | 161 | 161 | 161 | 161 | 161 |
| Sealing layer (I) | Polypropylene-based resin (A) | Kind | 3A-1 | 3A-1 | 3A-2 | 3A-1 | 3A-1 | 3A-1 |
| | | MFR g/10 min | 7 | 7 | 10 | 7 | 7 | 7 |
| | | Tm °C. | 146 | 146 | 161 | 146 | 146 | 146 |
| | | Blending amount wt % | 70 | 30 | 85 | 85 | 85 | 85 |
| | Co-polymer (C) | Kind | 3B-1 | 3B-1 | 3B-1 | 3B-1 | 3B-1 | 3B-1 |
| | | MFR g/10 min | 6.8 | 6.8 | 6.8 | 6.8 | 6.8 | 6.8 |
| | | Density g/cm³ | 0.885 | 0.885 | 0.885 | 0.885 | 0.885 | 0.885 |
| | | Blending amount wt % | 30 | 70 | 15 | 15 | 15 | 15 |
| Substrate | Kind | | X-1 | X-1 | X-1 | X-1 | X-2 | X-3 |
| Heating time after spring-back | | sec | 0 | 0 | 0 | 0 | 0 | 0 |
| Appearance of decorative molded body | | | ○ | ○ | ○ | ○ | ○ | ○ |
| Adhesive force | | N/10 mm | 20 | 18 | 35 | 32 | 33 | 36 |
| Scratch evaluation | Depth | μm | 5.4 | 3 | 4.2 | 5.5 | 3.2 | 3.3 |
| | Whitened appearance | | ○ | ○ | ○ | ○ | ○ | ○ |
| GLOSS (60°) | | % | 20 | 18 | 19 | 13 | 19 | 18 |
| Appearance of recycled molded body | | | ○ | ○ | ○ | ○ | ○ | ○ |

| | | Unit | Reference Example 3-1 | Reference Example 3-2 | Example 3-13 | Example 3-14 | Example 3-15 | Example 3-16 |
|---|---|---|---|---|---|---|---|---|
| Surface decorative layer (III) | Polypropylene-based resin (H) | Kind | — | — | 3A-2 | 3D-1 | 3D-2 | 3D-3 |
| | | MFR g/10 min | — | — | 10 | 10 | 7 | 7 |
| Layer (II) | Polypropylene-based resin (B) | Kind | 3C-1 | 3C-1 | 3C-1 | 3C-1 | 3C-1 | 3C-1 |
| | | MFR g/10 min | 2.4 | 2.4 | 2.4 | 2.4 | 2.4 | 2.4 |
| | | MFR(B)/MFR (A) | 0.343 | 0.343 | 0.343 | 0.343 | 0.343 | 0.343 |
| | | Tm °C. | 161 | 161 | 161 | 161 | 161 | 161 |
| Sealing layer (I) | Polypropylene-based resin (A) | Kind | 3A-1 | 3A-1 | 3A-1 | 3A-1 | 3A-1 | 3A-1 |
| | | MFR g/10 min | 7 | 7 | 7 | 7 | 7 | 7 |
| | | Tm °C. | 146 | 146 | 146 | 146 | 146 | 146 |
| | | Blending amount wt % | 100 | 100 | 85 | 85 | 85 | 85 |
| | Co-polymer (C) | Kind | none | none | 3B-1 | 3B-1 | 3B-1 | 3B-1 |
| | | MFR g/10 min | — | — | 6.8 | 6.8 | 6.8 | 6.8 |
| | | Density g/cm³ | — | — | 0.885 | 0.885 | 0.885 | 0.885 |
| | | Blending amount wt % | — | — | 15 | 15 | 15 | 15 |
| Substrate | Kind | | X-1 | X-1 | X-1 | X-1 | X-1 | X-1 |
| Heating time after spring-back | | sec | 0 | 20 | 0 | 0 | 0 | 0 |
| Appearance of decorative molded body | | | ○ | X | ○ | ○ | ○ | ○ |
| Adhesive force | | N/10 mm | 1 | 33 | 35 | 33 | 32 | 35 |
| Scratch evaluation | Depth | μm | 10.1 | — | 3.5 | 4 | 3.8 | 3.2 |
| | Whitened appearance | | X | — | ○ | ○ | ○ | ○ |
| GLOSS (60°) | | % | 17 | — | 32 | 85 | 35 | 94 |
| Appearance of recycled molded body | | | ○ | — | ○ | ○ | ○ | ○ |

| | | Unit | Example 3-17 | Example 3-18 | Example 3-19 |
|---|---|---|---|---|---|
| Surface decorative layer (III) | Polypropylene-based resin (H) | Kind | 3D-4 | 3A-2 | 3D-5 |
| | | MFR g/10 min | 10 | 10 | 10 |
| Layer (II) | Polypropylene-based resin (B) | Kind | 3C-1 | 3C-3 | 3C-3 |
| | | MFR g/10 min | 2.4 | 2.4 | 2.4 |
| | | MFR(B)/MFR (A) | 0.343 | 0.343 | 0.343 |
| | | Tm °C. | 161 | 161 | 161 |
| Sealing layer (I) | Polypropylene-based resin (A) | Kind | 3A-1 | 3A-1 | 3A-1 |
| | | MFR g/10 min | 7 | 7 | 7 |
| | | Tm °C. | 146 | 146 | 146 |
| | | Blending amount wt % | 85 | 85 | 85 |

TABLE 3-1-continued

|  |  |  |  |  |  |  |
|---|---|---|---|---|---|---|
| | Co-polymer (C) | Kind | | 3B-1 | 3B-1 | 3B-1 |
| | | MFR | g/10 min | 6.8 | 6.8 | 6.8 |
| | | Density | g/cm³ | 0.885 | 0.885 | 0.885 |
| | | Blending amount | wt % | 15 | 15 | 15 |
| Substrate | Kind | | | X-1 | X-1 | X-1 |
| Heating time after spring-back | | | sec | 0 | 0 | 0 |
| Appearance of decorative molded body | | | | ○ | ○ | ○ |
| Adhesive force | | | N/10 mm | 36 | 34 | 33 |
| Scratch evaluation | Depth | | μm | — | — | — |
| | Whitened appearance | | | ○ | ○ | ○ |
| GLOSS (60°) | | | % | 33 | 32 | 33 |
| Appearance of recycled molded body | | | | ○ | ○ | ○ |

Example 3-20

Production of Decorative Film

In the production of the decorative film of Example 3-19, melt-extrusion was performed under conditions of a discharge amount from the extruder-1 for a sealing layer (I) of 4 kg/h, a discharge amount from the extruder-2 for an intermediate layer of 12 kg/h, and a discharge amount from the extruder-3 for a surface layer of 4 kg/h and the obtained three-layered unstretched film was slit into a width of 200 mm, thereby obtaining a three-layered unstretched film where a surface decorative layer (III) having a thickness of 50 μm, a layer (II) (intermediate layer) having a thickness of 150 μm, and a sealing layer (I) having a thickness of 50 μm were laminated.

Production of Embossed Film

As an embossing apparatus, an electric heating type test embossing machine manufactured by YURIROLL Co., Ltd. was used. The electric heating type test embossing machine has a mechanism of transferring an uneven shape at an upper stage to a film surface by heating and pressing the film with a roll (embossing roll) having a heatable uneven shape placed at an upper stage and a smooth roll placed at a lower stage. In the embossing roll, a hairline pattern having a depth of 30 μm was used.

The three-layered unstretched film obtained by the production of the decorative film was fed between two rolls of the embossing machine so that the surface decorative layer (III) came into contact with the embossing roll. By transferring the embossment under conditions of an embossing roll temperature of 145° C., a contact pressure of 3 MPa, and a roll speed of 3 m/min, there was obtained a decorative film where the hairline pattern was transferred on the surface of the surface decorative layer (III).

Three-Dimensional Decorative Thermoforming

A three-dimensional decorative thermoformed article was obtained in the same manner as in Example 3-1.

Table 3-2 shows evaluation results of physical properties of the obtained embossed films and three-dimensional decorative thermoformed articles.

Since the polypropylene-based resin (A), the ethylene-α-olefin random copolymer (C), and the polypropylene-based resin (B) satisfy all the requirements of the present invention, the depth of embossment of the film obtained by the production of the embossed film was so excellent as 25 μm. Moreover, also on the surface of the three-dimensional decorative thermoformed article after three-dimensional decorative thermoforming, the hairline pattern strongly remained and thus designability was excellent.

TABLE 3-2

| | | | Unit | Example 3-20 |
|---|---|---|---|---|
| Surface decorative layer (III) | Polypropylene-based resin (H) | Kind | | 3D-5 |
| | | MFR | g/10 min | 10 |
| Layer (II) | Polypropylene-based resin (B) | Kind | | 3C-3 |
| | | MFR | g/10 min | 2.4 |
| | | MFR(B)/MFR(A) | | 0.343 |
| | | Tm | ° C. | 161 |
| Sealing layer (I) | Polypropylene-based resin (A) | Kind | | 3A-1 |
| | | MFR | g/10 min | 7 |
| | | Tm | ° C. | 146 |
| | | Blending amount | wt % | 85 |
| | Copolymer (C) | Kind | | 3B-1 |
| | | MFR | g/10 min | 6.8 |
| | | Density | g/cm³ | 0.885 |
| | | Blending amount | wt % | 15 |
| Substrate | Kind | | | X-1 |
| Heating time after spring-back | | | sec | 0 |
| Depth of embossment | | | μm | 25 |
| Embossed pattern after thermoforming | | | | ○ |

Test Example 4

[Used Materials]
(1) Polypropylene-Based Resin

The following polypropylene-based resins were used.

(4A-1): Propylene-α-olefin copolymer (MFR=7 g/10 minutes, Tm=146° C.), trade name "NOVATEC (registered trademark) FW3GT" manufactured by Japan Polypropylene Corporation (4A-2): Propylene homopolymer (MFR=10 g/10 minutes, Tm=161° C.), trade name "NOVATEC (registered trademark) FA3KM" manufactured by Japan Polypropylene Corporation (4C-1): Propylene homopolymer (MFR=2.4 g/10 minutes, Tm=161° C.), trade name "NOVATEC (registered trademark) FY6" manufactured by Japan Polypropylene Corporation (4C-2): Propylene homopolymer (MFR=0.4 g/10 minutes, Tc=161° C.), trade name "NOVATEC (registered trademark) EA9" manufactured by Japan Polypropylene Corporation (4C-3): Polypropylene-based resin composition (MFR=2.4 g/10 minutes, Tm=161° C.) obtained by blending 96% by weight of the polypropylene-based resin (4C-1) with 4% by weight of a black pigment MB (EPP-K-120601 manufactured by Polycol Kogyo K.K.)

(4D-1): Polypropylene-based resin composition (MFR=10 g/10 minutes, Tm=164° C.) obtained by blending 100% by weight of the polypropylene-based resin (4A-2) with 0.4% by weight of a nucleating agent (trademark "Millad NX8000J" manufactured by Milliken Japan)

(4D-2): Propylene-α-olefin copolymer (MFR=7 g/10 minutes, Tm=125° C., Mw/Mn=2.5) by a metallocene-based catalyst, trade name "WINTEC (registered trademark) WFX4M" manufactured by Japan Polypropylene Corporation (4D-3): Polypropylene-based resin composition (MFR=7 g/10 minutes, Tm=127° C.) obtained by blending 100% by weight of the polypropylene-based resin (4D-2) with 0.4% by weight of a nucleating agent (trademark "Millad NX8000J" manufactured by Milliken Japan)

(4D-4): Polypropylene-based resin composition (MFR=10 g/10 minutes, Tm=161° C.) obtained by blending 96% by weight of the polypropylene-based resin (4A-2) with 4% by weight of a white pigment MB having MFR of 11 g/10 minutes (EPP-W-59578 manufactured by Polycol Kogyo K.K., titanium oxide content of 80% by weight)

(4D-5): Polypropylene-based resin composition (MFR=10 g/10 minutes, Tm=161° C.) obtained by blending 96% by weight of the polypropylene-based resin (4A-2) with 4% by weight of a silver pigment MB (PPCM913Y-42 SILVER21X manufactured by TOYOCOLOR Co., Ltd.)

(2) Thermoplastic Elastomer

The following thermoplastic elastomers were used. (4B-1): Propylene-butene random copolymer using propylene as a main component (MFR=7.0 g/10 minutes, Tm=75° C., density=0.885 g/cm$^3$, propylene content=69 wt %, butene content=31 wt %, ethylene content=0 wt %): trade name "TAFMER XM7070" manufactured by Mitsui Chemicals, Inc.

(4B-2): Butene homopolymer (MFR=5.0 g/10 minutes, Tm=125° C., density=0.915 g/cm$^3$, ethylene content=0 wt %): trade name "TAFMER BL4000" manufactured by Mitsui Chemicals, Inc.

(4B-3): Propylene-ethylene-butene random copolymer using propylene as a main component (MFR=6.0 g/10 minutes, Tm=160° C., density=0.868 g/cm$^3$, propylene content=84 wt %, ethylene content=9 wt %, butene content=7 wt %): trade name "TAFMER PN2060" manufactured by Mitsui Chemicals, Inc.

(4B-4): Propylene-ethylene random copolymer using propylene as a main component (MFR=8.0 g/10 minutes, Tm=61° C., density=0.871 g/cm$^3$, propylene content=89 wt %, ethylene content=11 wt %): trade name "VISTAMAXX3000" manufactured by Exxon Mobil Chemical, Corporation Example 4-1

Production of Decorative Film

There was used a 2-kind 2-layer T-die having a lip opening of 0.8 mm and a die width of 400 mm, to which an extruder-1 for a sealing layer (I) having a nozzle diameter of 30 mm (diameter) and an extruder-2 for a layer (II) having a nozzle diameter of 40 mm (diameter) had been connected. One obtained by blending the polypropylene-based resin (4A-1) and the thermoplastic elastomer (4B-1) so as to be a weight ratio of 85:15 was charged into the extruder-1 for a sealing layer (I) and the polypropylene-based resin (4C-1) was charged into the extruder-2 for a layer (II) and melt-extrusion was performed under conditions of a resin temperature of 240° C., a discharge amount from the extruder-1 for a sealing layer (I) of 4 kg/h, and a discharge amount from the extruder-2 for a layer (II) of 12 kg/h. The melt-extruded film was cooled and solidified while pushing it to a first roll rotating at 3 m/min at 80° C. with an air knife so that the sealing layer (I) came outside, thereby obtaining a two-layered unstretched film where a sealing layer (I) having a thickness of 50 μm and a layer (II) having a thickness of 150 μm were laminated.

Three-Dimensional Decorative Thermoforming

As the resin molded body (substrate) 5, there was used the injection molded body composed of the polypropylene-based resin (X-1) obtained in the above.

As a three-dimensional decorative thermoforming apparatus, "NGF-0406-SW" manufactured by Fu-se Vacuum Forming Ltd. was used. As shown in FIG. 2 to FIG. 7, a decorative film 1 was cut into a size having a width of 250 mm and a length of 350 mm and was set to a jig 13 for film fixing having an opening part size of 210 mm×300 mm so that the sealing layer (I) faced to the substrate (resin molded body 5) and the longitudinal direction became the MD direction of the film. The resin molded body 5 was attached on a sample-placing stand having a height of 20 mm, which was placed on a table 14 positioned below the jig 13, through "NICETACK NW-K15" manufactured by Nichiban Co., Ltd. The jig 13 and the table 14 were placed in upper and lower chamber boxes 11 and 12 and the upper and lower chamber boxes 11 and 12 were closed to make the inside of the chamber boxes a tightly closed state. The chamber boxes were divided into upper and lower ones through the decorative film 1. The upper and lower chamber boxes 11 and 12 were vacuum-suctioned and a far-infrared heater 15 placed on the upper chamber box 11 was started at an output of 80% to heat the decorative film 1 in a state that the pressure was reduced from atmospheric pressure (101.3 kPa) to 1.0 kPa. During heating, the vacuum-suction was continued and finally, the pressure was reduced to 0.1 kPa. After 5 seconds from the finish of a spring-back phenomenon that the decorative film 1 was heated to temporarily slacken and thereafter tension returned, the table 14 placed in the lower chamber box 12 was transferred upward to push the resin molded body 5 to the decorative film 1 and immediately after that, compressed air was fed so that the pressure in the upper chamber box 11 became 270 kPa to adhere the resin molded body 5 and the decorative film 1 closely. Thus, there was obtained a three-dimensional decorative thermoformed article (decorative molded body 6) where the decorative film 1 was stuck on the upper surface and side surface of the resin molded body 5.

Table 4-1 shows evaluation results of physical properties of the obtained decorative molded bodies and the like.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 4-2

Evaluation was performed in the same manner as in Example 4-1 except that, in the production of the decorative film of Example 4-1, the thermoplastic elastomer (4B-1) used for the sealing layer (I) was changed to the thermoplastic elastomer (4B-2). Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 4-3

Evaluation was performed in the same manner as in Example 4-1 except that, in the production of the decorative film of Example 4-1, the thermoplastic elastomer (4B-1) used for the sealing layer (I) was changed to the thermoplastic elastomer (4B-3). Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 4-4

Evaluation was performed in the same manner as in Example 4-1 except that, in the production of the decorative film of Example 4-1, the thermoplastic elastomer (4B-1) used for the sealing layer (I) was changed to the thermoplastic elastomer (4B-4). Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 4-5

Evaluation was performed in the same manner as in Example 4-1 except that, in the production of the decorative film of Example 4-1, the blending ratio of the polypropylene-based resin (4A-1) to the thermoplastic elastomer (4B-1) was controlled to 70:30. Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 4-6

Evaluation was performed in the same manner as in Example 4-1 except that, in the production of the decorative film of Example 4-1, the blending ratio of the polypropylene-based resin (4A-1) to the thermoplastic elastomer (4B-1) was controlled to 30:70. Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 4-7

Evaluation was performed in the same manner as in Example 4-1 except that, in the production of the decorative film of Example 4-1, the polypropylene-based resin (4A-1) used for the sealing layer (I) was changed to the polypropylene-based resin (4A-2). Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 4-8

Evaluation was performed in the same manner as in Example 4-1 except that, in the production of the decorative film of Example 4-1, the polypropylene-based resin (4C-1) used for the layer (II) was changed to the polypropylene-based resin (4C-2). Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 4-9

Evaluation was performed in the same manner as in Example 4-1 except that, in the three-dimensional decorative thermoforming of Example 4-1, the substrate was changed to the injection molded body using the resin (X-2). Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 4-10

Evaluation was performed in the same manner as in Example 4-1 except that, in the three-dimensional decorative thermoforming of Example 4-1, the substrate was changed to the injection molded body using the resin (X-3). Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Reference Example 4-1

Evaluation was performed in the same manner as in Example 4-1 except that, in the production of the decorative film of Example 4-1, the thermoplastic elastomer (4B-1) was not blended in the sealing layer (I) and only the polypropylene-based resin (4A-1) was used. Table 4-1 shows evaluation results.

Since the thermoplastic elastomer was not contained in the sealing layer, adhesive force was small and emergence of scratches could not be sufficiently suppressed. Thus, the appearance was poor.

Reference Example 4-2

Evaluation was performed in the same manner as in Example 4-1 except that, in the production of the decorative film of Example 4-1, the thermoplastic elastomer (4B-1) was not blended in the sealing layer (I), only the polypropylene-based resin (4A-1) was used and further, in the three-dimensional decorative thermoforming, heating was continued for 20 seconds after the spring-back phenomenon was finished and then the decorative thermoforming was conducted. Table 4-1 shows evaluation results.

By lengthening the film heating time, adhesive force was improved but draw-down of the film was severe and the appearance of the decorative molded body was poor, so that the evaluation of the scratches was not performed.

Example 4-11

In the production of the decorative film of Example 4-1, there was used a 3-kind 3-layer T-die having a lip opening of 0.8 mm and a die width of 400 mm, to which an extruder-1 for a sealing layer (I) having a nozzle diameter of 30 mm (diameter), an extruder-2 for an intermediate layer (layer (II)) having a nozzle diameter of 40 mm (diameter), and an extruder-3 for a surface layer (surface decorative layer (III)) having a nozzle diameter of 30 mm (diameter), had been connected. One obtained by blending the polypropylene-based resin (4A-1) and the thermoplastic elastomer (4B-1) so as to be a weight ratio of 85:15 was charged into the extruder-1 for a sealing layer (I), the polypropylene-based resin (4C-1) was charged into the extruder-2 for an intermediate layer, and the polypropylene-based resin (4A-2) was charged into the extruder-3 for a surface layer, and melt-extrusion was performed under conditions of a resin temperature of 240° C., a discharge amount from the extruder-1 for a sealing layer (I) of 4 kg/h, a discharge amount from the extruder-2 for an intermediate layer of 8 kg/h, and a discharge amount from the extruder-3 for a surface layer of 4 kg/h.

The melt-extruded film was cooled and solidified so that the surface decorative layer came into contact with a cooling roll rotating at 3 m/min at 80° C., thereby obtaining a three-layered unstretched film where a surface decorative layer (III) having a thickness of 50 μm, a layer (II) (intermediate layer) having a thickness of 100 μm, and a sealing layer (I) having a thickness of 50 μm were laminated.

Evaluation was performed in the same manner as in Example 4-1 except that the unstretched film obtained in the above decorative film production was used. Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Moreover, the polypropylene-based resin (4A-2) was laminated as the surface decorative layer (III) at the uppermost surface side, so that a result of excellent gloss was observed. Furthermore, the recycled molded body was excellent in appearance (evaluation: O).

Example 4-12

Evaluation was performed in the same manner as in Example 4-11 except that, in the production of the decorative film of Example 4-11, the polypropylene-based resin (4A-2) used for the surface decorative layer (III) was changed to the polypropylene-based resin (4D-1). Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Moreover, the polypropylene-based resin (4D-1) to which a nucleating agent had been added was laminated as the surface decorative layer (III) at the uppermost surface side, so that a result of excellent gloss was observed. Furthermore, the recycled molded body was excellent in appearance (evaluation: O).

Example 4-13

Evaluation was performed in the same manner as in Example 4-11 except that, in the production of the decorative film of Example 4-11, the polypropylene-based resin (4A-2) used for the surface decorative layer (III) was changed to the polypropylene-based resin (4D-2). Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Moreover, the polypropylene-based resin (4D-2) was laminated as the surface decorative layer (III) at the uppermost surface side, so that a result of excellent gloss was observed. Furthermore, the recycled molded body was excellent in appearance (evaluation: O).

Example 4-14

Evaluation was performed in the same manner as in Example 4-11 except that, in the production of the decorative film of Example 4-11, the polypropylene-based resin (4A-2) used for the surface decorative layer (III) was changed to the polypropylene-based resin (4D-3). Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Moreover, the polypropylene-based resin (4D-3) to which a nucleating agent had been added was laminated as the surface decorative layer (III) at the uppermost surface side, so that a result of excellent gloss was observed. Furthermore, the recycled molded body was excellent in appearance (evaluation: O).

Example 4-15

Evaluation was performed in the same manner as in Example 4-11 except that, in the production of the decorative film of Example 4-11, the polypropylene-based resin (4A-2) used for the surface decorative layer (III) was changed to the polypropylene-based resin (4D-4). Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Further, coupled with the sticking of the white-colored decorative film, the scratches were sufficiently hidden to such a degree that the scratched place was not able to identify. Therefore, the scratch depth was not measured. Moreover, since the surface decorative layer (III) excellent in gloss was colored white, appearance was excellent. Furthermore, the recycled molded body was excellent in appearance (evaluation: O).

Example 4-16

Evaluation was performed in the same manner as in Example 4-11 except that, in the production of the decorative film of Example 4-11, the polypropylene-based resin (4C-1) used for the layer (II) was changed to the polypropylene-based resin (4C-3). Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Further, coupled with the sticking of the black-colored decorative film, the scratches were sufficiently hidden to such a degree that the scratched place was not able to identify. Therefore, the scratch depth was not measured. Moreover, since the layer (II) was colored black, appearance was excellent. Furthermore, the polypropylene-based resin (4A-2) was laminated as the surface decorative layer (III) at the uppermost surface side, so that a result of excellent gloss was observed. In addition, the recycled molded body was excellent in appearance (evaluation: O).

Example 4-17

Evaluation was performed in the same manner as in Example 4-16 except that, in the production of the decorative film of Example 4-16, the polypropylene-based resin (4A-2) used for the surface decorative layer (III) was changed to the polypropylene-based resin (4D-5). Table 4-1 shows evaluation results.

Since the polypropylene-based resin (A), the thermoplastic elastomer (D), and the polypropylene-based resin (B) satisfy all the requirements of the present invention, the obtained decorative molded body was excellent in appearance and adhesive force, and scratches were made inconspicuous. Further, coupled with the sticking of the colored decorative film, the scratches were sufficiently hidden to such a degree that the scratched place was not able to identify. Therefore, the scratch depth was not measured. Moreover, the polypropylene-based resin (4D-5) was laminated as the surface decorative layer (III) at the uppermost surface side, so that a result of excellent gloss was observed. Further, since the layer (II) was colored black and the surface decorative layer (III) was colored silver, the film became a metallic film and appearance was excellent. Furthermore, the recycled molded body was excellent in appearance (evaluation: O).

TABLE 4-1

| | | | Unit | Example 4-1 | Example 4-2 | Example 4-3 | Example 4-4 | Example 4-5 | Example 4-6 | Example 4-7 | Example 4-8 | Example 4-9 | Example 4-10 |
|---|---|---|---|---|---|---|---|---|---|---|---|---|---|
| Surface decorative layer (III) | Polypropylene-based resin (H) | Kind | | — | — | — | — | — | — | — | — | — | — |
| | | MFR | g/10 min | — | — | — | — | — | — | — | — | — | — |
| Layer (II) | Polypropylene-based resin (B) | Kind | | 4C-1 | 4C-1 | 4C-1 | 4C-1 | 4C-1 | 4C-1 | 4C-1 | 4C-2 | 4C-1 | 4C-1 |
| | | MFR | g/10 min | 2.4 | 2.4 | 2.4 | 2.4 | 2.4 | 2.4 | 2.4 | 0.4 | 2.4 | 2.4 |
| | | Tm | ° C. | 161 | 161 | 161 | 161 | 161 | 161 | 161 | 161 | 161 | 161 |
| Sealing layer (I) | Polypropylene-based resin (A) | Kind | | 4A-1 | 4A-1 | 4A-1 | 4A-1 | 4A-1 | 4A-1 | 4A-2 | 4A-1 | 4A-1 | 4A-1 |
| | | MFR | g/10 min | 7 | 7 | 7 | 7 | 7 | 7 | 10 | 7 | 7 | 7 |
| | | Tm | ° C. | 146 | 146 | 146 | 146 | 146 | 146 | 161 | 146 | 146 | 146 |
| | | Blending amount | wt % | 85 | 85 | 85 | 85 | 70 | 30 | 85 | 85 | 85 | 85 |
| | Elastomer (D) | Kind | | 4B-1 | 4B-2 | 4B-3 | 4B-4 | 4B-1 | 4B-1 | 4B-1 | 4B-1 | 4B-1 | 4B-1 |
| | | MFR | g/10 min | 7 | 5 | 6 | 8 | 7 | 7 | 7 | 7 | 7 | 7 |
| | | Tm | ° C. | 75 | 125 | 160 | 61 | 75 | 75 | 75 | 75 | 75 | 75 |
| | | Density | g/cm$^3$ | 0.885 | 0.915 | 0.868 | 0.871 | 0.885 | 0.885 | 0.885 | 0.885 | 0.885 | 0.885 |
| | | Blending amount | wt % | 15 | 15 | 15 | 15 | 30 | 70 | 15 | 15 | 15 | 15 |
| MFR(B)/MFR(A) | | | | 0.343 | 0.343 | 0.343 | 0.343 | 0.343 | 0.343 | 0.240 | 0.057 | 0.343 | 0.343 |
| Substrate | Kind | | | X-1 | X-1 | X-1 | X-1 | X-1 | X-1 | X-1 | X-1 | X-2 | X-3 |
| Heating time after finish of spring-back | | | sec | 5 | 5 | 5 | 5 | 5 | 5 | 5 | 5 | 5 | 5 |
| Appearance of decorative molded body | | | | O | O | O | O | O | O | O | O | O | O |
| Adhesive force | | | N/10 mm | 24 | 31 | 26 | 16 | 20 | 16 | 22 | 24 | 22 | 23 |
| Scratch evaluation | Depth | | μm | 2.6 | 3.8 | 2.6 | 2.7 | 2.8 | 3.0 | 2.9 | 2.8 | 3 | 2.2 |
| | Whitened appearance | | | O | O | O | O | O | O | O | O | O | O |
| GLOSS (60°) | | | % | 17 | 18 | 18 | 18 | 19 | 17 | 18 | 18 | 19 | 18 |
| Appearance of recycled molded body | | | | O | O | O | O | O | O | O | O | O | O |

| | | | Unit | Reference Example 4-1 | Reference Example 4-2 | Example 4-11 | Example 4-12 | Example 4-13 | Example 4-14 | Example 4-15 | Example 4-16 | Example 4-17 |
|---|---|---|---|---|---|---|---|---|---|---|---|---|
| Surface decorative layer (III) | Polypropylene-based resin (H) | Kind | | — | — | 4A-2 | 4D-1 | 4D-2 | 4D-3 | 4D-4 | 4A-2 | 4D-5 |
| | | MFR | g/10 min | — | — | 10 | 10 | 7 | 7 | 10 | 10 | 10 |
| Layer (II) | Polypropylene-based resin (B) | Kind | | 4C-1 | 4C-1 | 4C-1 | 4C-1 | 4C-1 | 4C-1 | 4C-1 | 4C-3 | 4C-3 |
| | | MFR | g/10 min | 2.4 | 2.4 | 2.4 | 2.4 | 2.4 | 2.4 | 2.4 | 2.4 | 2.4 |
| | | Tm | ° C. | 161 | 161 | 161 | 161 | 161 | 161 | 161 | 161 | 161 |

TABLE 4-1-continued

| | | | | | | | | | | | |
|---|---|---|---|---|---|---|---|---|---|---|---|
| Sealing layer (I) | Polypropylene-based resin (A) | Kind | | 4A-1 | 4A-1 | 4A-1 | 4A-1 | 4A-1 | 4A-1 | 4A-1 | 4A-1 | 4A-1 |
| | | MFR | g/10 min | 7 | 7 | 7 | 7 | 7 | 7 | 7 | 7 | 7 |
| | | Tm | °C. | 146 | 146 | 146 | 146 | 146 | 146 | 146 | 146 | 146 |
| | | Blending amount | wt % | 100 | 100 | 85 | 85 | 85 | 85 | 85 | 85 | 85 |
| | Elastomer (D) | Kind | | none | none | 4B-1 | 4B-1 | 4B-1 | 4B-1 | 4B-1 | 4B-1 | 4B-1 |
| | | MFR | g/10 min | — | — | 7 | 7 | 7 | 7 | 7 | 7 | 7 |
| | | Tm | °C. | — | — | 75 | 75 | 75 | 75 | 75 | 75 | 75 |
| | | Density | g/cm³ | — | — | 0.885 | 0.885 | 0.885 | 0.885 | 0.885 | 0.885 | 0.885 |
| | | Blending amount | wt % | — | — | 15 | 15 | 15 | 15 | 15 | 15 | 15 |
| MFR(B)/MFR(A) | | | | 0.343 | 0.343 | 0.343 | 0.343 | 0.343 | 0.343 | 0.343 | 0.343 | 0.343 |
| Substrate | Kind | | | X-1 | X-1 | X-1 | X-1 | X-1 | X-1 | X-1 | X-1 | X-1 |
| Heating time after finish of spring-back | | | sec | 5 | 20 | 5 | 5 | 5 | 5 | 5 | 5 | 5 |
| Appearance of decorative molded body | | | | ○ | X | ○ | ○ | ○ | ○ | ○ | ○ | ○ |
| Adhesive force | | | N/10 mm | 3 | 33 | 22 | 25 | 23 | 22 | 23 | 22 | 22 |
| Scratch evaluation | Depth | | μm | 9.5 | — | 2.8 | 2.2 | 2.5 | 2.7 | — | — | — |
| | Whitened appearance | | | X | — | ○ | ○ | ○ | ○ | ○ | ○ | ○ |
| GLOSS (60°) | | | % | 18 | — | 33 | 83 | 36 | 92 | 31 | 35 | 32 |
| Appearance of recycled molded body | | | | ○ | — | ○ | ○ | ○ | ○ | ○ | ○ | ○ |

Example 4-18

Production of Decorative Film

In the production of the decorative film of Example 4-17, melt-extrusion was performed under conditions of a discharge amount from the extruder-1 for a sealing layer (I) of 4 kg/h, a discharge amount from the extruder-2 for an intermediate layer of 12 kg/h, and a discharge amount from the extruder-3 for a surface layer of 4 kg/h and the obtained three-layered unstretched film was slit into a width of 200 mm, thereby obtaining a three-layered unstretched film where a surface decorative layer (III) having a thickness of 50 μm, a layer (II) (intermediate layer) having a thickness of 150 μm, and a sealing layer (I) having a thickness of 50 μm were laminated.

Production of Embossed Film

As an embossing apparatus, an electric heating type test embossing machine manufactured by YURIROLL Co., Ltd. was used. The electric heating type test embossing machine has a mechanism of transferring an uneven shape at an upper surface to a film surface by heating and pressing the film with a roll (embossing roll) having a heatable uneven shape placed at an upper stage and a smooth roll placed at a lower stage. In the embossing roll, a hairline pattern having a depth of 0.030 μm was used.

The three-layered unstretched film obtained by the production of the decorative film was fed between two rolls of the embossing machine so that the surface decorative layer (III) came into contact with the embossing roll. By transferring the embossment under conditions of an embossing roll temperature of 145° C., a contact pressure of 3 MPa, and a roll speed of 3 m/min, there was obtained a decorative film where the hairline pattern was transferred on the surface of the surface decorative layer (III).

Three-Dimensional Decorative Thermoforming

A three-dimensional decorative thermoformed article was obtained in the same manner as in Example 4-1.

Table 4-2 shows evaluation results of physical properties of the obtained embossed films and three-dimensional decorative thermoformed articles.

Since the polypropylene-based resin (A), the thermoplastic elastomer (D), and the polypropylene-based resin (B) satisfy all the requirements of the present invention, the depth of embossment of the film obtained by the production of the embossed film was so excellent as 25 μm. Moreover, also on the surface of the three-dimensional decorative thermoformed article after three-dimensional decorative thermoforming, the hairline pattern strongly remained and thus designability was excellent.

TABLE 4-2

| | | | Unit | Example 4-18 |
|---|---|---|---|---|
| Surface decorative layer (III) | Polypropylene-based resin (H) | Kind | | 4D-5 |
| | | MFR | g/10 min | 10 |
| Layer (II) | Polypropylene-based resin (B) | Kind | | 4C-3 |
| | | MFR | g/10 min | 2.4 |
| | | Tm | °C. | 161 |
| Sealing layer (I) | Polypropylene-based resin (A) | Kind | | 4A-1 |
| | | MFR | g/10 min | 7 |
| | | Tm | °C. | 146 |
| | | Blending amount | wt % | 85 |
| | Elastomer (D) | Kind | | 4B-1 |
| | | MFR | g/10 min | 7 |
| | | Tm | °C. | 75 |
| | | Density | g/cm³ | 0.885 |
| | | Blending amount | wt % | 15 |
| MFR(B)/MFR(A) | | | | 0.343 |
| Substrate | Kind | | | X-1 |
| Heating time after spring-back | | | sec | 5 |
| Depth of embossment | | | μm | 25 |
| Embossed pattern after thermoforming | | | | ○ |

Test Example 5

[Used Materials]

(1) Polypropylene-Based Resin

The following polypropylene-based resins were used.

(5A-1): Propylene-α-olefin copolymer (MFR=7 g/10 minutes, Tm=146° C., crystallization initiation temperature=111° C., isothermal crystallization temperature (t)=263 seconds (measured at 121° C.)), trade name "NOVATEC (registered trademark) FW3G-T" manufactured by Japan Polypropylene Corporation (5A-2): Propylene homopolymer (MFR=10 g/10 minutes, Tm=161° C., crystallization initiation temperature=123° C., isothermal crystallization temperature (t)=613 seconds (measured at 133° C.)), trade name "NOVATEC (registered trademark) FA3KM" manufactured by Japan Polypropylene Corporation (5A-3): Propylene-α-olefin copolymer (MFR=7 g/10 minutes, Tm=125° C., crystallization initiation temperature=97° C., isothermal crystallization temperature (t)=570 seconds (measured at 107° C.)), trade name "WINTEC (registered trademark) WFX4M" manufactured by Japan Polypropylene Corporation (5A-4): Propylene block copolymer (MFR=6 g/10 minutes, Tm=135° C., crystallization initiation temperature=99° C., isothermal crystallization temperature (t)=478 seconds (measured at 109° C.)), trade name "WELNEX (registered trademark) RFG4VA" manufactured by Japan Polypropylene Corporation (5C-1): Propylene homopolymer (MFR=2.4 g/10 minutes, Tm=161° C.), trade name "NOVATEC (registered trademark) FY6" manufactured by Japan Polypropylene Corporation (5C-2): Propylene homopolymer (MFR=0.4 g/10 minutes, Tm=161° C.), trade name "NOVATEC (registered trademark) EA9" manufactured by Japan Polypropylene Corporation (5C-3): Polypropylene-based resin composition (MFR=2.4 g/10 minutes, Tm=161° C.) obtained by blending 96% by weight of the polypropylene-based resin (5C-1) with 4% by weight of a black pigment MB (EPP-K-120601 manufactured by Polycol Kogyo K.K.)

(5D-1): Polypropylene-based resin composition (MFR=10 g/10 minutes, Tm=164° C.) obtained by blending 100% by weight of the polypropylene-based resin (5A-2) with 0.4% by weight of a nucleating agent (trademark "Millad NX8000J" manufactured by Milliken Japan)

(5D-2): Polypropylene-based resin composition (MFR=7 g/10 minutes, Tm=127° C.) obtained by blending 100% by weight of the polypropylene-based resin (5A-3) with 0.4% by weight of a nucleating agent (trademark "Millad NX8000J" manufactured by Milliken Japan)

(5D-3): Polypropylene-based resin composition (MFR=10 g/10 minutes, Tm=161° C.) obtained by blending 96% by weight of the polypropylene-based resin (5A-2) with 4% by weight of a white pigment MB having MFR of 11 g/10 minutes (EPP-W-59578 manufactured by Polycol Kogyo K.K., titanium oxide content of 80% by weight)

(5D-4): Polypropylene-based resin composition (MFR=10 g/10 minutes, Tm=161° C.) obtained by blending 96% by weight of the polypropylene-based resin (5A-2) with 4% by weight of a silver pigment MB (PPCM913Y-42 SILVER21X manufactured by TOYOCOLOR Co., Ltd.)

(2) Thermoplastic Resin

The following thermoplastic resins were used.

(5B-1): Hydrogenated styrene-based elastomer (HSBR): trade name "DYNARON 1320P" manufactured by JSR Corporation (5B-2): Styrene-based elastomer (SEBS): trade name "KRATON G1645" manufactured by KRATON Polymer Japan Corporation (5B-3): Alicyclic hydrocarbon resin: trade name "ARKON-P125" manufactured by Arakawa Chemical Industries, Ltd.

Example 5-1

Production of Decorative Film

There was used a 2-kind 2-layer T-die having a lip opening of 0.8 mm and a die width of 400 mm, to which an extruder-1 for a sealing layer (I) having a nozzle diameter of 30 mm (diameter) and an extruder-2 for a layer (II) having a nozzle diameter of 40 mm (diameter) had been connected. One obtained by blending the polypropylene-based resin (5A-1) and the thermoplastic resin (5B-1) so as to be a weight ratio of 50:50 was charged into the extruder-1 for a sealing layer (I) and the polypropylene-based resin (5C-1) was charged into the extruder-2 for a layer (II) and melt-extrusion was performed under conditions of a resin temperature of 240° C., a discharge amount from the extruder-1 for a sealing layer (I) of 4 kg/h, and a discharge amount from the extruder-2 for a layer (II) of 12 kg/h. The melt-extruded film was cooled and solidified while pushing it to a first roll rotating at 3 m/min at 80° C. with an air knife so that the sealing layer (I) came outside, thereby obtaining a two-layered unstretched film where a sealing layer (I) having a thickness of 50 µm and a layer (II) having a thickness of 150 µm were laminated.

Three-Dimensional Decorative Thermoforming

As the resin molded body (substrate) 5, there was used the injection molded body composed of the polypropylene-based resin (X-1) obtained in the above.

As a three-dimensional decorative thermoforming apparatus, "NGF-0406-SW" manufactured by Fu-se Vacuum Forming Ltd. was used. As shown in FIG. 2 to FIG. 7, a decorative film 1 was cut into a size having a width of 250 mm and a length of 350 mm and was set to a jig 13 for film fixing having an opening part size of 210 mm×300 mm so that the sealing layer (I) faced to the substrate (resin molded body 5) and the longitudinal direction became the MD direction of the film. The resin molded body 5 was attached on a sample-placing stand having a height of 20 mm, which was placed on a table 14 positioned below the jig 13, through "NICETACK NW-K15" manufactured by Nichiban Co., Ltd. The jig 13 and the table 14 were placed in upper and lower chamber boxes 11 and 12 and the upper and lower chamber boxes 11 and 12 were closed to make the inside of the chamber boxes a tightly closed state. The chamber boxes were divided into upper and lower ones through the decorative film 1. The upper and lower chamber boxes 11 and 12 were vacuum-suctioned and a far-infrared heater 15 placed on the upper chamber box 11 was started at an output of 80% to heat the decorative film 1 in a state that the pressure was reduced from atmospheric pressure (101.3 kPa) to 1.0 kPa. During heating, the vacuum-suction was continued and finally, the pressure was reduced to 0.1 kPa. Immediately after the finish of a spring-back phenomenon that the decorative film 1 was heated to temporarily slacken and thereafter tension returned (i.e., heating time after the spring-back phenomenon was 0 second), the table 14 placed in the lower chamber box 12 was transferred upward to push the resin molded body 5 to the decorative film 1 and immediately after that, compressed air was fed so that the pressure in the upper chamber box 11 became 270 kPa to adhere the resin molded body 5 and the decorative film 1 closely. Thus, there was obtained a three-dimensional decorative thermoformed article (decorative molded body 6) where the decorative film 1 was stuck on the upper surface and side surface of the resin molded body 5.

Table 5-1 shows evaluation results of physical properties of the obtained decorative molded body and the like.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 5-2

Evaluation was performed in the same manner as in Example 5-1 except that, in the production of the decorative film of Example 5-1, the thermoplastic resin (5B-1) used for the sealing layer (I) was changed to the thermoplastic resin (5B-2). Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 5-3

Evaluation was performed in the same manner as in Example 5-1 except that, in the production of the decorative film of Example 5-1, the thermoplastic resin (5B-1) used for the sealing layer (I) was changed to the thermoplastic resin (5B-3) and the blending ratio of the polypropylene-based resin (5A-1) to the thermoplastic resin (5B-3) was controlled to 85:15. Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 5-4

Evaluation was performed in the same manner as in Example 5-1 except that, in the production of the decorative film of Example 5-1, the blending ratio of the polypropylene-based resin (5A-1) to the thermoplastic resin (5B-1) was controlled to 70:30. Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 5-5

Evaluation was performed in the same manner as in Example 5-1 except that, in the production of the decorative film of Example 5-1, the blending ratio of the polypropylene-based resin (5A-1) to the thermoplastic resin (5B-1) was controlled to 30:70. Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 5-6

Evaluation was performed in the same manner as in Example 5-1 except that, in the production of the decorative film of Example 5-1, the polypropylene-based resin (5A-1) used for the sealing layer (I) was changed to the polypropylene-based resin (5A-2). Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 5-7

Evaluation was performed in the same manner as in Example 5-1 except that, in the production of the decorative film of Example 5-1, the polypropylene-based resin (5A-1) used for the sealing layer (I) was changed to the polypropylene-based resin (5A-3). Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 5-8

Evaluation was performed in the same manner as in Example 5-1 except that, in the production of the decorative film of Example 5-1, the polypropylene-based resin (5A-1) used for the sealing layer (I) was changed to the polypropylene-based resin (5A-4) and the blending ratio of the polypropylene-based resin (5A-4) to the thermoplastic resin (5B-1) was controlled to 70:30. Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 5-9

Evaluation was performed in the same manner as in Example 5-1 except that, in the production of the decorative film of Example 5-1, the polypropylene-based resin (5C-1) used for the layer (II) was changed to the polypropylene-based resin (5C-2). Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 5-10

Evaluation was performed in the same manner as in Example 5-1 except that, in the three-dimensional decorative thermoforming of Example 5-1, the substrate was changed to the injection molded body using the resin (X-2). Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 5-11

Evaluation was performed in the same manner as in Example 5-1 except that, in the three-dimensional decorative thermoforming of Example 5-1, the substrate was changed to the injection molded body using the resin (X-3). Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Reference Example 5-1

Evaluation was performed in the same manner as in Example 5-1 except that, in the production of the decorative film of Example 5-1, the thermoplastic resin (E) was not blended in the sealing layer (I) and only the polypropylene-based resin (5A-1) was used. Table 5-1 shows evaluation results.

Since the thermoplastic resin (E) was not contained in the sealing layer (I), adhesive force was small and emergence of scratches could not be sufficiently suppressed. Thus, the appearance was poor.

Reference Example 5-2

Evaluation was performed in the same manner as in Example 5-1 except that, in the production of the decorative film of Example 5-1, the thermoplastic resin (E) was not blended in the sealing layer (I), only the polypropylene-based resin (5A-1) was used and further, in the three-dimensional decorative thermoforming, heating was continued for 20 seconds after the spring-back phenomenon was finished and then the decorative thermoforming was conducted. Table 5-1 shows evaluation results.

By lengthening the film heating time, adhesive force was improved but draw-down of the film was severe and the appearance of the decorative molded body was poor, so that the evaluation of the scratches was not performed.

Comparative Example 5-1

Evaluation was performed in the same manner as in Example 5-1 except that, in the production of the decorative film of Example 5-1, the thermoplastic resin (E) was not blended in the sealing layer (I), only the polypropylene-based resin (5A-1) was used, and the polypropylene-based resin (5A-2) was used for the layer (H). Table 5-1 shows evaluation results.

Since the thermoplastic resin (E) was not contained in the sealing layer, adhesive force was small and emergence of scratches could not be sufficiently suppressed. Moreover, since the polypropylene-based resin used for the layer (II) did not satisfy the requirement of the present invention, draw-down of the film was severe and the appearance of the decorative molded body was poor, so that the evaluation of the scratches and surface gloss was not performed.

Comparative Example 5-2

Evaluation was performed in the same manner as in Example 5-1 except that, in the production of the decorative film of Example 5-1, the polypropylene-based resin (5A-2) was used instead of the polypropylene-based resin (5C-1) used for the layer (II). Table 5-1 shows evaluation results.

Since the polypropylene-based resin used for the layer (11) did not satisfy the requirement of the present invention, draw-down of the film was severe and the appearance of the decorative molded body was poor, so that the evaluation of the scratches and surface gloss was not performed.

Example 5-12

In the production of the decorative film, there was used a 3-kind 3-layer T-die having a lip opening of 0.8 mm and a die width of 400 mm, to which an extruder-1 for a sealing layer (I) having a nozzle diameter of 30 mm (diameter), an extruder-2 for an intermediate layer (layer (II)) having a nozzle diameter of 40 mm (diameter), and an extruder-3 for a surface layer (surface decorative layer (III)) having a nozzle diameter of 30 mm (diameter), had been connected. One obtained by blending the polypropylene-based resin (5A-1) and the thermoplastic resin (5B-1) so as to be a weight ratio of 50:50 was charged into the extruder-1 for a sealing layer (I), the polypropylene-based resin (5C-1) was charged into the extruder-2 for an intermediate layer, and the polypropylene-based resin (5A-2) was charged into the extruder-3 for a surface layer, and melt-extrusion was performed under conditions of a resin temperature of 240° C., a discharge amount from the extruder-1 for a sealing layer (I) of 4 kg/h, a discharge amount from the extruder-2 for an intermediate layer of 8 kg/h, and a discharge amount from the extruder-3 for a surface layer of 4 kg/h.

The melt-extruded film was cooled and solidified so that the surface decorative layer (III) came into contact with a first roll rotating at 3 m/min at 80° C., thereby obtaining a three-layered unstretched film where a sealing layer (I) having a thickness of 50 µm, a layer (II) having a thickness of 100 µm, and a surface decorative layer (III) having a thickness of 50 µm were laminated.

Evaluation was performed in the same manner as in Example 5-1 except that the three-layered unstretched film obtained in the above decorative film production was used. Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O). Furthermore, by providing the surface decorative layer (III) composed of the polypropylene-based resin (H), it was able to obtain a decorative molded body more excellent in surface gloss.

Example 5-13

Evaluation was performed in the same manner as in Example 5-12 except that, in the production of the decorative film of Example 5-12, the polypropylene-based resin (5A-2) used for the surface decorative layer (III) was changed to the polypropylene-based resin (5D-1). Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the polypropylene-based resin (5D-1) to which a nucleating agent had been added was laminated as the surface decorative layer (III) at the uppermost surface side, so that a result of excellent gloss was observed. Furthermore, the recycled molded body was excellent in appearance (evaluation: O).

Example 5-14

Evaluation was performed in the same manner as in Example 5-12 except that, in the production of the decorative film of Example 5-12, the polypropylene-based resin (5A-2) used for the surface decorative layer (III) was changed to the polypropylene-based resin (5A-3). Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the polypropylene-based resin (5A-3) was laminated as the surface decorative layer (III) at the uppermost surface side, so that a result of excellent gloss was observed. Furthermore, the recycled molded body was excellent in appearance (evaluation: O).

Example 5-15

Evaluation was performed in the same manner as in Example 5-12 except that, in the production of the decorative film of Example 5-12, the polypropylene-based resin (5A-2) used for the surface decorative layer (III) was changed to the polypropylene-based resin (5D-2). Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Moreover, the polypropylene-based resin (5D-2) to which a nucleating agent had been added was laminated as the surface decorative layer (III) at the uppermost surface side, so that a result of excellent gloss was observed. Furthermore, the recycled molded body was excellent in appearance (evaluation: O).

Example 5-16

Evaluation was performed in the same manner as in Example 5-12 except that, in the production of the decorative film of Example 5-12, the polypropylene-based resin (5A-2) used for the surface decorative layer (III) was changed to the polypropylene-based resin (5D-3). Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Further, coupled with the sticking of the white-colored decorative film, the scratches were sufficiently hidden to such a degree that the scratched place was not able to identify. Therefore, the scratch depth was not measured. Moreover, since the surface decorative layer (III) excellent in gloss was colored white, appearance was excellent. Furthermore, the recycled molded body was excellent in appearance (evaluation: O).

Example 5-17

Evaluation was performed in the same manner as in Example 5-12 except that, in the production of the decorative film of Example 5-12, the polypropylene-based resin (5C-1) used for the layer (II) was changed to the polypropylene-based resin (5C-3). Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Further, coupled with the sticking of the black-colored decorative film, the scratches were sufficiently hidden to such a degree that the scratched place was not able to identify. Therefore, the scratch depth was not measured. Moreover, since the layer (II) was colored black, appearance was excellent. Furthermore, the polypropylene-based resin (5A-2) was laminated as the surface decorative layer (III) at the uppermost surface side, so that a result of excellent gloss was observed. In addition, the recycled molded body was excellent in appearance (evaluation: O).

Example 5-18

Evaluation was performed in the same manner as in Example 5-17 except that, in the production of the decorative film of Example 5-17, the polypropylene-based resin (5A-2) used for the surface decorative layer (III) was changed to the polypropylene-based resin (5D-4). Table 5-1 shows evaluation results.

Since the polypropylene-based resin (A), the thermoplastic resin (E), and the polypropylene-based resin (B) satisfy all the requirements of the present invention, the obtained decorative molded body was excellent in appearance and adhesive force, and scratches were made inconspicuous. Further, coupled with the sticking of the colored decorative film, the scratches were sufficiently hidden to such a degree that the scratched place was not able to identify. Therefore, the scratch depth was not measured. Moreover, the polypropylene-based resin (5D-4) was laminated as the surface decorative layer (III) at the uppermost surface side, so that a result of excellent gloss was observed. Further, since the layer (II) was colored black and the surface decorative layer (III) was colored silver, the film became a metallic film and appearance was excellent. Furthermore, the recycled molded body was excellent in appearance (evaluation: O).

TABLE 5-1

| | | | Unit | Example 5-1 | Example 5-2 | Example 5-3 | Example 5-4 | Example 5-5 | Example 5-6 | Example 5-7 | Example 5-8 | Example 5-9 | Example 5-10 | Example 5-11 |
|---|---|---|---|---|---|---|---|---|---|---|---|---|---|---|
| Surface decorative layer (III) | Polypropylene-based resin (H) | Kind | | — | — | — | — | — | — | — | — | — | — | — |
| | | MFR | g/10 min | — | — | — | — | — | — | — | — | — | — | — |

TABLE 5-1-continued

| | | | Unit | | | | | | | | | | | |
|---|---|---|---|---|---|---|---|---|---|---|---|---|---|---|
| Layer (II) | Poly-propylene-based resin (B) | Kind | | 5C-1 | 5C-1 | 5C-1 | 5C-1 | 5C-1 | 5C-1 | 5C-1 | 5C-1 | 5C-2 | 5C-1 | 5C-1 |
| | | MFR | g/10 min | 2.4 | 2.4 | 2.4 | 2.4 | 2.4 | 2.4 | 2.4 | 2.4 | 0.4 | 2.4 | 2.4 |
| | | MFR(B)/MFR(A) | | 0.343 | 0.343 | 0.343 | 0.343 | 0.343 | 0.24043 | 0.3 | 0.400 | 0.057 | 0.343 | 0.343 |
| Sealing layer (I) | Poly-propylene-based resin (A) | Kind | | 5A-1 | 5A-1 | 5A-1 | 5A-1 | 5A-1 | 5A-2 | 5A-3 | 5A-4 | 5A-1 | 5A-1 | 5A-1 |
| | | MFR | g/10 min | 7 | 7 | 7 | 7 | 7 | 10 | 7 | 6 | 7 | 7 | 7 |
| | | Isothermal crystallization time t | sec | 263 | 263 | 263 | 263 | 263 | 613 | 570 | 478 | 263 | 263 | 263 |
| | | Blending amount | wt % | 50 | 50 | 85 | 70 | 30 | 50 | 50 | 70 | 50 | 50 | 50 |
| | Thermoplastic resin (E) | Kind | | 5B-1 | 5B-2 | 5B-3 | 5B-1 | 5B-1 | 5B-1 | 5B-1 | 5B-1 | 5B-1 | 5B-1 | 5B-1 |
| | | Blending amount | wt % | 50 | 50 | 15 | 30 | 70 | 50 | 50 | 30 | 50 | 50 | 50 |
| | Resin Composition (X5) | Isothermal crystallization time t | sec | 2590 | 1991 | 1085 | 1233 | 4815 | 2598 | 2590 | 1397 | 2590 | 2590 | 2590 |
| | | t(X)/t(A) | | 9.8 | 7.6 | 4.1 | 4.7 | 18.3 | 4.2 | 4.5 | 2.9 | 9.8 | 9.8 | 9.8 |
| Substrate | Kind | | | X-1 | X-1 | X-1 | X-1 | X-1 | X-1 | X-1 | X-1 | X-1 | X-2 | X-3 |
| Heating time after spring-back | | | sec | 0 | 0 | 0 | 0 | 0 | 0 | 0 | 0 | 0 | 0 | 0 |
| Appearance of decorative molded body (thermoformability) | | | | ○ | ○ | ○ | ○ | ○ | ○ | ○ | ○ | ○ | ○ | ○ |
| GLOSS (60°) | | | | 20 | 18 | 18 | 22 | 23 | 20 | 21 | 20 | 19 | 18 | 21 |
| Adhesive force | | | N/10 mm | 40 | 20 | 33 | 30 | 35 | 38 | 55 | 22 | 36 | 42 | 39 |
| Scratch evaluation | Depth | | μm | 2.6 | 5.7 | 2.8 | 2.9 | 3.1 | 4.5 | 2.5 | 3 | 2.8 | 2.6 | 2.6 |
| | Whitened appearance | | | ○ | ○ | ○ | ○ | ○ | ○ | ○ | ○ | ○ | ○ | ○ |
| Appearance of recycled molded body | | | | ○ | ○ | ○ | ○ | ○ | ○ | ○ | ○ | ○ | ○ | ○ |

| | | | Unit | Reference Example 5-1 | Reference Example 5-2 | Comparative Example 5-1 | Comparative Example 5-2 | Example 5-12 | Example 5-13 | Example 5-14 | Example 5-15 | Example 5-16 | Example 5-17 | Example 5-18 |
|---|---|---|---|---|---|---|---|---|---|---|---|---|---|---|
| Surface decorative layer (III) | Poly-propylene-based resin (H) | Kind | | — | — | — | — | 5A-2 | 5D-1 | 5A-3 | 5D-2 | 5D-3 | 5A-2 | 5D-4 |
| | | MFR | g/10 min | — | — | — | — | 10 | 10 | 7 | 7 | 10 | 10 | 10 |
| Layer (II) | Poly-propylene-based resin (B) | Kind | | 5C-1 | 5C-1 | 5A-2 | 5A-2 | 5C-1 | 5C-1 | 5C-1 | 5C-1 | 5C-1 | 5C-3 | 5C-3 |
| | | MFR | g/10 min | 2.4 | 2.4 | 10 | 10 | 2.4 | 2.4 | 2.4 | 2.4 | 2.4 | 2.4 | 2.4 |
| | | MFR(B)/MFR(A) | | 0.343 | 0.343 | 1.429 | 1.429 | 0.343 | 0.343 | 0.343 | 0.343 | 0.343 | 0.343 | 0.343 |
| Sealing layer (I) | Poly-propylene-based resin (A) | Kind | | 5A-1 | 5A-1 | 5A-1 | 5A-1 | 5A-1 | 5A-1 | 5A-1 | 5A-1 | 5A-1 | 5A-1 | 5A-1 |
| | | MFR | g/10 min | 7 | 7 | 7 | 7 | 7 | 7 | 7 | 7 | 7 | 7 | 7 |
| | | Isothermal crystallization time t | sec | 263 | 263 | 263 | 263 | 263 | 263 | 263 | 263 | 263 | 263 | 263 |
| | | Blending amount | wt % | 100 | 100 | 100 | 50 | 50 | 50 | 50 | 50 | 50 | 50 | 50 |
| | Thermoplastic resin (E) | Kind | | — | — | — | 5B-1 | 5B-1 | 5B-1 | 5B-1 | 5B-1 | 5B-1 | 5B-1 | 5B-1 |
| | | Blending amount | wt % | 0 | 0 | 0 | 50 | 50 | 50 | 50 | 50 | 50 | 50 | 50 |
| | Resin Composition (X5) | Isothermal crystallization time t | sec | 263 | 263 | 263 | 2590 | 2590 | 2590 | 2590 | 2590 | 2590 | 2590 | 2590 |
| | | t(X)/t(A) | | 1.0 | 1.0 | 1.0 | 9.8 | 9.8 | 9.8 | 9.8 | 9.8 | 9.8 | 9.8 | 9.8 |
| Substrate | Kind | | | X-1 | X-1 | X-1 | X-1 | X-1 | X-1 | X-1 | X-1 | X-1 | X-1 | X-1 |
| Heating time after spring-back | | | sec | 0 | 20 | 0 | 0 | 0 | 0 | 0 | 0 | 0 | 0 | 0 |
| Appearance of decorative molded body (thermoformability) | | | | ○ | X | X | X | ○ | ○ | ○ | ○ | ○ | ○ | ○ |
| GLOSS (60°) | | | | 20 | — | — | — | 30 | 86 | 34 | 93 | 32 | 36 | 34 |
| Adhesive force | | | N/10 mm | 1 | 33 | 1 | 34 | 37 | 41 | 43 | 38 | 40 | 41 | 40 |
| Scratch evaluation | Depth | | μm | 10.1 | — | — | — | 4.1 | 2.6 | 2.6 | 2.6 | — | — | — |
| | Whitened appearance | | | X | — | — | — | ○ | ○ | ○ | ○ | ○ | ○ | ○ |
| Appearance of recycled molded body | | | | ○ | ○ | ○ | ○ | ○ | ○ | ○ | ○ | ○ | ○ | ○ |

Example 5-19

Production of Decorative Film

In the production of the decorative film of Example 5-18, melt-extrusion was performed under conditions of a discharge amount from the extruder-1 for a sealing layer (I) of 4 kg/h, a discharge amount from the extruder-2 for an intermediate layer of 12 kg/h, and a discharge amount from the extruder-3 for a surface layer of 4 kg/h and the obtained three-layered unstretched film was slit into a width of 200 mm, thereby obtaining a three-layered unstretched film where a surface decorative layer (III) having a thickness of 50 μm, a layer (II) having a thickness of 150 μm, and a sealing layer (I) having a thickness of 50 were laminated.

Production of Embossed Film

As an embossing apparatus, an electric heating type test embossing machine manufactured by YURIROLL Co., Ltd. was used. The electric heating type test embossing machine has a mechanism of transferring an uneven shape at an upper stage to a film surface by heating and pressing the film with a roll (embossing roll) having a heatable uneven shape placed at an upper stage and a smooth roll placed at a lower stage. In the embossing roll, a hairline pattern having a depth of 30 μm was used.

The three-layered unstretched film obtained by the production of the decorative film was fed between two rolls of the embossing machine so that the surface decorative layer (III) came into contact with the embossing roll. By transferring the embossment under conditions of an embossing roll temperature of 145° C., a contact pressure of 3 MPa, and a roll speed of 3 m/min, there was obtained a decorative film where the hairline pattern was transferred on the surface of the surface decorative layer (III).

Three-Dimensional Decorative Thermoforming

A three-dimensional decorative thermoformed article was obtained in the same manner as in Example 5-1.

Table 5-2 shows evaluation results of physical properties of the obtained embossed films and three-dimensional decorative thermoformed articles.

Since the polypropylene-based resin (A), the thermoplastic resin (E), and the polypropylene-based resin (B) satisfy all the requirements of the present invention, the depth of embossment of the film obtained by the production of the embossed film was so excellent as 25 μm. Moreover, also on the surface of the three-dimensional decorative thermoformed article after three-dimensional decorative thermoforming, the hairline pattern strongly remained and thus designability was excellent.

TABLE 5-2

| | | | Unit | Example 5-19 |
|---|---|---|---|---|
| Surface decorative layer (III) | Polypropylene-based resin (H) | Kind | | 5D-4 |
| | | MFR | g/10 min | 10 |
| Layer (II) | Polypropylene-based resin (B) | Kind | | 5C-3 |
| | | MFR | g/10 min | 2.4 |
| | | MFR(B)/MFR(A) | | 0.343 |
| Sealing layer (I) | Polypropylene-based resin (A) | Kind | | 5A-1 |
| | | MFR | g/10 min | 7 |
| | | Isothermal crystallization time t | sec | 263 |
| | | Blending amount | wt % | 50 |
| | Thermoplastic resin (E) | Kind | | 5B-1 |
| | | Blending amount | wt % | 50 |
| | Resin Composition (X5) | Isothermal crystallization time t(X)/t(A) | sec | 2590 |
| | | | | 9.8 |

TABLE 5-2-continued

| | Unit | Example 5-19 |
|---|---|---|
| Substrate Kind | | X-1 |
| Heating time after spring-back | sec | 0 |
| Depth of embossment | μm | 25 |
| Embossed pattern after thermoforming | | ○ |

Test Example 6

[Used Materials]
(1) Production of Polypropylene-Ethylene Block Copolymer (F)

As the propylene-ethylene block copolymer (F) to be used for the sealing layer (I) of the decorative film, there were used propylene-ethylene block copolymers (6A-1) to (6A-4) obtained in the Production Methods to be mentioned below. Table 6-1 shows polymerization conditions and polymerization results and Table 6-2 shows results of polymer analyses.

Production Example A-1: Production of Propylene-Ethylene Block Copolymer (6A-1) Analysis of Catalyst Composition Ti Content:

A sample was precisely weighed and, after hydrolysis, the content was measured using a colorimetry. As for a sample after preliminary polymerization, the content was calculated using the weight of the sample excluding a pre-polymerized polymer.

Silicon Compound Content:

A sample was precisely weighed and decomposed with methanol. By comparing it with a standard sample using gas chromatography, silicon compound concentration in the resulting methanol solution was determined. The content of silicon compounds contained in the sample was calculated from the silicon compound concentration in methanol and the weight of the sample. As for a sample after preliminary polymerization, the content was calculated using the weight of the sample excluding a pre-polymerized polymer.

Preparation of Pre-Polymerized Catalyst
(1) Preparation of Solid Catalyst

An autoclave fitted with a stirring device and having a volume of 10 L was thoroughly replaced by nitrogen and 2 L of toluene was introduced therein. Thereto was charged 200 g of magnesium diethoxide [$Mg(OEt)_2$] at room temperature, followed by adding 1 L of titanium tetrachloride ($TiCl_4$) slowly. Temperature was raised to 90° C. and 50 ml of di-n-butyl phthalate was introduced therein. Thereafter, the temperature was raised to 110° C. and reaction was carried out for 3 hours. The reaction product was thoroughly washed with purified toluene. Then, purified toluene was introduced to regulate the total liquid volume to 2 L. After 1 L of $TiCl_4$ was added at room temperature, the temperature was raised to 110° C. and reaction was carried out for 2 hours. The reaction product was thoroughly washed with purified toluene. Then, purified toluene was introduced to regulate the total liquid volume to 2 L. After 1 L of $TiCl_4$ was added at room temperature, the temperature was raised to 110° C. and reaction was carried out for 2 hours. The reaction product was thoroughly washed with purified toluene. Furthermore, using purified n-heptane, toluene was replaced by n-heptane to obtain a slurry of a solid component. A part of the slurry was sampled and dried. When it was analyzed, the Ti content of the solid component was 2.7% by weight.

Next, an autoclave fitted with a stirring device and having a volume of 20 L was thoroughly replaced by nitrogen and the slurry of the solid component was introduced therein in an amount of 100 g as the solid component. Purified n-heptane was introduced therein to regulate the concentration of the solid component to be 25 g/L. Silicon tetrachloride ($SiCl_4$) was added in an amount of 50 ml and reaction was carried out at 90° C. for 1 hour. The reaction product was thoroughly washed with purified n-heptane.

Thereafter, purified n-heptane was introduced therein to regulate the liquid level to 4 L. Thereto were added 30 ml of dimethyldivinylsilane, 30 ml of diisopropyldimethoxysilane [i-$Pr_2$Si(OMe)$_2$], and an n-heptane-diluted solution of triethylaluminum ($Et_3Al$) in an amount of 80 g as $Et_3Al$, followed by reaction at 40° C. for 2 hours. The reaction product was thoroughly washed with purified n-heptane to obtain a solid catalyst. A part of the obtained solid catalyst was sampled, dried, and analyzed. The solid catalyst contained 1.2% by weight of Ti and 8.9% by weight of i-$Pr_2$Si(OMe)$_2$.

(2) Preliminary Polymerization

Using the solid catalyst obtained above, preliminary polymerization was carried out according to the following procedure. Purified n-heptane was introduced into the above slurry to regulate the concentration of the solid catalyst so as to be 20 g/L. After the slurry was cooled to 10° C., an n-heptane-diluted solution of $Et_3Al$ in an amount of 10 g as $Et_3Al$ and 280 g of propylene was fed over a period of 4 hours. After the feed of propylene was finished, reaction was continued for further 30 min. Then, the gas-phase part was thoroughly replaced by nitrogen and the reaction product was thoroughly washed with purified n-heptane. The obtained slurry was extracted from the autoclave and vacuum drying was performed to obtain a pre-polymerized catalyst. The pre-polymerized catalyst contained 2.5 g of polypropylene per g of the solid catalyst. When it was analyzed, the portion of the pre-polymerized catalyst from which polypropylene was excluded contained 1.0% by weight of Ti and 8.3% by weight of i-$Pr_2$Si(OMe)$_2$.

Using the pre-polymerized catalyst, the propylene-ethylene block copolymer (F) was produced according to the following procedure.

(3) Production of Propylene-Ethylene Block Copolymer (F)

A propylene-ethylene block copolymer was produced using a two-tank continuous polymerization facility where two fluidized bed type polymerization tanks having an internal volume of 2 m$^3$ are connected in series. As propylene, ethylene, hydrogen, and nitrogen to be used, those purified using general purification catalysts were used. The production amount of the component (F1) in the first polymerization tank and the production amount of the component (F2) in the second polymerization tank were determined from the values of the temperature of cooling water of the heat exchangers to be used for temperature control of the polymerization tanks.

First Polymerization Step: Production of Component (F1) Composed of Propylene Homopolymer Homopolymerization of propylene was carried out using the first polymerization tank. The polymerization temperature was 65° C., total pressure was 3.0 MPaG (gauge pressure, the same shall apply hereinafter), and the powder hold amount was 40 kg. Propylene, hydrogen, and nitrogen were continuously fed to the polymerization tank and the concentration of propylene and the concentration of hydrogen were regulated so as to be 70.83 mol % and 0.92 mol %, respectively. As an auxiliary catalyst, $Et_3Al$ was continuously fed at a rate of 5.0 g/hour. The pre-polymerized catalyst obtained in the above was continuously fed to the polymerization tank so that the production amount of the component (F1) in the first polymerization tank became 20.0 kg/hour. The formed component (F1) was continuously extracted and regulation was performed so that the powder hold amount became constant at 40 kg. The component (F1) extracted from the first polymerization tank was continuously fed to the second polymerization tank and the production of the component (F2) composed of a propylene-ethylene random copolymer was continuously carried out.

Second Polymerization Step: Production of Propylene-Ethylene Random Copolymer Component (F2)

Random copolymerization of propylene and ethylene was carried out using the second polymerization tank. The polymerization temperature was 65° C., total pressure was 2.0 MPaG, and the powder hold amount was 40 kg. Propylene, ethylene, hydrogen, and nitrogen were continuously fed to the polymerization tank and the concentration of propylene, the concentration of ethylene, and the concentration of hydrogen were regulated so as to be 54.29 mol %, 17.14 mol %, and 0.41 mol %, respectively. By continuously feeding ethanol that is a polymerization suppressor, regulation was performed so that the production amount of the propylene-ethylene random copolymer component (F2) in the second polymerization tank became 6.7 kg/h. The thus formed propylene-ethylene block copolymer (F) was continuously extracted and regulation was performed so that the powder hold amount became constant at 40 kg. The propylene-ethylene block copolymer (F) extracted from the second polymerization tank was further transferred to a drying machine to be thoroughly dried.

When a part of the formed propylene-ethylene block copolymer (F) was analyzed, MFR(F) was 7.0 g/10 min and the ethylene content E(F) was 9.5% by weight. The weight ratio W(F1) of the component (F1) and the weight ratio W(F2) of the component (F2) determined from the production amount of the first polymerization step and the production amount of the second polymerization step were 0.75 and 0.25, respectively.

From the thus obtained W(F1), W(F2), and E(F), the ethylene content E(F2) of the propylene-ethylene random copolymer component (F2) was calculated.

For the calculation, the following expression was used:

$$E(F2) = \{E(F) - E(F1) \times W(F1)\} \div W(F2)$$

wherein, since the component (F1) is propylene homopolymer, E(F1) is 0% by weight. The above expression is one where aforementioned one described for E(F) is arranged for E(F2).

The ethylene content E(F2) was 38.0% by weight.

Production Examples A-2 and A-3: Production of Propylene-Ethylene Block Copolymers (6A-2) and (6A-3)

Propylene-ethylene block copolymers (6A-2) and (6A-3) were produced in the same manner as in Production Example of the propylene-ethylene block copolymer (6A-1) except that the conditions described in Table 6-1 were used.

TABLE 6-1

| | Production Example | | 6A-1 | 6A-2 | 6A-3 |
|---|---|---|---|---|---|
| First polymerization | Propylene concentration | mol % | 70.83 | 70.83 | 70.83 |
| | Ethylene concentration | mol % | 0 | 0 | 0 |
| | Hydrogen concentration | mol % | 0.92 | 0.64 | 1.59 |
| Second Polymerization | Propylene concentration | mol % | 54.29 | 45.72 | 42 |
| | Ethylene concentration | mol % | 17.14 | 25.71 | 29.43 |
| | Hydrogen concentration | mol % | 0.41 | 0.43 | 0.58 |
| Polymerization results | First Polymerization step | kg/hour | 20.0 | 20.0 | 20.0 |
| | Second polymerization step | kg/hour | 6.7 | 5.0 | 3.3 |
| | Total production amount | kg/hour | 26.7 | 25.0 | 23.3 |

Production Example A-4: Production of Propylene-Ethylene Block Copolymer (6A-4) Preparation of Pre-Polymerized Catalyst (1) Chemical Treatment of Silicate Salt To a 10-L glass-made separable flask equipped with a stirring blade were gradually added 3.75 L of distilled water and subsequently 2.5 kg of concentrated sulfuric acid (96%). At 50° C., 1 kg of montmorillonite (Benclay SL manufactured by Mizusawa Industrial Chemicals, Ltd.; average particle diameter=25 μm, particle size distribution=10 to 60 μm) was further dispersed therein, the whole was heated to 90° C., and the temperature was maintained for 6.5 hours. After cooled to 50° C., the slurry was filtrated under reduced pressure to recover a cake. After 7 L of distilled water was added to the cake to obtain a slurry again, filtration was performed. The washing operation was carried out until pH of the washing fluid (filtrate) exceeded 3.5. The recovered cake was dried at 110° C. under a nitrogen atmosphere overnight. The weight thereof after drying was 707 g.

(2) Drying of Silicate Salt

The chemically treated silicate salt as above was dried in a kiln dryer. Specifications and drying conditions are as follows.
Rotating tube: Cylindrical one, inner diameter of 50 mm, heating band of 550 mm (electric furnace)
Number of rotations of scraping blade: 2 rpm
Angel of inclination: 20/520
Feeding rate of silicate salt: 2.5 g/minute
Gas flow rate: nitrogen, 96 L/hour
Countercurrent drying temperature: 200° C. (powder temperature)

(3) Preparation of Catalyst

An autoclave having stirring and temperature-regulating devices and having an internal volume of 16 L was thoroughly replaced by nitrogen. Thereto was introduced 200 g of dry silicate salt and 1,160 ml of mixed heptane and further 840 ml of a heptane solution (0.60M) of triethylaluminum, followed by stirring at room temperature. After 1 hour, the whole was washed with mixed heptane to prepare a silicate salt slurry. Then, 9.6 ml of a heptane solution (0.71M) of triisobutylaluminum was added to the silicate salt slurry prepared beforehand, followed by reaction at 25° C. for 1 hour. In parallel, 33.1 ml of a heptane solution (0.71M) of triisobutylaluminum was added to 2.180 mg (0.3 mM) of (r)-dichloro [1,1'-dimethylsilylenebis{2-methyl-4-(4-chlorophenyl)-4H-azulenyl}] zirconium and 870 ml of mixed heptane and the whole was reacted at room temperature for 1 hour. Then, the resulting mixture was added to the silicate salt slurry and, after stirring for 1 hour, mixed heptane was added to adjust the volume to 5,000 ml.

(4) Preliminary Polymerization/Washing

Subsequently, the temperature in tank was raised to 40° C. and, when the temperature became stable, propylene was fed at a rate of 100 g/hour to maintain the temperature. After 4 hours, the feed of propylene was stopped and the temperature was maintained for further 2 hours.

After the preliminary polymerization was completed, residual monomer was purged, stirring was stopped, and, after still standing for about 10 minutes, 2,400 ml of the supernatant was decanted. Subsequently, 9.5 ml of a heptane solution of triisobutylaluminum (0.71M) and 5,600 ml of mixed heptane were added thereto, followed by stirring at 40° C. for 30 minutes. After still standing for 10 minutes, 5,600 ml of the supernatant was removed. Further, the operation was repeated three times. The component analysis of the final supernatant revealed that the concentration of the organoaluminum component was 1.23 mmol/L, zirconium (Zr) concentration was $8.6 \times 10^{-6}$ g/L, and the existing amount in the supernatant relative to the charged amount was 0.016%. Subsequently, 170 ml of a heptane solution of triisobutylaluminum (0.71M) was added and then drying under reduced pressure was carried out at 45° C. A pre-polymerized catalyst containing 2.0 g of polypropylene per g of the catalyst was obtained.

(5) Production of Propylene-Ethylene Block Copolymer (F)

First Polymerization Step: Production of Component (F1) composed of Propylene-Ethylene Random Copolymer A horizontal reactor (L/D=6, internal volume of 100 L) having a stirring blade was thoroughly dried and the inside was thoroughly replaced by nitrogen gas. In the presence of a polypropylene powder bed, while stirring at the number of rotations of 30 rpm, the prepared pre-polymerized catalyst and triisobutylaluminum were continuously fed to an upper stream of the reactor at a rate of 0.444 g/hour (as a solid catalyst amount excluding the pre-polymerized powder) and at a rate of 15.0 mmol/hour, respectively. A monomer mixed gas was allowed to pass continuously through the inside of the reactor so that the temperature of the reactor was kept at 65° C. and the pressure was kept at 2.00 MPaG and the molar ratio of ethylene/propylene at a gas phase part in the reactor became 0.058 and the hydrogen concentration became 150 ppm, thus performing gas-phase polymerization. The polymer powder formed by the reaction was continuously extracted from a downstream part of the reactor so that the powder bed amount in the reactor became constant. At this time, the polymer extraction amount at the time when a stationary state was achieved was 10.0 kg/hour.

When the propylene-ethylene random copolymer obtained in the first polymerization step was analyzed, the ethylene content was 1.7% by weight.

Second Polymerization Step: Production of Component (F2) Composed of Propylene-Ethylene Random Copolymer The propylene-ethylene copolymer extracted from the first polymerization step was continuously fed to a horizontal reactor (L/D=6, internal volume of 100 L) having a stirring blade. A monomer mixed gas was allowed to pass continuously through the inside of the reactor so that the temperature of the reactor was kept at 70° C. and the pressure was kept at 1.88 MPaG and the molar ratio of ethylene/propylene at the gas phase part in the reactor became 0.450 and the hydrogen concentration became 300 ppm, while stirring at the number of rotations of 25 rpm, thus performing gas-phase polymerization. The polymer powder formed by the reaction was continuously extracted from the downstream part of the reaction so that the powder bed amount in the reactor became constant. At this time, oxygen was fed as an activity-suppressing agent so that the polymer extraction amount became 18.0 kg/hour, thus regulating the polymerization reaction amount in the second polymerization step.

When the propylene-ethylene block copolymer (6A-4) thus obtained was analyzed, MFR was 7.0 g/10 minutes and the ethylene content was 6.3% by weight.

Table 6-2 shows the results of polymer analyses of the above propylene-ethylene block copolymers (6A-1) to (6A-4).

TABLE 6-2

|  |  |  | Production Example | | | |
|---|---|---|---|---|---|---|
|  |  |  | 6A-1 | 6A-2 | 6A-3 | 6A-4 |
| Propylene-ethylene | MFR (F) | g/10 minutes | 7.0 | 2.5 | 6.0 | 7.0 |
| block copolymer (F) | Tm (F) | ° C. | 161.0 | 161.0 | 161.0 | 133.0 |
|  | E (F) | % by weight | 9.5 | 10.4 | 10.9 | 6.3 |
| Component (F1) | W (F1) | % by weight | 75 | 80 | 86 | 56 |
|  | E (F1) | % by weight | 0.0 | 0.0 | 0.0 | 1.7 |
| Component (F2) | W (F2) | % by weight | 25 | 20 | 14 | 14 |
|  | E (F2) | % by weight | 38.0 | 52.0 | 78.0 | 12.2 |

Pelletization of Propylene-Ethylene Block Copolymer (F)

In a tumbler, 0.05 parts by weight of tetrakis [methylene-3-(3,5'-di-t-butyl-4-hydroxyphenyl)propionate]methane, 0.10 parts by weight of tris(2,4-di-t-butylphenyl) phosphite, and 0.05 parts by weight of calcium stearate were mixed with 100 parts by weight of each of the propylene-ethylene block copolymers (F) obtained in Production Examples A-1 to A-4 and the whole was homogenized. The obtained mixture was melt-kneaded at 230° C. by means of a twin-screw extruder having a diameter of 35 mm to obtain pellets of each of the propylene-ethylene block copolymers (6A-1) to (6A-4).

2. Other Used Materials

As resins for the sealing layers (I) of decorative films, the following polypropylene-based resins were used, in addition to the above propylene-ethylene block copolymers (6A-1) to (6A-4).

(6A-5): Propylene homopolymer (MFR=10 g/10 minutes, Tm=161° C., ethylene content E(F) of 0% by weight, component (F2) is not contained since polymerization only in the first polymerization step is performed), trade name "NOVATEC (registered trademark) FA3KM" manufactured by Japan Polypropylene Corporation (6A-6): Propylene-α-olefin copolymer (MFR=7 g/10 minutes, Tm=146° C., ethylene content E(F) of 2.5% by weight, component (F2) is not contained since polymerization only in the first polymerization step is performed), trade name "NOVATEC (registered trademark) FW3GT" manufactured by Japan Polypropylene Corporation As resins for the layers (II) of decorative films, the following polypropylene-based resins were used.

(6B-1): Propylene homopolymer (MFR=2.4 g/10 minutes, Tm=161° C.), trade name "NOVATEC (registered trademark) FY6" manufactured by Japan Polypropylene Corporation (6B-2): Propylene homopolymer (MFR=0.4 g/10 minutes, Tc=161° C.), trade name "NOVATEC (registered trademark) EA9" manufactured by Japan Polypropylene Corporation (6B-3): Polypropylene-based resin composition (MFR=2.4 g/10 minutes, Tm=161° C.) obtained by blending 96% by weight of the polypropylene-based resin (6B-1) with 4% by weight of a black pigment MB (EPP-K-120601 manufactured by Polycol Kogyo K.K.)

As resins for the layers (III) of decorative films, the following polypropylene-based resins were used.

(6C-1): Polypropylene-based resin composition (MFR=10 g/10 minutes, Tm=164° C.) obtained by blending 100% by weight of the polypropylene-based resin (6A-5) with 0.4% by weight of a nucleating agent (trademark "Millad NX8000J" manufactured by Milliken Japan)

(6C-2): Propylene-α-olefin copolymer (MFR=7 g/10 minutes, Tm=125° C., Mw/Mn=2.5) by a metallocene catalyst, trade name "WINTEC (registered trademark) WFX4M" manufactured by Japan Polypropylene Corporation (6C-3): Polypropylene-based resin composition (MFR=7 g/10 minutes, Tm=127° C.) obtained by blending 100% by weight of the polypropylene-based resin (6C-2) with 0.4% by weight of a nucleating agent (trademark "Millad NX8000J" manufactured by Milliken Japan)

(6C-4): Polypropylene-based resin composition (MFR=10 g/10 minutes, Tm=161° C.) obtained by blending 96% by weight of the polypropylene-based resin (6A-5) with 4% by weight of a white pigment MB (EPP-W-59578 manufactured by Polycol Kogyo K.K., titanium oxide content of 80% by weight)

(6C-5): Polypropylene-based resin composition (MFR=10 g/10 minutes, Tm=161° C.) obtained by blending 96% by weight of the polypropylene-based resin (6A-5) with 4% by weight of a silver pigment MB (PPCM913Y-42 SILVER21X manufactured by TOYOCOLOR Co., Ltd.)

Example 6-1

Production of Decorative Film

There was used a 2-kind 2-layer T-die having a lip opening of 0.8 mm and a die width of 400 mm, to which an extruder-1 for a sealing layer (I) having a nozzle diameter of 30 mm (diameter) and an extruder-2 for a layer (II) having a nozzle diameter of 40 mm (diameter) had been connected. The polypropylene-based resin (6A-1) was charged into the extruder-1 for a sealing layer (I) and the polypropylene-based resin (6B-1) was charged into the extruder-2 for a layer (II) and melt-extrusion was performed under conditions of a resin temperature of 240° C., a discharge amount from the extruder-1 for a sealing layer (I) of 4 kg/h, and a discharge amount from the extruder-2 for a layer (II) of 12 kg/h. The melt-extruded film was cooled and solidified while pushing it to a first roll rotating at 3 m/min at 80° C. with an air knife so that the sealing layer (I) came outside, thereby obtaining a two-layered unstretched film where a sealing layer (I) having a thickness of 50 μm and a layer (II) having a thickness of 150 μm were laminated.

Three-Dimensional Decorative Thermoforming

As the resin molded body (substrate) 5, there was used the injection molded body composed of the polypropylene-based resin (X-1) obtained in the above.

As a three-dimensional decorative thermoforming apparatus, "NGF-0406-SW" manufactured by Fu-se Vacuum Forming Ltd. was used. As shown in FIG. 2 to FIG. 7, a decorative film 1 was cut into a size having a width of 250 mm and a length of 350 mm and was set to a jig 13 for film fixing having an opening part size of 210 mm×300 mm so that the sealing layer (I) faced to the substrate (resin molded body 5) and the longitudinal direction became the MD direction of the film. The resin molded body 5 was attached on a sample-placing stand having a height of 20 mm, which was placed on a table 14 positioned below the jig 13, through "NICETACK NW-K15" manufactured by Nichiban Co., Ltd. The jig 13 and the table 14 were placed in upper and lower chamber boxes 11 and 12 and the upper and lower chamber boxes 11 and 12 were closed to make the inside of the chamber boxes a tightly closed state. The chamber boxes were divided into upper and lower ones through the decorative film 1. The upper and lower chamber boxes 11 and 12 were vacuum-suctioned and a far-infrared heater 15 placed on the upper chamber box 11 was started at an output of 80% to heat the decorative film 1 in a state that the pressure was reduced from atmospheric pressure (101.3 kPa) to 1.0 kPa. During heating, the vacuum-suction was continued and finally, the pressure was reduced to 0.1 kPa. Immediately after the finish of a spring-back phenomenon that the decorative film 1 was heated to temporarily slacken and thereafter tension returned (i.e., heating time after the spring-back phenomenon was 0 second), the table 14 placed in the lower chamber box 12 was transferred upward to push the resin molded body 5 to the decorative film 1 and immediately after that, compressed air was fed so that the pressure in the upper chamber box 11 became 270 kPa to adhere the resin molded body 5 and the decorative film 1 closely. Thus, there was obtained a three-dimensional decorative thermoformed article (decorative molded body 6) where the decorative film 1 was stuck on the upper surface and side surface of the resin molded body 5.

Table 6-3 shows evaluation results of physical properties of the obtained decorative molded bodies and the like.

Since the propylene-ethylene block copolymer (F) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 6-2

Evaluation was performed in the same manner as in Example 6-1 except that, in the production of the decorative film of Example 6-1, the propylene-ethylene block copolymer (6A-1) used for the sealing layer (I) was changed to the propylene-ethylene block copolymer (6A-2). Table 6-3 shows evaluation results.

Since the propylene-ethylene block copolymer (F) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 6-3

Evaluation was performed in the same manner as in Example 6-1 except that, in the production of the decorative film of Example 6-1, the propylene-ethylene block copolymer (6A-1) used for the sealing layer (I) was changed to the propylene-ethylene block copolymer (6A-3). Table 6-3 shows evaluation results.

Since the propylene-ethylene block copolymer (F) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 6-4

Evaluation was performed in the same manner as in Example 6-1 except that, in the production of the decorative film of Example 6-1, the propylene-ethylene block copolymer (6A-1) used for the sealing layer (I) was changed to the propylene-ethylene block copolymer (6A-4). Table 6-3 shows evaluation results.

Since the propylene-ethylene block copolymer (F) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 6-5

Evaluation was performed in the same manner as in Example 6-1 except that, in the production of the decorative film of Example 6-1, the polypropylene-based resin (6B-1) used for the layer (II) was changed to the polypropylene-based resin (6B-2). Table 6-3 shows evaluation results.

Since the propylene-ethylene block copolymer (F) and the polypropylene-based resin (B) satisfy all the requirements of the present invention, the obtained decorative molded body was excellent in appearance and adhesive force, and scratches were made inconspicuous. Moreover, the recycled molded body was excellent in appearance (evaluation: O).

Example 6-6

Evaluation was performed in the same manner as in Example 6-1 except that, in the three-dimensional decorative thermoforming of Example 6-1, the substrate was changed to the injection molded body using the resin (X-2). Table 6-3 shows obtained evaluation results.

Since the propylene-ethylene block copolymer (F) and the polypropylene-based resin (B) satisfy all the requirements of the present invention, the obtained decorative molded body was excellent in appearance and adhesive force, and scratches were made inconspicuous.

Moreover, the recycled molded body was excellent in appearance (evaluation: O).

Example 6-7

Evaluation was performed in the same manner as in Example 6-1 except that, in the three-dimensional decorative thermoforming of Example 6-1, the substrate was changed to the injection molded body using the resin (X-3). Table 6-3 shows obtained evaluation results.

Since the propylene-ethylene block copolymer (F) and the polypropylene-based resin (B) satisfy all the requirements of the present invention, the obtained decorative molded body was excellent in appearance and adhesive force, and scratches were made inconspicuous.

Moreover, the recycled molded body was excellent in appearance (evaluation: O).

Reference Example 6-1

Evaluation was performed in the same manner as in Example 6-1 except that, in the production of the decorative film of Example 6-1, the propylene-ethylene block copolymer (6A-1) used for the sealing layer (I) was changed to the propylene homopolymer (6A-5). Table 6-3 shows evaluation results.

Since the propylene homopolymer (6A-5) used for the sealing layer (I) did not contain the component (F2), adhesive force was small and emergence of scratches could not be sufficiently suppressed. Thus, the appearance was poor.

Reference Example 6-2

Evaluation was performed in the same manner as in Example 6-1 except that, in the production of the decorative film of Example 6-1, the propylene-ethylene block copolymer (6A-1) used for the sealing layer (I) was changed to the propylene-ethylene random copolymer (6A-6). Table 6-3 shows evaluation results.

Since the propylene-ethylene random copolymer (6A-6) used for the sealing layer (I) did not contain the component (F2), adhesive force was small and emergence of scratches could not be sufficiently suppressed. Thus, the appearance was poor.

Reference Example 6-3

Evaluation was performed in the same manner as in Example 6-1 except that, in the production of the decorative film of Example 6-1, the propylene-ethylene block copolymer (6A-1) used for the sealing layer (I) was changed to the propylene homopolymer (6A-5) and further, in the three-dimensional decorative thermoforming, heating was continued for 20 seconds after the spring-back phenomenon was finished and then the decorative thermoforming was conducted. Table 6-3 shows evaluation results.

By lengthening the film heating time, adhesive force was improved but draw-down of the film was severe and the appearance of the decorative molded body was poor, so that the evaluation of the scratches was not performed.

Example 6-8

In the production of the decorative film, there was used a 3-kind 3-layer T-die having a lip opening of 0.8 mm and a die width of 400 mm, to which an extruder-1 for a sealing layer (I) having a nozzle diameter of 30 mm (diameter), an extruder-2 for an intermediate layer (layer (II)) having a nozzle diameter of 40 mm (diameter), and an extruder-3 for a surface layer (surface decorative layer (III)) having a nozzle diameter of 30 mm (diameter), had been connected. The polypropylene-based resin (6A-1) was charged into the extruder-1 for a sealing layer (I), the polypropylene-based resin (6B-1) was charged into the extruder-2 for an intermediate layer, and the polypropylene-based resin (6A-5) was charged into the extruder-3 for a surface layer, and melt-extrusion was performed under conditions of a resin temperature of 240° C., a discharge amount from the extruder-1 for a sealing layer (I) of 4 kg/h, a discharge amount from the extruder-2 for an intermediate layer of 8 kg/h, and a discharge amount from the extruder-3 for a surface layer of 4 kg/h.

The melt-extruded film was cooled and solidified so that the surface decorative layer (III) came into contact with a cooling roll rotating at 3 m/min at 80° C., thereby obtaining a three-layered unstretched film where a surface decorative layer (III) having a thickness of 50 μm, a layer (II) having a thickness of 100 μm, and a sealing layer (I) having a thickness of 50 μm were laminated.

Evaluation was performed in the same manner as in Example 6-1 except that the unstretched film obtained in the above decorative film production was used. Table 6-3 shows evaluation results.

Since the propylene-ethylene block copolymer (F) and the polypropylene-based resin (B) satisfy all the requirements of the present invention, the obtained decorative molded body was excellent in appearance and adhesive force, and scratches were made inconspicuous. Moreover, the polypropylene-based resin (6A-5) was laminated as the surface decorative layer (III) at the uppermost surface side, so that a result of excellent gloss was observed. Furthermore, the recycled molded body was excellent in appearance (evaluation: O).

Example 6-9

Evaluation was performed in the same manner as in Example 6-8 except that, in the production of the decorative film of Example 6-8, the polypropylene-based resin (6A-5) used for the surface decorative layer (III) was changed to the polypropylene-based resin (6C-1). Table 6-8 shows evaluation results.

Since the propylene-ethylene block copolymer (F) and the polypropylene-based resin (B) satisfy all the requirements of the present invention, the obtained decorative molded body was excellent in appearance and adhesive force, and scratches were made inconspicuous. Moreover, the polypropylene-based resin (6C-1) to which a nucleating agent had been added was laminated as the surface decorative layer (III) at the uppermost surface side, so that a result of excellent gloss was observed. Furthermore, the recycled molded body was excellent in appearance (evaluation: O).

Example 6-10

Evaluation was performed in the same manner as in Example 6-8 except that, in the production of the decorative film of Example 6-8, the polypropylene-based resin (6A-5) used for the surface decorative layer (III) was changed to the polypropylene-based resin (6C-2). Table 6-3 shows evaluation results.

Since the propylene-ethylene block copolymer (F) and the polypropylene-based resin (B) satisfy all the requirements of the present invention, the obtained decorative molded body was excellent in appearance and adhesive force, and scratches were made inconspicuous. Moreover, the polypropylene-based resin (6C-2) was laminated as the surface decorative layer (III) at the uppermost surface side, so that a result of excellent gloss was observed. Furthermore, the recycled molded body was excellent in appearance (evaluation: O).

Example 6-11

Evaluation was performed in the same manner as in Example 6-8 except that, in the production of the decorative film of Example 6-8, the polypropylene-based resin (6A-5) used for the surface decorative layer (III) was changed to the polypropylene-based resin (6C-3). Table 6-3 shows evaluation results.

Since the propylene-ethylene block copolymer (F) and the polypropylene-based resin (B) satisfy all the requirements of the present invention, the obtained decorative molded body was excellent in appearance and adhesive force, and scratches were made inconspicuous. Moreover, the polypropylene-based resin (6C-3) to which a nucleating agent had been added was laminated as the surface decorative layer (III) at the uppermost surface side, so that a result of excellent gloss was observed. Furthermore, the recycled molded body was excellent in appearance (evaluation: O).

Example 6-12

Evaluation was performed in the same manner as in Example 6-8 except that, in the production of the decorative film of Example 6-8, the polypropylene-based resin (6A-5) used for the surface decorative layer (III) was changed to the polypropylene-based resin (6C-4). Table 6-3 shows evaluation results.

Since the propylene-ethylene block copolymer (F) and the polypropylene-based resin (B) satisfy all the requirements of the present invention, the obtained decorative molded body was excellent in appearance and adhesive force, and scratches were made inconspicuous. Further, coupled with the sticking of the white-colored decorative film, the scratches were sufficiently hidden to such a degree that the scratched place was not able to identify. Therefore, the scratch depth was not measured. Moreover, since the surface decorative layer (III) excellent in gloss was colored white, appearance was excellent. Furthermore, the recycled molded body was excellent in appearance (evaluation: O).

Example 6-13

Evaluation was performed in the same manner as in Example 6-8 except that, in the production of the decorative film of Example 6-8, the polypropylene-based resin (6B-1) used for the layer (II) was changed to the polypropylene-based resin (6B-3). Table 6-3 shows evaluation results.

Since the propylene-ethylene block copolymer (F) and the polypropylene-based resin (B) satisfy all the requirements of the present invention, the obtained decorative molded body was excellent in appearance and adhesive force, and scratches were made inconspicuous. Further, coupled with the sticking of the black-colored decorative film, the scratches were sufficiently hidden to such a degree that the scratched place was not able to identify. Therefore, the scratch depth was not measured. Moreover, since the layer (II) was colored black, appearance was excellent. Furthermore, the polypropylene-based resin (6A-5) was laminated as the surface decorative layer (III) at the uppermost surface side, so that a result of excellent gloss was observed. In addition, the recycled molded body was excellent in appearance (evaluation: O).

Example 6-14

Evaluation was performed in the same manner as in Example 6-13 except that, in the production of the decorative film of Example 6-13, the polypropylene-based resin (6A-5) used for the surface decorative layer (III) was changed to the polypropylene-based resin (6C-5). Table 6-3 shows evaluation results.

Since the propylene-ethylene block copolymer (F) and the polypropylene-based resin (B) satisfy all the requirements of the present invention, the obtained decorative molded body was excellent in appearance and adhesive force, and scratches were made inconspicuous. Further, coupled with the sticking of the colored decorative film, the scratches were sufficiently hidden to such a degree that the scratched place was not able to identify. Therefore, the scratch depth was not measured. Moreover, the polypropylene-based resin (6C-5) was laminated as the surface decorative layer (III) at the uppermost surface side, so that a result of excellent gloss was observed. Further, since the layer (II) was colored black and the surface decorative layer (III) was colored silver, the film became a metallic film and appearance was excellent. Furthermore, the recycled molded body was excellent in appearance (evaluation: O).

TABLE 6-3

| | | | Unit | Example 6-1 | Example 6-2 | Example 6-3 | Example 6-4 | Example 6-5 | Example 6-6 | Example 6-7 | Reference Example 6-1 | Reference Example 6-2 | Reference Example 6-3 |
|---|---|---|---|---|---|---|---|---|---|---|---|---|---|
| Decorative film | Surface decorative layer (III) | Polypropylene-based resin (H) | Kind | — | — | — | — | — | — | — | — | — | — |
| | Layer (II) | Polypropylene-based resin (B) | Kind | — | 6B-1 | 6B-1 | 6B-1 | 6B-1 | 6B-2 | 6B-1 | 6B-1 | 6B-1 | 6B-1 | 6B-1 |
| | Sealing layer (I) | Propylene-ethylene block copolymer (F) | Kind | — | 6A-1 | 6A-2 | 6A-3 | 6A-4 | 6A-1 | 6A-1 | 6A-1 | 6A-5 | 6A-6 | 6A-5 |
| Substrate | | | Kind | — | X-1 | X-1 | X-1 | X-1 | X-1 | X-2 | X-3 | X-1 | X-1 | X-1 |
| Heating time after finish of spring-back | | | sec | 0 | 0 | 0 | 0 | 0 | 0 | 0 | 0 | 0 | 20 |
| Appearance of decorative molded body | | | — | O | O | O | O | O | O | O | O | O | X |
| Adhesive force | | | N/10 mm | 27 | 23 | 19 | 22 | 25 | 25 | 26 | 0.6 | 3 | 33 |
| Scratch evaluation | Depth | | μm | 3.9 | 2.9 | 3.6 | 2.6 | 3.5 | 3.6 | 4.0 | 9.5 | 9.1 | — |
| | Whitened appearance | | — | O | O | O | O | O | O | O | X | X | — |
| GLOSS (60°) | | | % | 17 | 18 | 17 | 19 | 18 | 19 | 17 | 16 | 18 | — |
| Appearance of recycled molded body | | | — | O | O | O | O | O | O | O | O | O | — |

| | | | Unit | Example 6-8 | Example 6-9 | Example 6-10 | Example 6-11 | Example 6-12 | Example 6-13 | Example 6-14 |
|---|---|---|---|---|---|---|---|---|---|---|
| Decorative film | Surface decorative layer (III) | Polypropylene-based resin (H) | Kind | 6A-5 | 6C-1 | 6C-2 | 6C-3 | 6C-4 | 6A-5 | 6C-5 |
| | Layer (II) | Polypropylene-based resin (B) | Kind | — | 6B-1 | 6B-1 | 6B-1 | 6B-1 | 6B-1 | 6B-3 | 6B-3 |
| | Sealing layer (I) | Propylene-ethylene block copolymer (F) | Kind | — | 6A-1 | 6A-1 | 6A-1 | 6A-1 | 6A-1 | 6A-1 |

TABLE 6-3-continued

| Substrate | | Kind | — | X-1 | X-1 | X-1 | X-1 | X-1 | X-1 | X-1 |
|---|---|---|---|---|---|---|---|---|---|---|
| Heating time after finish of spring-back | | sec | | 0 | 0 | 0 | 0 | 0 | 0 | 0 |
| Appearance of decorative molded body | | — | | ○ | ○ | ○ | ○ | ○ | ○ | ○ |
| Adhesive force | | N/10 mm | | 28 | 27 | 27 | 26 | 24 | 25 | 27 |
| Scratch evaluation | Depth | μm | | 3.7 | 3.7 | 3.6 | 3.5 | — | — | — |
| | Whitened appearance | — | | ○ | ○ | ○ | ○ | ○ | ○ | ○ |
| GLOSS (60°) | | % | | 32 | 85 | 34 | 95 | 33 | 36 | 34 |
| Appearance of recycled molded body | | — | | ○ | ○ | ○ | ○ | ○ | ○ | ○ |

Example 6-15

Production of Decorative Film

In the production of the decorative film of Example 6-14, melt-extrusion was performed under conditions of a discharge amount from the extruder-1 for a sealing layer (I) of 4 kg/h, a discharge amount from the extruder-2 for an intermediate layer of 12 kg/h, and a discharge amount from the extruder-3 for a surface layer of 4 kg/h and the obtained three-layered unstretched film was slit into a width of 200 mm, thereby obtaining a three-layered unstretched film where a surface decorative layer (III) having a thickness of 50 μm, a layer (II) having a thickness of 150 μm, and a sealing layer (I) having a thickness of 50 μm were laminated.

Production of Embossed Film

As an embossing apparatus, an electric heating type test embossing machine manufactured by YURIROLL Co., Ltd. was used. The electric heating type test embossing machine has a mechanism of transferring an uneven shape at an upper stage to a film surface by heating and pressing the film with a roll (embossing roll) having a heatable uneven shape placed at an upper stage and a smooth roll placed at a lower stage. In the embossing roll, a hairline pattern having a depth of 0.030 mm was used.

The three-layered unstretched film obtained by the production of the decorative film was fed between two rolls of the embossing machine so that the surface decorative layer (III) came into contact with the embossing roll. By transferring the embossment under conditions of an embossing roll temperature of 145° C., a contact pressure of 3 MPa, and a roll speed of 3 m/min, there was obtained a decorative film where the hairline pattern was transferred on the surface of the surface decorative layer (III).

Three-Dimensional Decorative Thermoforming

A three-dimensional decorative thermoformed article was obtained in the same manner as in Example 6-1.

Table 6-4 shows evaluation results of physical properties of the obtained embossed films and three-dimensional decorative thermoformed articles.

Since the propylene-ethylene block copolymer (F) and the polypropylene-based resin (B) satisfy all the requirements of the present invention, the depth of embossment of the film obtained by the production of the embossed film was so excellent as 24 μm. Moreover, also on the surface of the three-dimensional decorative thermoformed article after three-dimensional decorative thermoforming, the hairline pattern strongly remained and thus designability was excellent.

TABLE 6-4

| | | | | Unit | Example 6-15 |
|---|---|---|---|---|---|
| Decorative film | Surface decorative layer (III) | Polypropylene-based resin (H) | Kind | | 6C-5 |

TABLE 6-4-continued

| | | | Unit | Example 6-15 |
|---|---|---|---|---|
| Layer (II) | Polypropylene-based resin (B) | Kind | — | 6B-3 |
| Sealing layer (I) | Propylene-ethylene block copolymer (F) | Kind | — | 6A-1 |
| Substrate | | Kind | — | X-1 |
| Heating time after spring-back | | | sec | 0 |
| Depth of embossment | | | μm | 24 |
| Embossed pattern after thermoforming | | | | ○ |

INDUSTRIAL APPLICABILITY

According to the present invention, there are provided a decorative film to be used for three-dimensional decorative thermoforming, which can achieve both of sufficient adhesive strength and product appearance, exhibits less fading of crimps, is capable of reducing product defects by making the scratches of the substrate inconspicuous, and facilitates recycling, and a method for producing a decorative molded body using the decorative film.

While the invention has been described in detail and with reference to specific embodiments thereof, it will be apparent to one skilled in the art that various changes and modifications can be made therein without departing from the spirit and scope thereof. The present application is based on Japanese Patent Applications No. 2016-151988 and 2016-151989 filed on Aug. 2, 2016, Japanese Patent Applications No. 2016-238120 and 2016-238121 filed on Dec. 8, 2016, Japanese Patent Application No. 2016-240895 filed on Dec. 13, 2016, and Japanese Patent Application No. 2017-049277 filed on Mar. 15, 2017, and the contents are incorporated herein by reference.

REFERENCE SIGNS LIST

1 Decorative film
2 Layer (II)
3 Sealing layer (I)
4 Surface decorative layer (III)
5 Resin molded body (decoration object, substrate)
6 Decorative molded body
11 Upper chamber box
12 Lower chamber box
13 Jig
14 Table
15 Heater

The invention claimed is:

1. A decorative film for sticking on a resin molded body by thermoforming, comprising:
   a sealing layer (I) comprising a polypropylene-based resin (A); and
   a layer (II) comprising a polypropylene-based resin (B), wherein the polypropylene-based resin (A) satisfies (a1) to (a4) and the polypropylene-based resin (B) satisfies (b1) and (b2):
(a1) the melt flow rate of polypropylene-based resin (A) (MFR(A)) (at 230° C., a load of 2.16 kg) is more than 0.5 g/10 minutes,
(a2) the polypropylene-based resin (A) is a metallocene catalyst-based propylene-based polymer,
(a3) the melting peak temperature (Tm(A)) is lower than 150° C.,
(a4) the molecular weight distribution (Mw/Mn(A)) obtained by GPC measurement is 1.5 to 3.5,
(b1) the melt flow rate of polypropylene-based resin (B) (MFR(B)) (at 230° C., a load of 2.16 kg) and MFR(A) satisfy a relational expression (b-1);

$MFR(B) < MFR(A)(b-1)$, and (b2) the melting peak temperature (Tm(B)) and Tm(A) satisfy a relational expression (b-2);

$Tm(B) > Tm(A)(b-2)$.

2. A decorative film for sticking on a resin molded body by thermoforming, comprising:
a sealing layer (I) comprising a polypropylene-based resin (A); and
a layer (II) comprising a polypropylene-based resin (B),
wherein the polypropylene-based resin (A) satisfies (a1) and (a5) and the polypropylene-based resin (B) satisfies (b1) and (b3):
(a1) the melt flow rate of polypropylene-based resin (A) (MFR(A)) (at 230° C., a load of 2.16 kg) is more than 0.5 g/10 minutes,
(a5) the crystallization temperature (Tc(A)) is lower than 100° C.,
(1) the melt flow rate of polypropylene-based resin (B) (MFR(B)) (at 230° C., a load of 2.16 kg) and MFR(A) satisfy a relational expression (b-1);

$MFR(B) < MFR(A)(b-1)$, and (b3) the crystallization temperature (Tc(A)) and (Tc(B)) satisfy a relational expression (b-3);

$Tc(B) > Tc(A)(b-3)$.

3. A decorative film for sticking on a resin molded body by thermoforming, comprising:
a sealing layer (I) comprising a polypropylene-based resin (A); and
a layer (II) comprising a polypropylene-based resin (B),
wherein the polypropylene-based resin (A) satisfies (a1) and the polypropylene-based resin (B) satisfies (b1):
(a1) the melt flow rate of polypropylene-based resin (A) (MFR(A)) (at 230° C., a load of 2.16 kg) is more than 0.5 g/10 minutes, and
(b1) the melt flow rate of polypropylene-based resin (B) (MFR(B)) (at 230° C., a load of 2.16 kg) and MFR(A) satisfy a relational expression (b-1);

$MFR(B) < MFR(A)(b-1)$, wherein the sealing layer (I) comprises a resin composition (X3) in which the weight ratio of the propylene-based resin (A) to an ethylene-α-olefin random copolymer (C) is in a range of 97:3 to 5:95, and
the ethylene-α-olefin random copolymer (C) satisfies (c1) to (c3):
(c1) the ethylene content [E(C)] is 65% by weight or more,
(c2) the density is 0.850 to 0.950 g/cm³, and
(c3) the melt flow rate of ethylene-α-olefin random copolymer (C) (MFR(C)) (230° C., a load of 2.16 kg) is 0.1 to 100 g/10 minutes.

4. A decorative film for sticking on a resin molded body by thermoforming, comprising:
a sealing layer (I) comprising a polypropylene-based resin (A); and
a layer (II) comprising a polypropylene-based resin (B),
wherein the polypropylene-based resin (A) satisfies (a1) and the polypropylene-based resin (B) satisfies (b1):
(a1) the melt flow rate of polypropylene-based resin (A) (MFR(A)) (at 230° C., a load of 2.16 kg) is more than 0.5 g/10 minutes, and
(b1) the melt flow rate of polypropylene-based resin (B) (MFR(B)) (at 230° C., a load of 2.16 kg) and MFR(A) satisfy a relational expression (b-1);

$MFR(B) < MFR(A)(b-1)$, wherein the sealing layer (I) comprises a resin composition (X4) in which the weight ratio of the propylene-based resin (A) to a thermoplastic elastomer (D) is in a range of 97:3 to 5:95, and the thermoplastic elastomer (D) satisfies (d1) to (d3):
(d1) the thermoplastic elastomer (D) is a thermoplastic elastomer in which at least one selected from the group consisting of propylene and butene is a main component,
(d2) the density is 0.850 to 0.950 g/cm³, and
(d3) the melt flow rate of thermoplastic elastomer (D) (MFR(D)) (230° C., a load of 2.16 kg) is 0.1 to 100 g/10 minutes.

5. A decorative film for sticking on a resin molded body by thermoforming, comprising:
a sealing layer (I) comprising a polypropylene-based resin (A); and
a layer (II) comprising a polypropylene-based resin (B),
wherein the polypropylene-based resin (A) satisfies (a1) and the polypropylene-based resin (B) satisfies (b1):
(a1) the melt flow rate of polypropylene-based resin (A) (MFR(A)) (at 230° C., a load of 2.16 kg) is more than 0.5 g/10 minutes, and
(1) the melt flow rate of polypropylene-based resin (B) (MFR(B)) (at 230° C., a load of 2.16 kg) and MFR(A) satisfy a relational expression (b-1);

$MFR(B) < MFR(A)(b-1)$, wherein the sealing layer (I) comprises a resin composition (X5) in which the weight ratio of the propylene-based resin (A) and a thermoplastic resin (E) is in a range of 97:3 to 5:95 and the thermoplastic resin (E) satisfies (e1), and the resin composition (X5) satisfies (x1):
(e1) the thermoplastic resin (E) comprises at least one selected from the group consisting of an alicyclic hydrocarbon group and an aromatic hydrocarbon group, and
(x 1) the isothermal crystallization time (t(X)) (second) of the resin composition (X5) determined by a differential scanning calorimeter (DSC) satisfies expression (x-1);

$t(X) \geq 1.5 \times t(A)(x-1)$ wherein t(A) represents isothermal crystallization time (second) of the polypropylene-based resin (A) measured at a temperature 10° C. higher than the crystallization initiation temperature of the propylene-based resin (A) and t(X) is isothermal crystallization time (second) of the resin composition (X5) measured at a temperature that is 10° C. higher than the crystallization initiation temperature of the propylene-based resin (A).

6. A decorative film for sticking on a resin molded body by thermoforming, comprising:
a sealing layer (I) comprising a polypropylene-based resin (A); and
a layer (II) comprising a polypropylene-based resin (B), wherein the polypropylene-based resin (A) satisfies (a1) and the polypropylene-based resin (B) satisfies (b1):
(a1) the melt flow rate of polypropylene-based resin (A) (MFR(A)) (at 230° C., a load of 2.16 kg) is more than 0.5 g/10 minutes, and
(b1) the melt flow rate of polypropylene-based resin (B) (MFR(B)) (at 230° C., a load of 2.16 kg) and MFR(A) satisfy a relational expression (b-1);

$MFR(B) < MFR(A)$ (b-1), wherein the sealing layer (I) comprises a propylene-ethylene block copolymer (F) that satisfies (f1) and (f2):
(f1) the melting peak temperature (Tm(F)) is 110 to 170° C., and
(f2) the propylene-ethylene block copolymer (F) comprises 5 to 97% by weight of a component (F1) comprising a propylene homopolymer or a propylene-ethylene random copolymer and 3 to 95% by weight of a component (F2) comprising a propylene-ethylene random copolymer having an ethylene content larger than that of the component (F1).

7. The decorative film according to claim 1, wherein the polypropylene-based resin (A) is a propylene-α-olefin copolymer.

8. The decorative film according to claim 1, wherein Tm(A) is 140° C. or lower.

9. The decorative film according to claim 3, wherein the ethylene-α-olefin random copolymer (C) further satisfies at least one selected from the group consisting of (c4) and (c5):
(c4) the melting peak temperature (Tm(C)) is 30 to 130° C., and
(c5) the ethylene-α-olefin random copolymer (C) is a random copolymer of ethylene and an α-olefin having 3 to 20 carbon atoms.

10. The decorative film according to claim 4, wherein the thermoplastic elastomer (D) is at least one copolymer selected from the group consisting of a propylene-ethylene copolymer having an ethylene content of less than 50 wt %, a butene-ethylene copolymer having an ethylene content of less than 50%, a propylene-ethylene-butene copolymer having an ethylene content of less than 50 wt %, a propylene-butene copolymer, and a butene homopolymer.

11. The decorative film according to claim 4, wherein the thermoplastic elastomer (D) further satisfies (d4):
(d4) the melting peak temperature (Tm(D)) is 30 to 170° C.

12. The decorative film according to claim 5, wherein the thermoplastic resin (E) is a styrene-based elastomer.

13. The decorative film according to claim 5, wherein the thermoplastic resin (E) is an alicyclic hydrocarbon resin.

14. The decorative film according to claim 6, wherein the propylene-ethylene block copolymer (F) further satisfies at least one selected from the group consisting of (f3) to (f5):
(f3) the ethylene content in the propylene-ethylene block copolymer (F) is 0.15 to 85% by weight,
(f4) the ethylene content of the component (F1) is in the range of 0 to 6% by weight, and
(f5) the ethylene content of the component (F2) is in the range of 5 to 90% by weight.

15. A method for producing a decorative molded body comprising:
preparing the decorative film according to claim 1,
preparing a resin molded body,
setting the resin molded body and the decorative film in a pressure-reducible chamber box,
reducing the pressure in the chamber box,
heating and softening the decorative film,
pushing the decorative film onto the resin molded body, and
returning the inside of the pressure-reduced chamber box to atmospheric pressure or pressurizing the inside.

16. The method for producing a decorative molded body according to claim 15, wherein the resin molded body comprises a propylene-based resin composition.

17. The decorative film according to claim 2, wherein the polypropylene-based resin (A) is a propylene-α-olefin copolymer.

18. The decorative film according to claim 10, wherein the thermoplastic elastomer (D) further satisfies (d4):
(d4) the melting peak temperature (Tm(D)) is 30 to 170° C.

19. A method for producing a decorative molded body comprising:
preparing the decorative film according to claim 2,
preparing a resin molded body,
setting the resin molded body and the decorative film in a pressure-reducible chamber box,
reducing the pressure in the chamber box,
heating and softening the decorative film,
pushing the decorative film onto the resin molded body, and
returning the inside of the pressure-reduced chamber box to atmospheric pressure or pressurizing the inside.

20. A method for producing a decorative molded body comprising:
preparing the decorative film according to claim 3,
preparing a resin molded body,
setting the resin molded body and the decorative film in a pressure-reducible chamber box,
reducing the pressure in the chamber box,
heating and softening the decorative film,
pushing the decorative film onto the resin molded body, and
returning the inside of the pressure-reduced chamber box to atmospheric pressure or pressurizing the inside.

21. A method for producing a decorative molded body comprising:
preparing the decorative film according to claim 4,
preparing a resin molded body,
setting the resin molded body and the decorative film in a pressure-reducible chamber box,
reducing the pressure in the chamber box,
heating and softening the decorative film,
pushing the decorative film onto the resin molded body, and
returning the inside of the pressure-reduced chamber box to atmospheric pressure or pressurizing the inside.

22. A method for producing a decorative molded body comprising:
preparing the decorative film according to claim 5,
preparing a resin molded body,
setting the resin molded body and the decorative film in a pressure-reducible chamber box,
reducing the pressure in the chamber box, heating and softening the decorative film,
pushing the decorative film onto the resin molded body, and
returning the inside of the pressure-reduced chamber box to atmospheric pressure or pressurizing the inside.

23. A method for producing a decorative molded body comprising:
preparing the decorative film according to claim 6,
preparing a resin molded body,
setting the resin molded body and the decorative film in a pressure-reducible chamber box,
reducing the pressure in the chamber box,
heating and softening the decorative film,
pushing the decorative film onto the resin molded body, and
returning the inside of the pressure-reduced chamber box to atmospheric pressure or pressurizing the inside.

24. A decorative film for sticking on a resin molded body by thermoforming, comprising:
a sealing layer (I) comprising a propylene-ethylene block copolymer (F); and
a layer (II) comprising a polypropylene-based resin (B),
wherein the propylene-ethylene block copolymer (F) satisfies (a1), (f1) and (f2) and the polypropylene-based resin (B) satisfies (b 1):
(a1) the melt flow rate of propylene-ethylene block copolymer (F) (MFR(F)) (at 230° C., a load of 2.16 kg) is more than 0.5 g/10 minutes,
(f1) the melting peak temperature (Tm(F)) is 110 to 170° C.,
(f2) the propylene-ethylene block copolymer (F) comprises 5 to 97% by weight of a component (F1) comprising a propylene homopolymer or a propylene-ethylene random copolymer and 3 to 95% by weight of a component (F2) comprising a propylene-ethylene random copolymer having an ethylene content larger than that of the component (F1), and
(b1) the melt flow rate of polypropylene-based resin (B) (MFR(B)) (at 230° C., a load of 2.16 kg) and MFR(F) satisfy a relational expression (b-1);

$$MFR(B) < MFR(A) \quad (b\text{-}1).$$

25. A method for producing a decorative molded body comprising:
preparing the decorative film according to claim 24,
preparing a resin molded body,
setting the resin molded body and the decorative film in a pressure-reducible chamber box,
reducing the pressure in the chamber box,
heating and softening the decorative film,
pushing the decorative film onto the resin molded body, and
returning the inside of the pressure-reduced chamber box to atmospheric pressure or pressurizing the inside.

* * * * *